US011669194B2

(12) United States Patent
Sanders et al.

(10) Patent No.: US 11,669,194 B2
(45) Date of Patent: Jun. 6, 2023

(54) NAVIGATING USER INTERFACES WITH MULTIPLE NAVIGATION MODES

(71) Applicant: Apple Inc., Cupertino, CA (US)

(72) Inventors: Christopher J. Sanders, San Jose, CA (US); Dennis S. Park, San Francsico, CA (US); Neil P. Cormican, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/659,304

(22) Filed: Apr. 14, 2022

(65) Prior Publication Data

US 2022/0334669 A1   Oct. 20, 2022

Related U.S. Application Data

(60) Provisional application No. 63/176,835, filed on Apr. 19, 2021, provisional application No. 63/303,014, filed on Jan. 25, 2022.

(51) Int. Cl.
*G06F 3/041* (2006.01)
*G06F 9/451* (2018.01)
*G06F 3/0488* (2022.01)

(52) U.S. Cl.
CPC .......... *G06F 3/0416* (2013.01); *G06F 3/0488* (2013.01); *G06F 9/451* (2018.02)

(58) Field of Classification Search
None
See application file for complete search history.

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 9,348,458 B2 | 5/2016 | Hotelling et al. |
| 9,933,937 B2 | 4/2018 | Lemay et al. |
| 2002/0015024 A1 | 2/2002 | Westerman et al. |
| 2005/0190059 A1 | 9/2005 | Wehrenberg |
| 2006/0017692 A1 | 1/2006 | Wehrenberg et al. |

(Continued)

FOREIGN PATENT DOCUMENTS

| | | |
|---|---|---|
| WO | 2013/169849 A2 | 11/2013 |
| WO | 2014/105276 A1 | 7/2014 |

*Primary Examiner* — Stephen T. Reed
(74) *Attorney, Agent, or Firm* — Kubota & Basol LLP

(57) ABSTRACT

In some embodiments, a user interface displayed by a first electronic device is navigated with a first mode of navigation when touch input at a touch-sensitive surface of a second electronic device satisfies one or more criteria, and is navigated with a second mode of navigation when touch input at the touch-sensitive surface does not satisfy the one or more criteria.

72 Claims, 41 Drawing Sheets

(56) References Cited

U.S. PATENT DOCUMENTS

| | | |
|---|---|---|
| 2006/0033724 A1 | 2/2006 | Chaudhri et al. |
| 2006/0197753 A1 | 9/2006 | Hotelling |
| 2016/0070466 A1* | 3/2016 | Chaudhri ............ G06F 3/04883 |
| | | 715/765 |
| 2017/0301281 A1* | 10/2017 | Paanajarvi ............... G09G 5/14 |
| 2017/0357335 A1* | 12/2017 | Carlen ................ G06F 3/04842 |

* cited by examiner

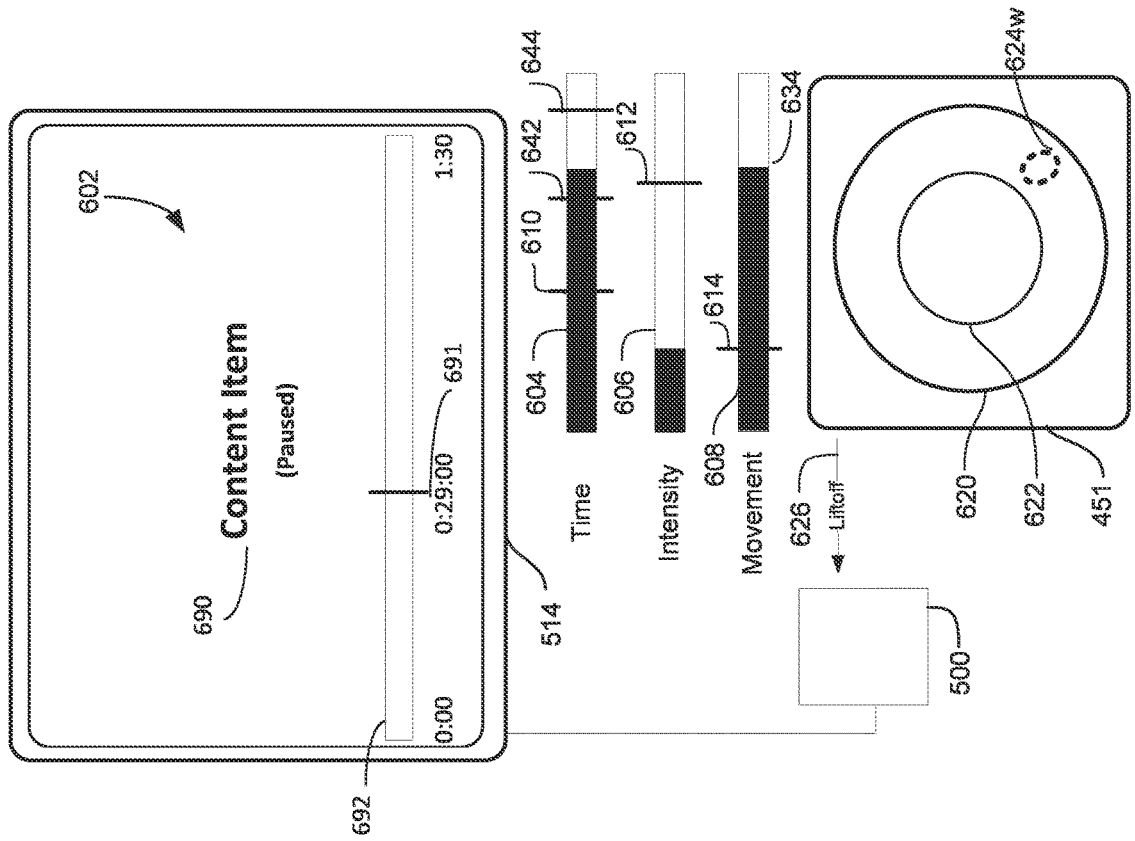
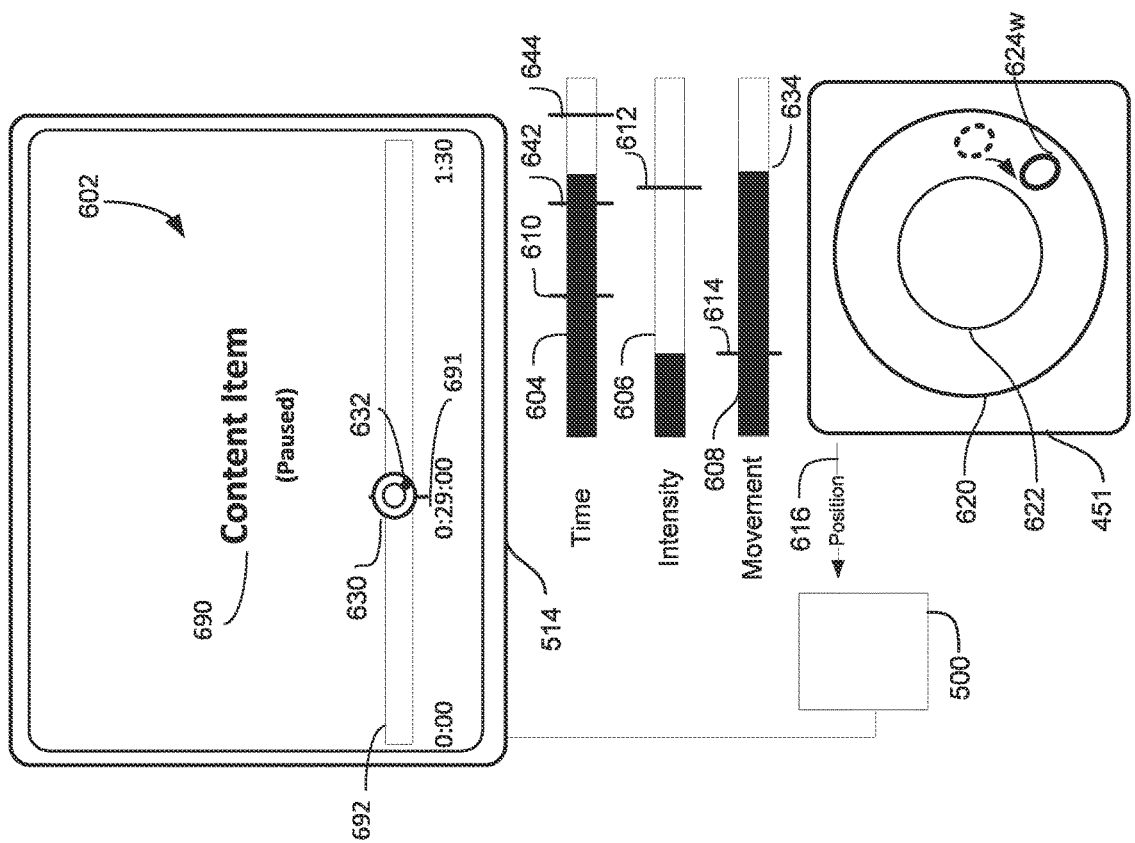

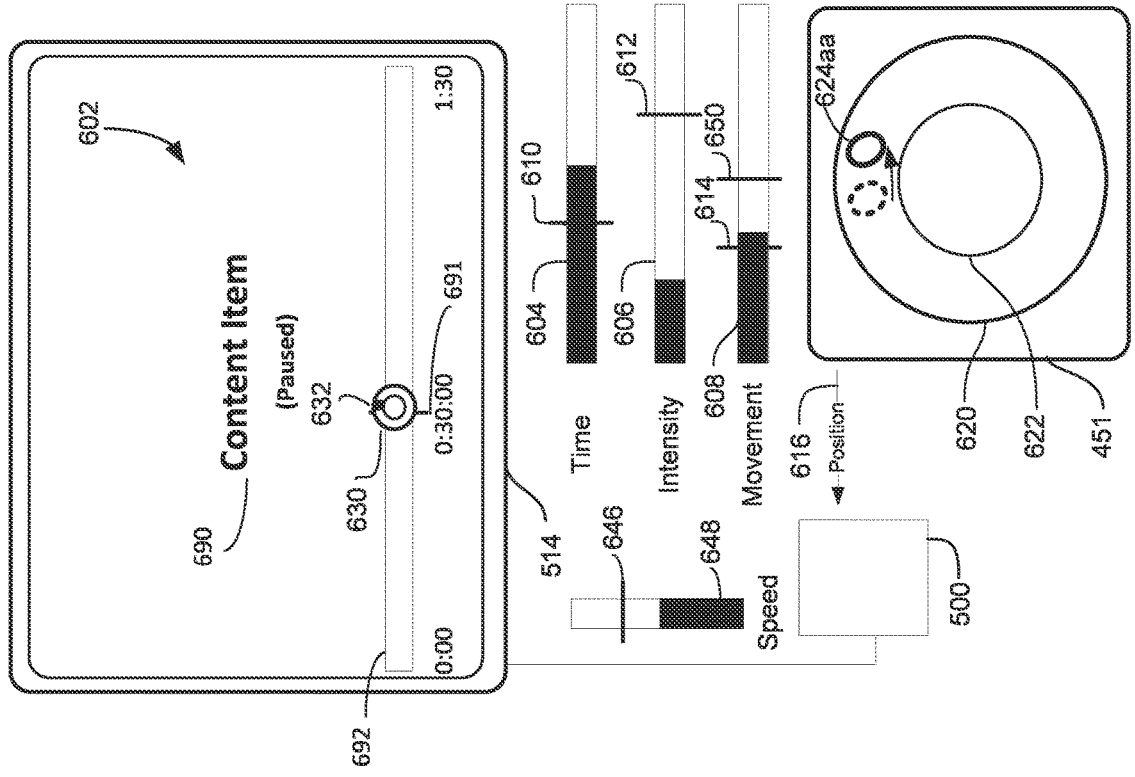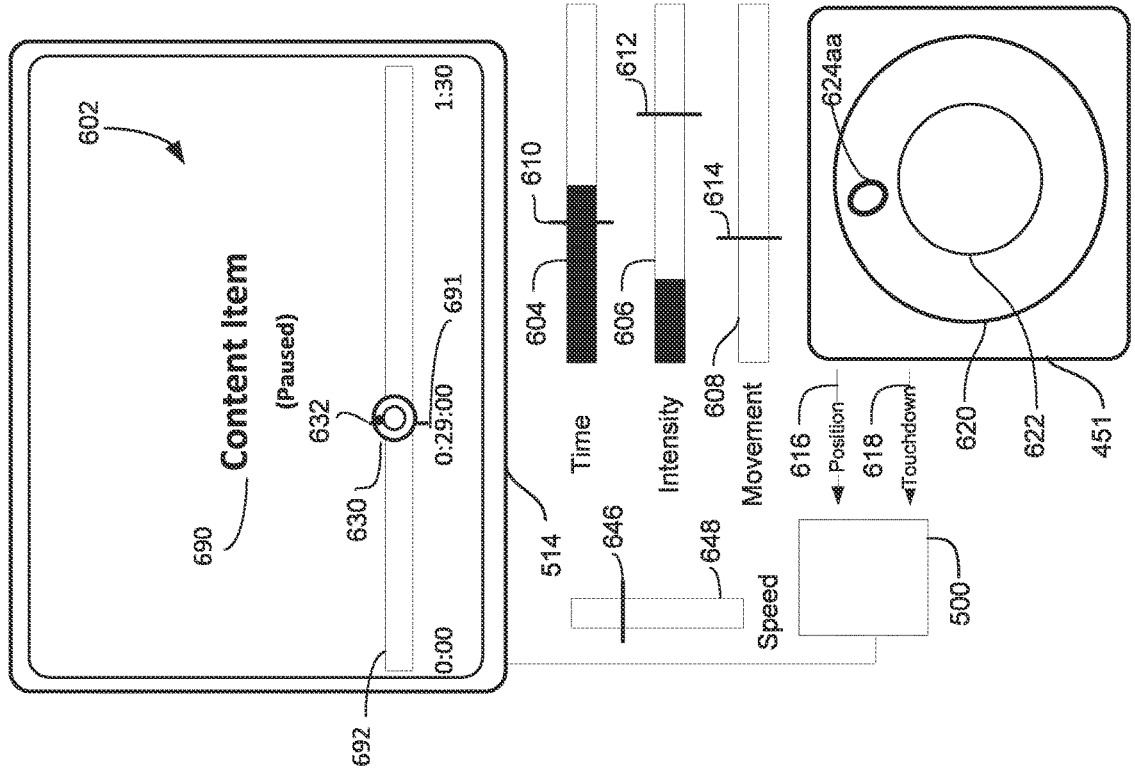

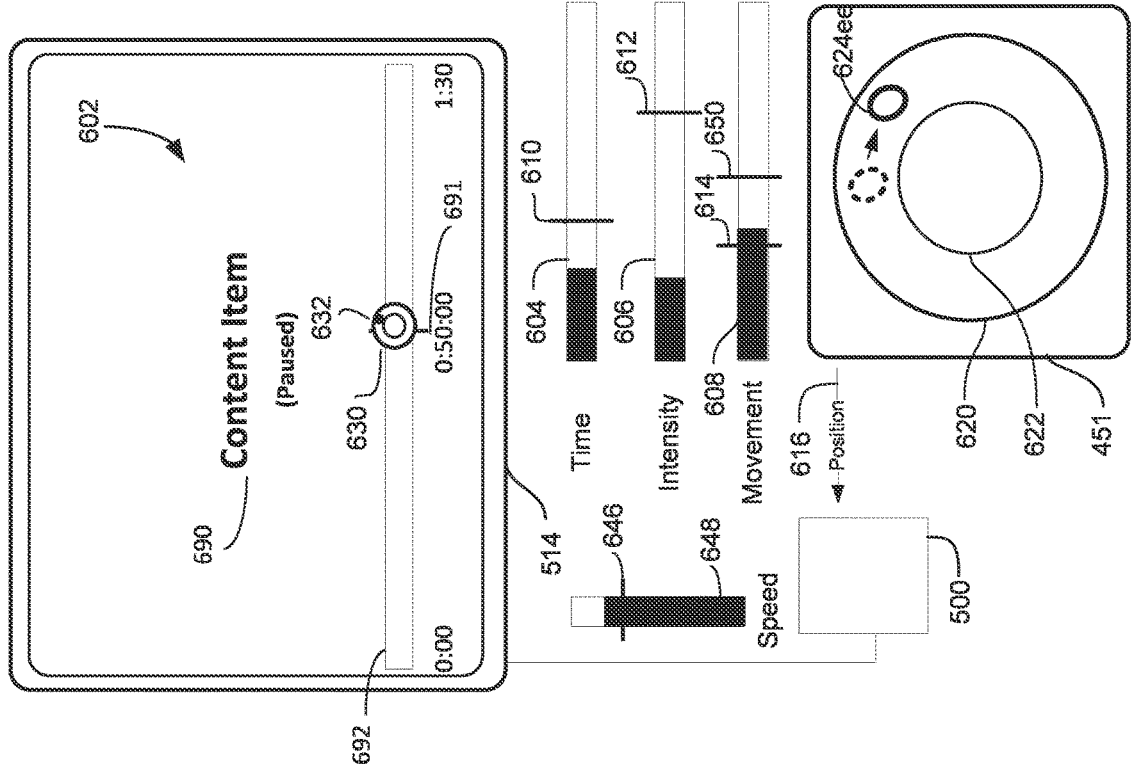
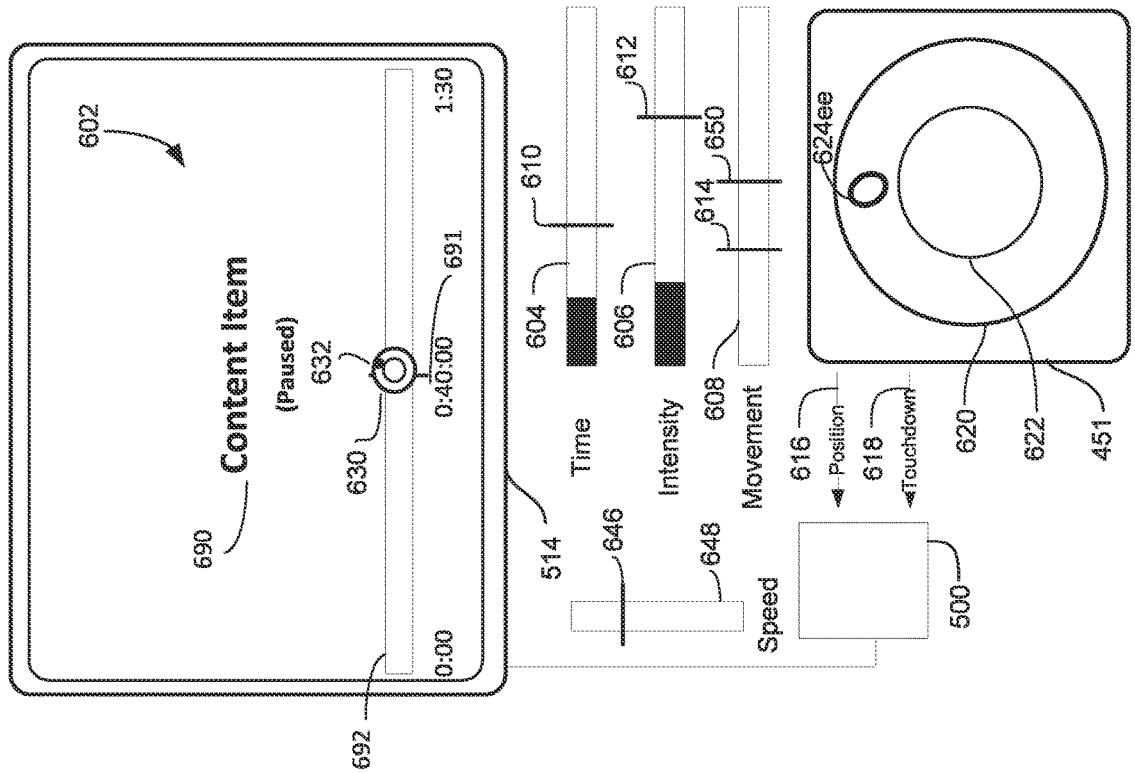

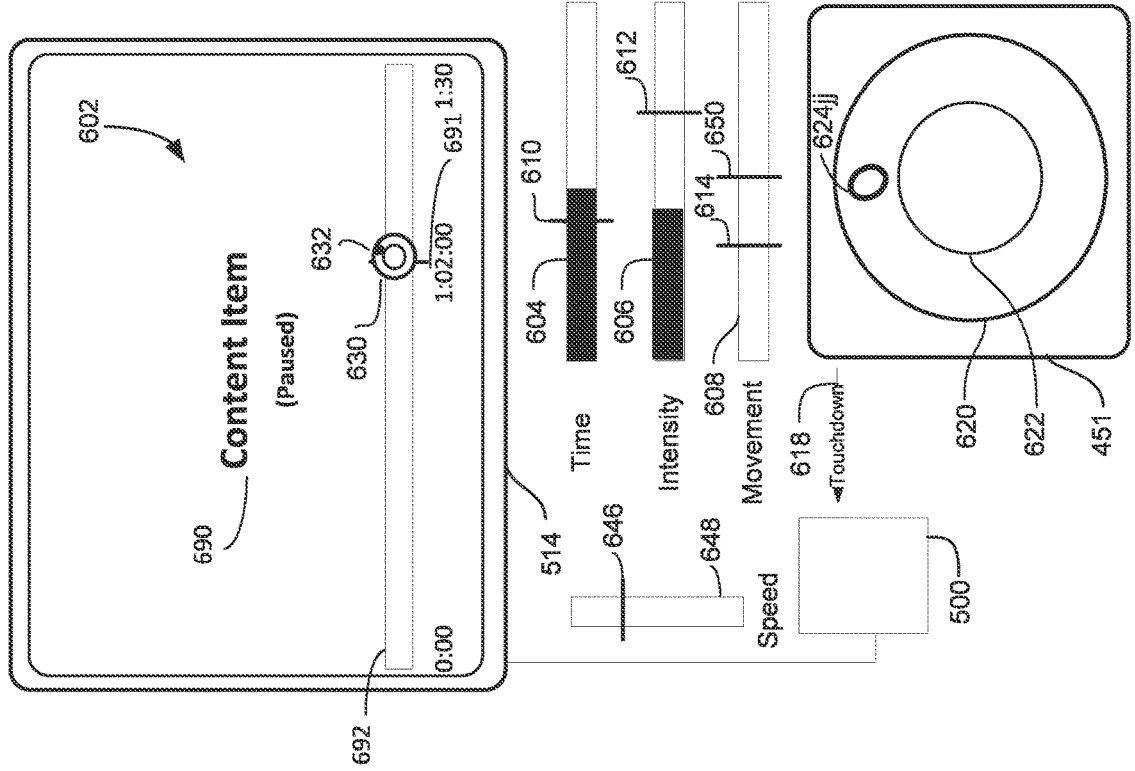
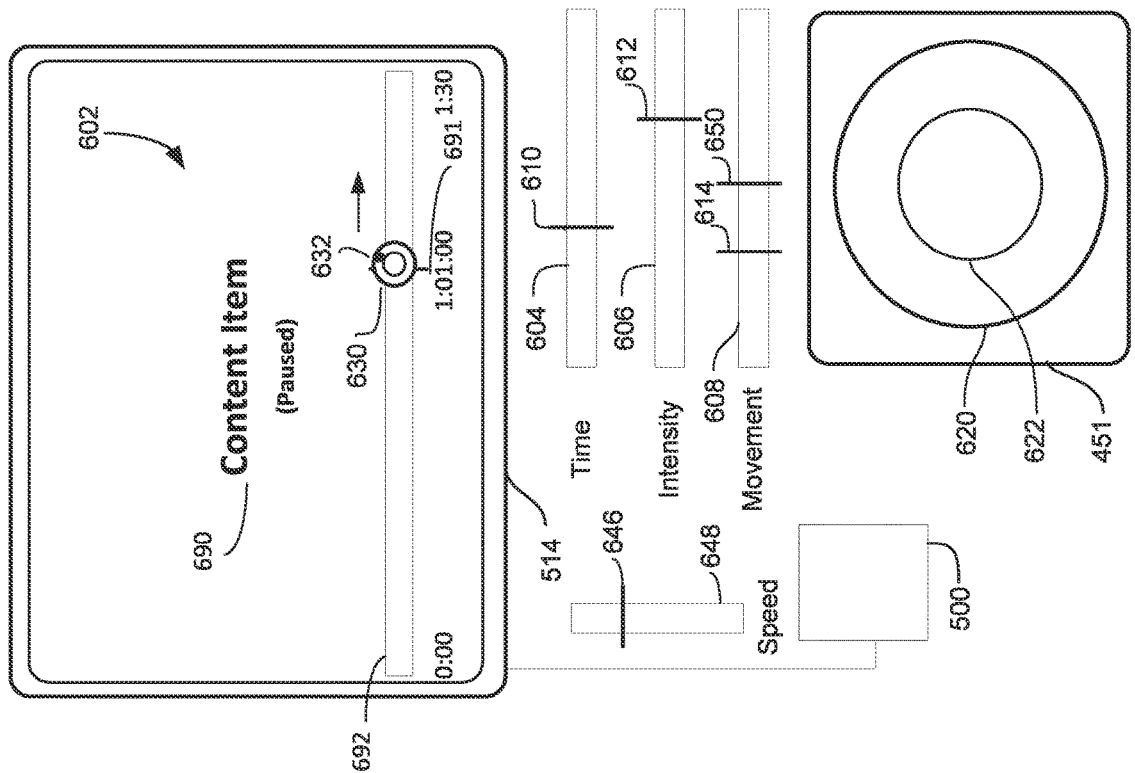

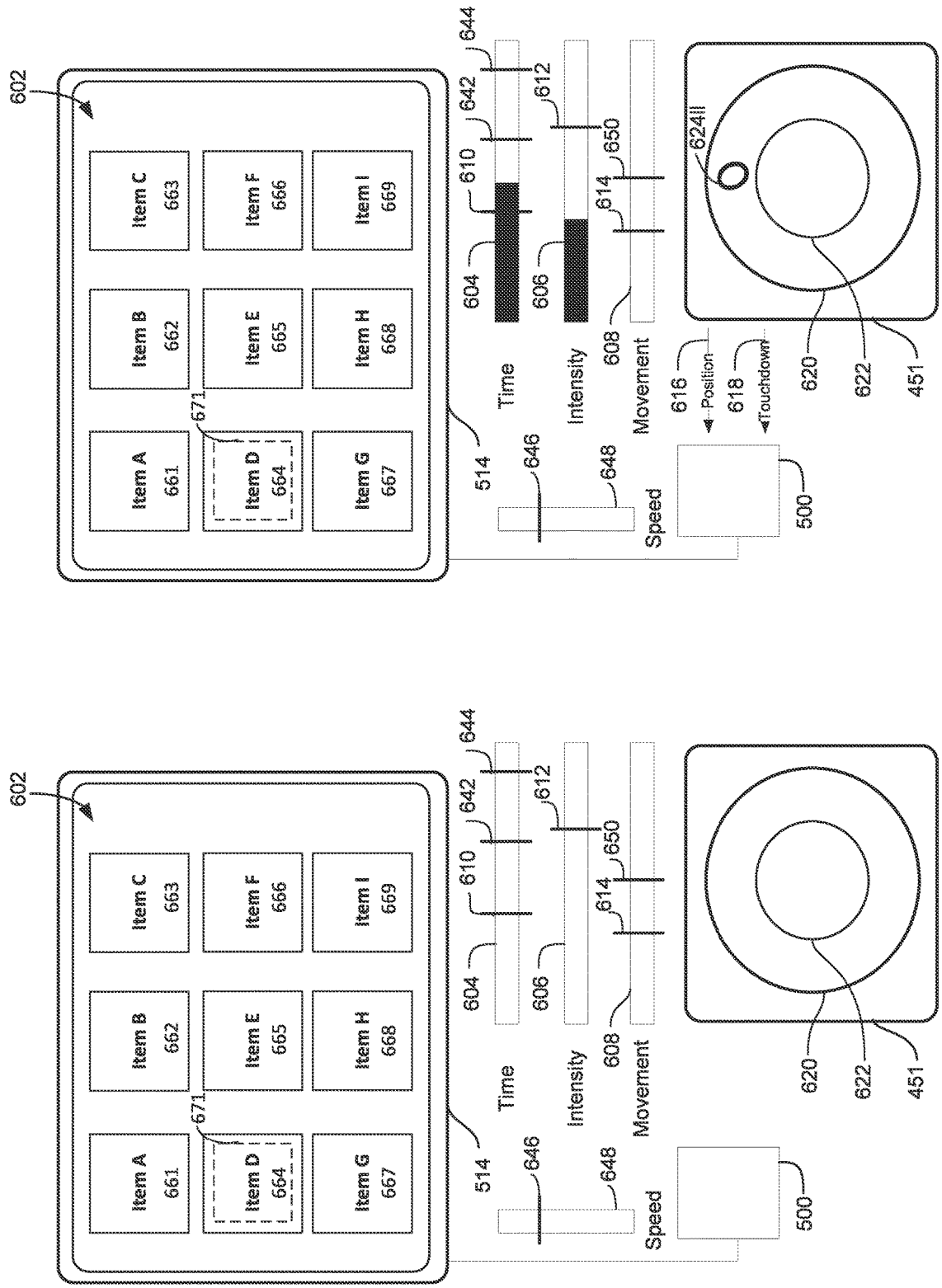

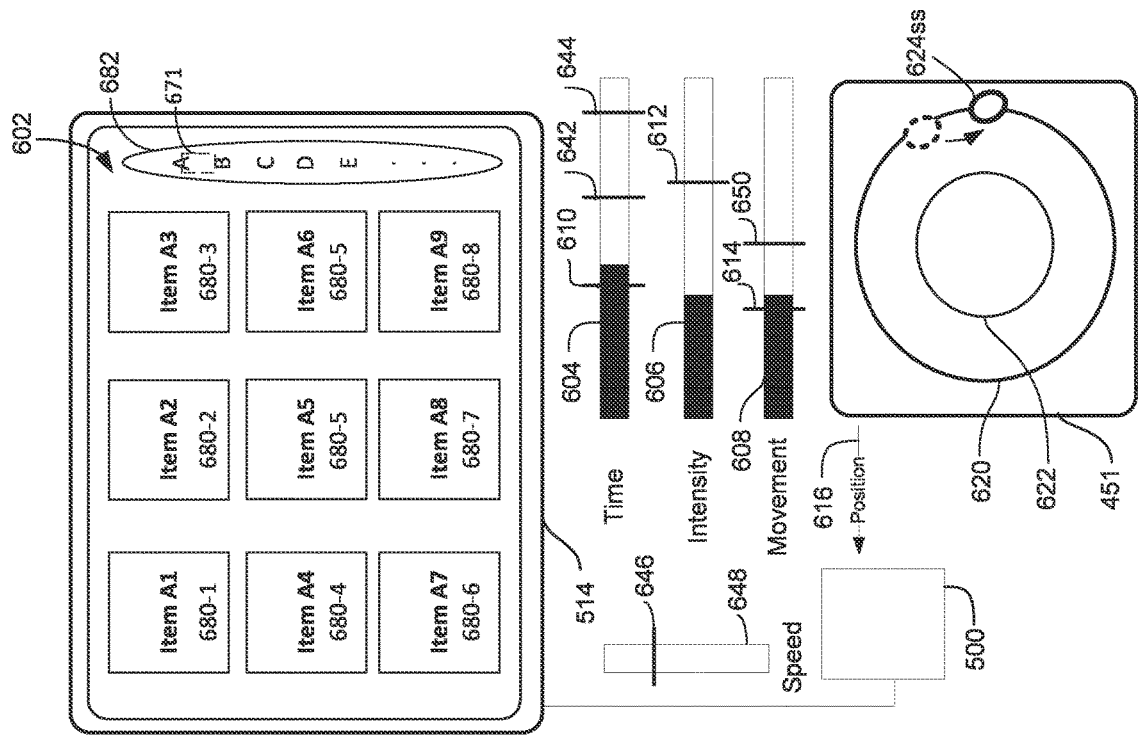
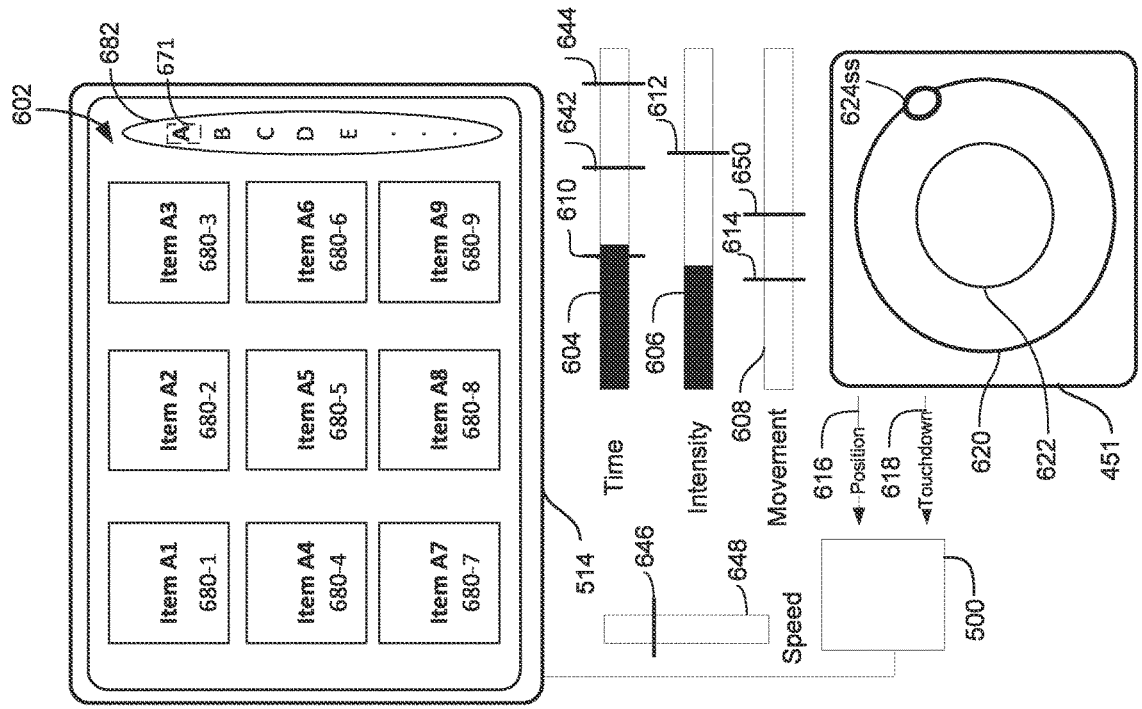

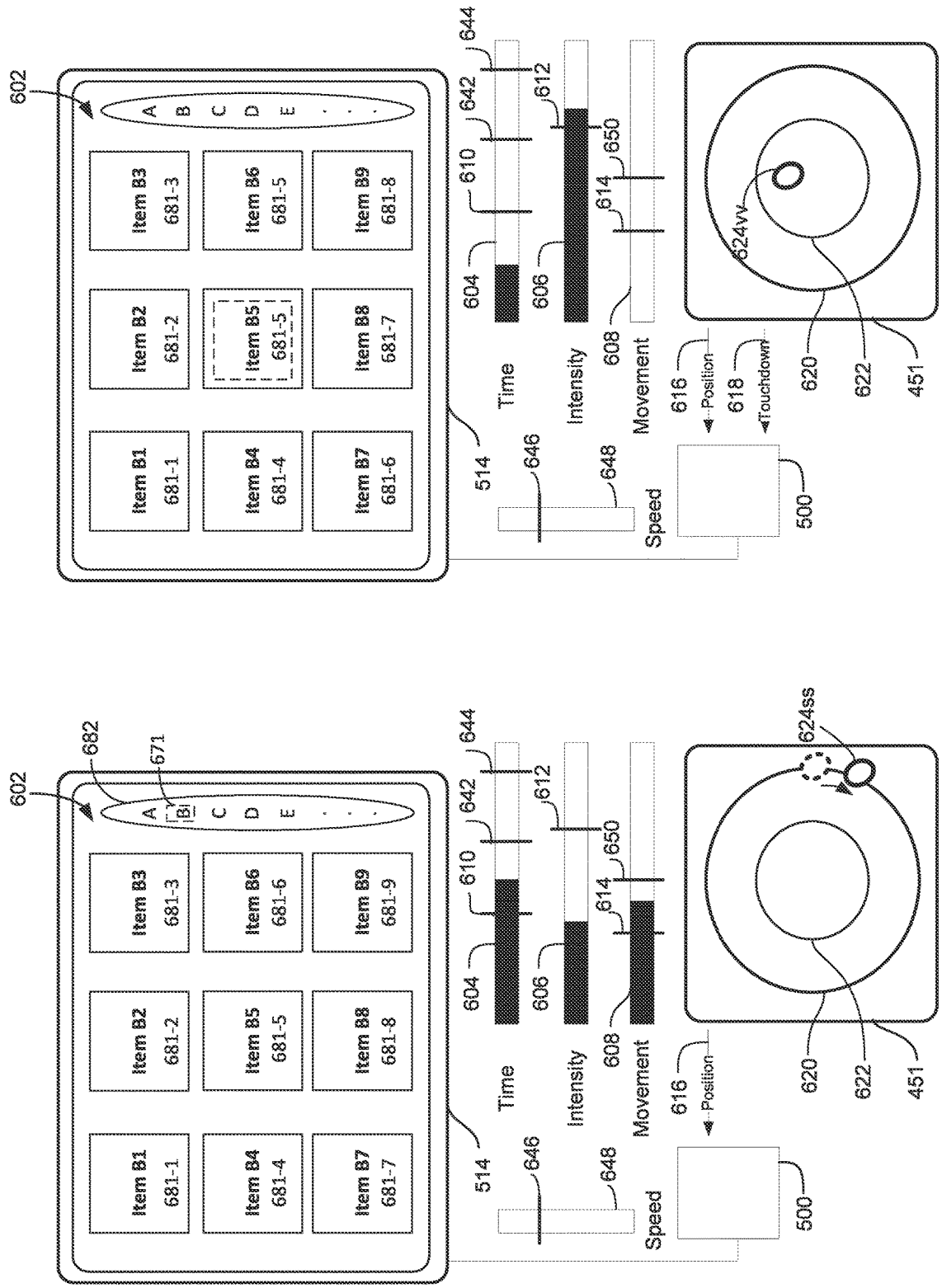

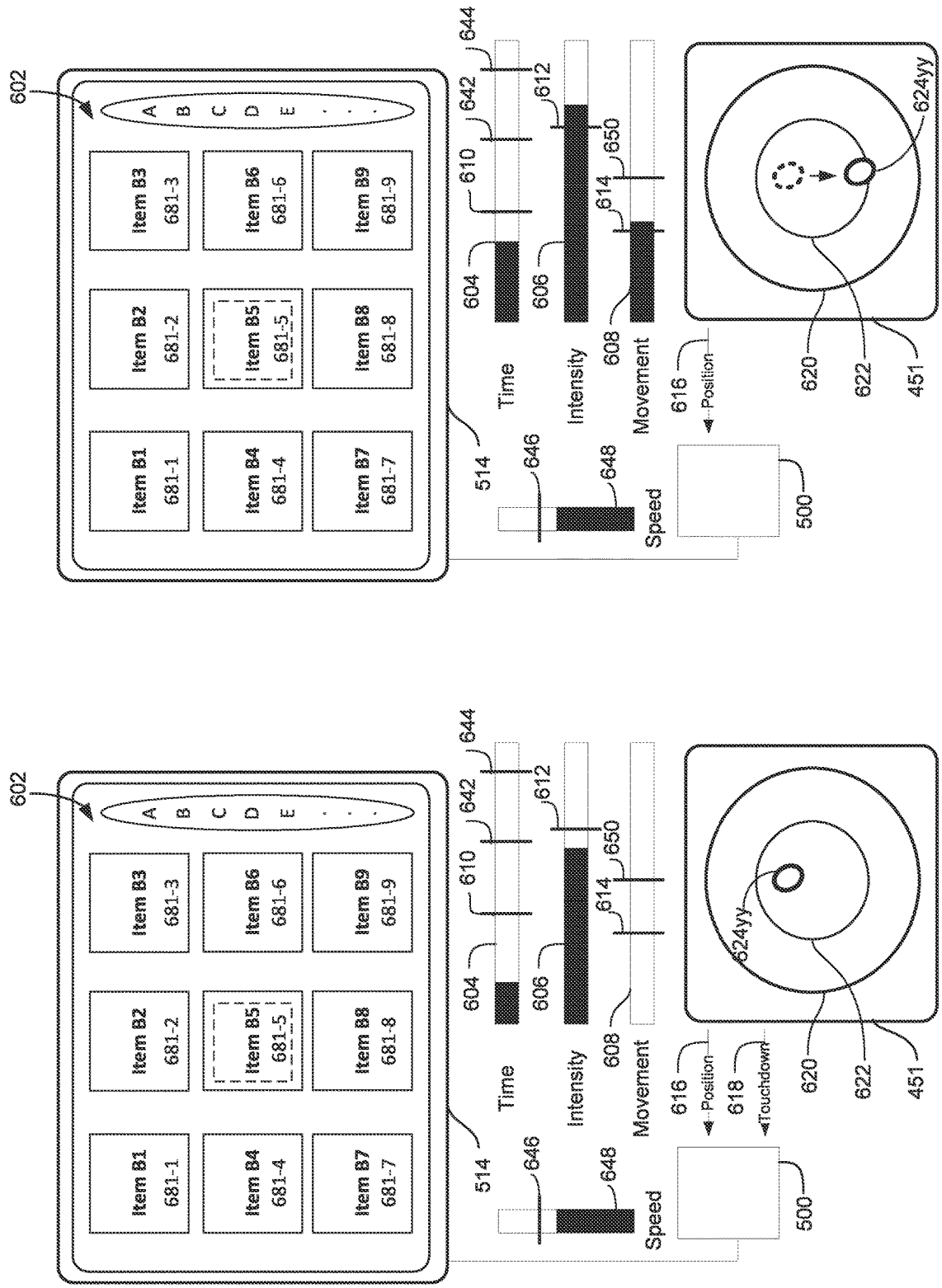

FIG. 6AAA

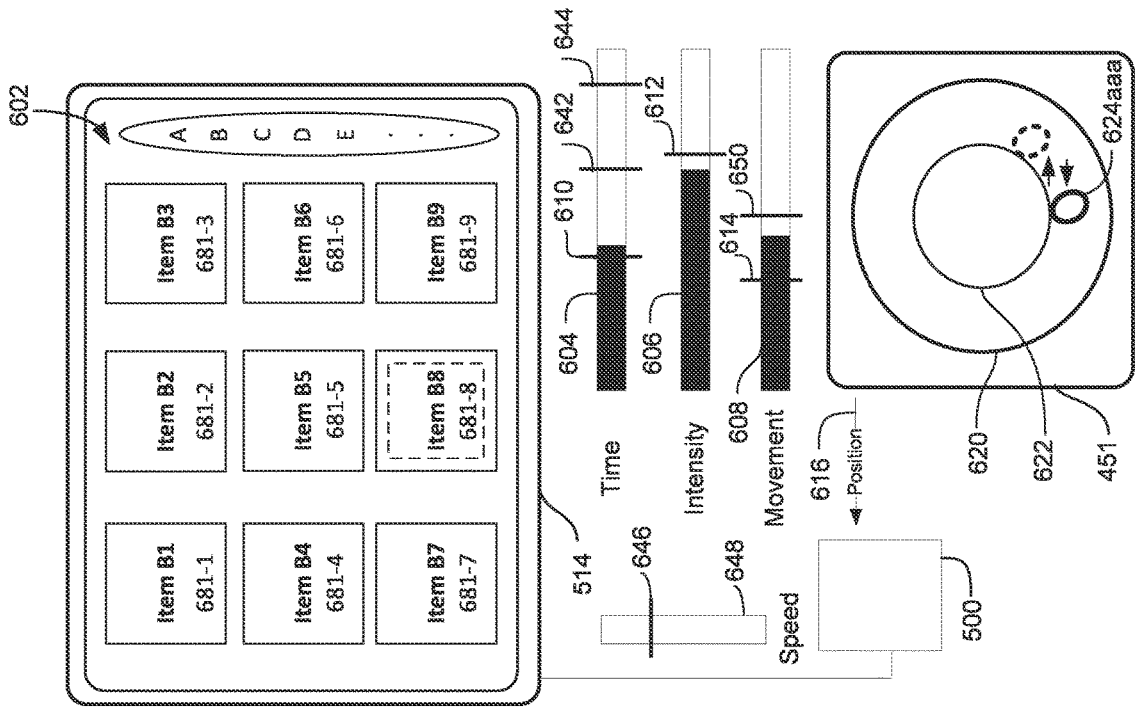
FIG. 6CCC
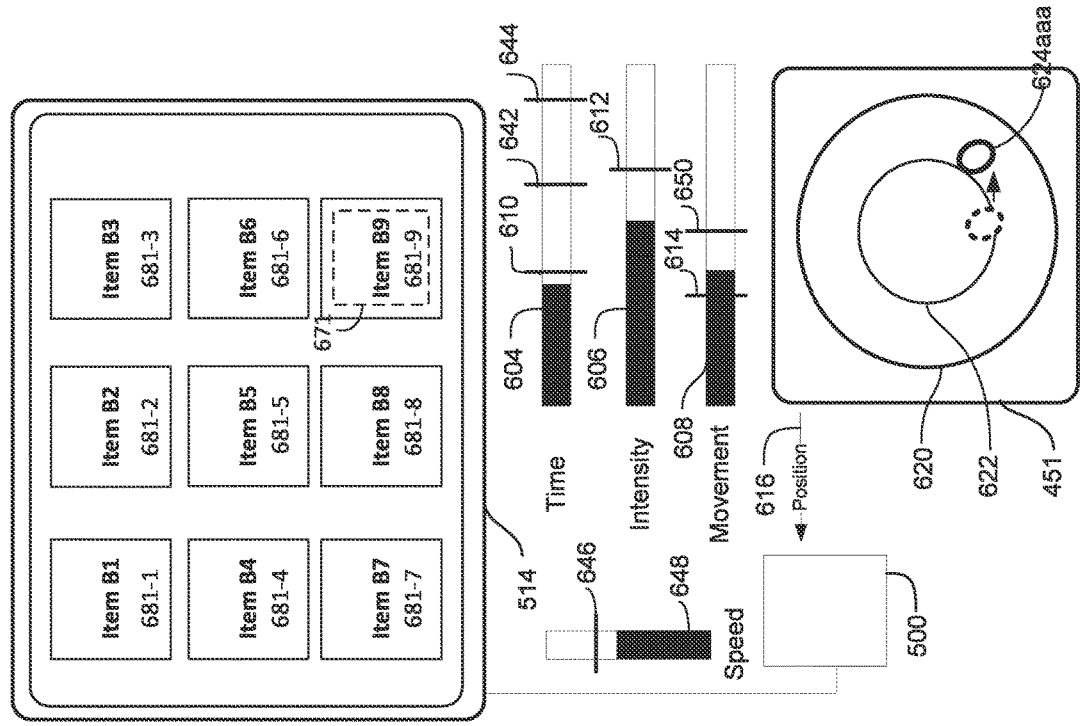
FIG. 6BBB

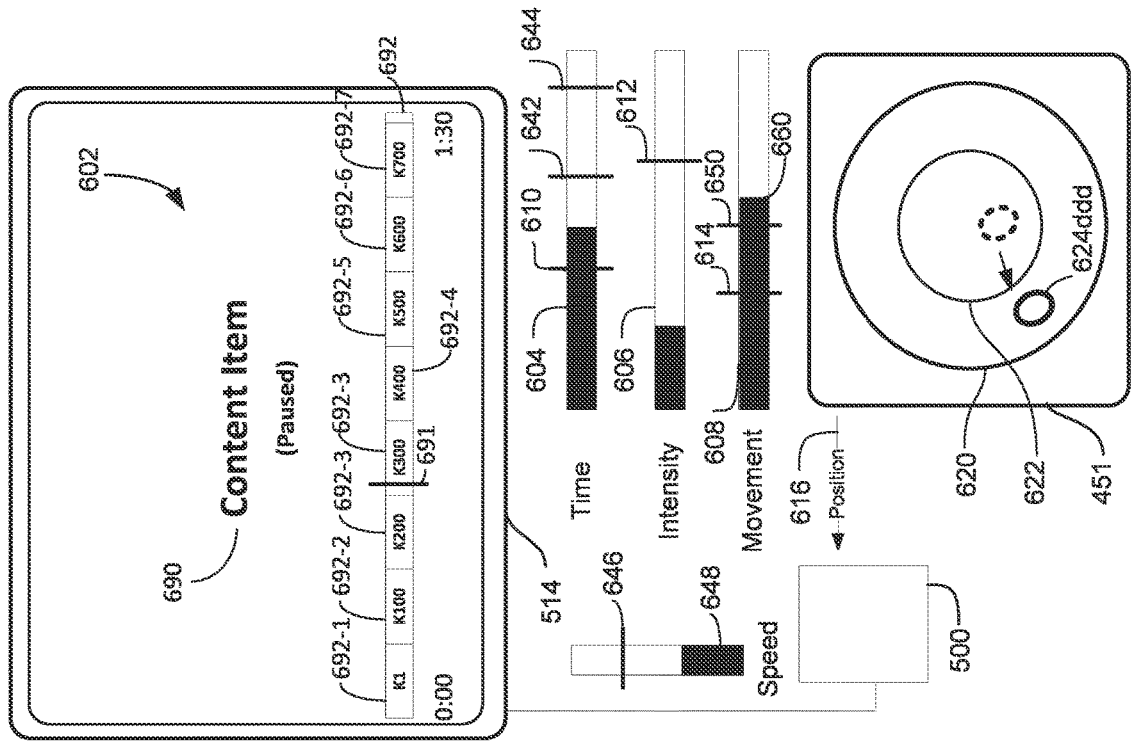
FIG. 6EEE
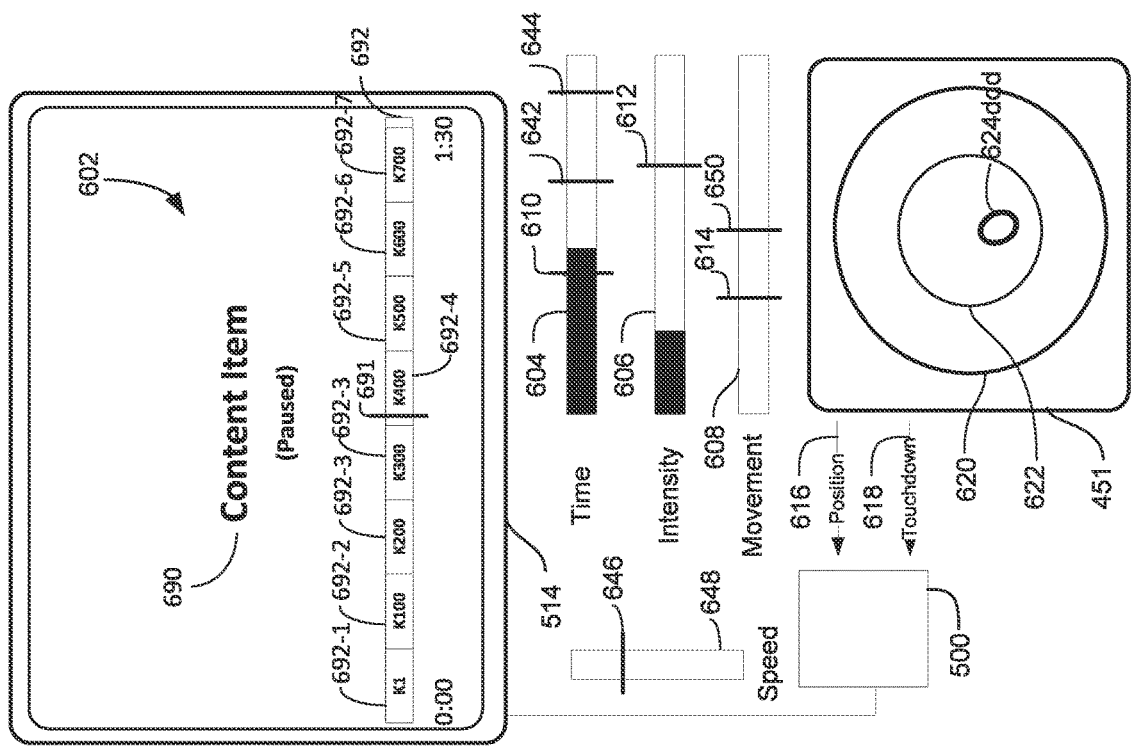
FIG. 6DDD

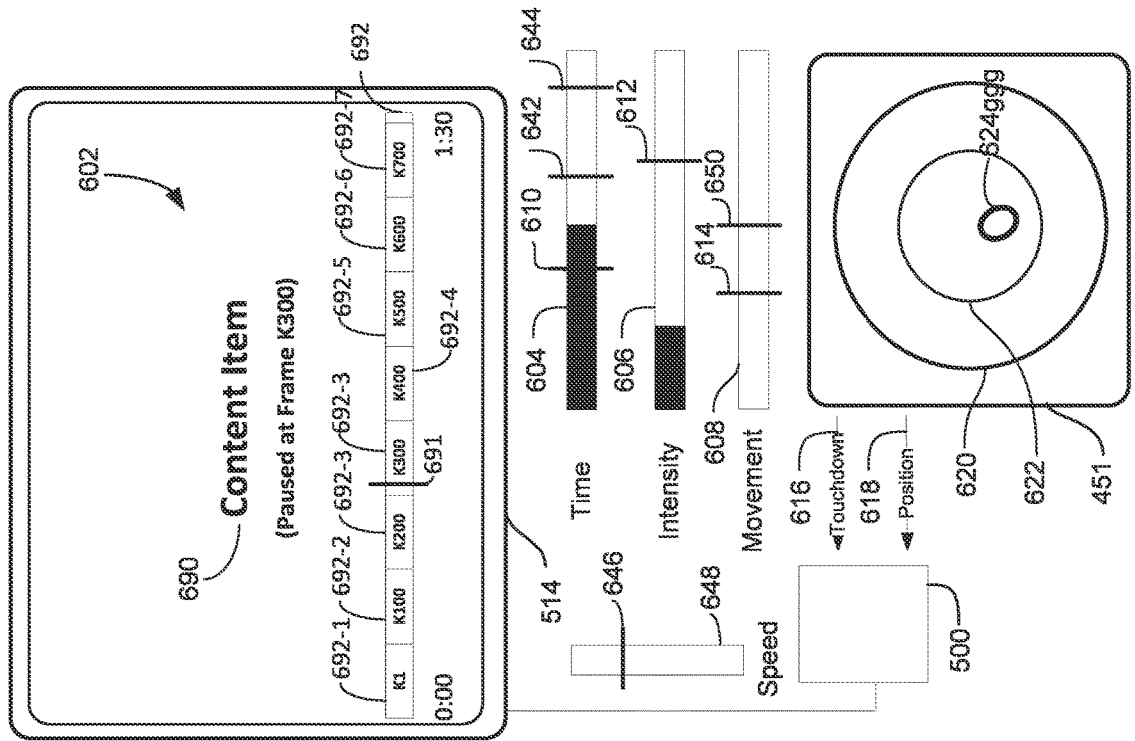
FIG. 6GGG
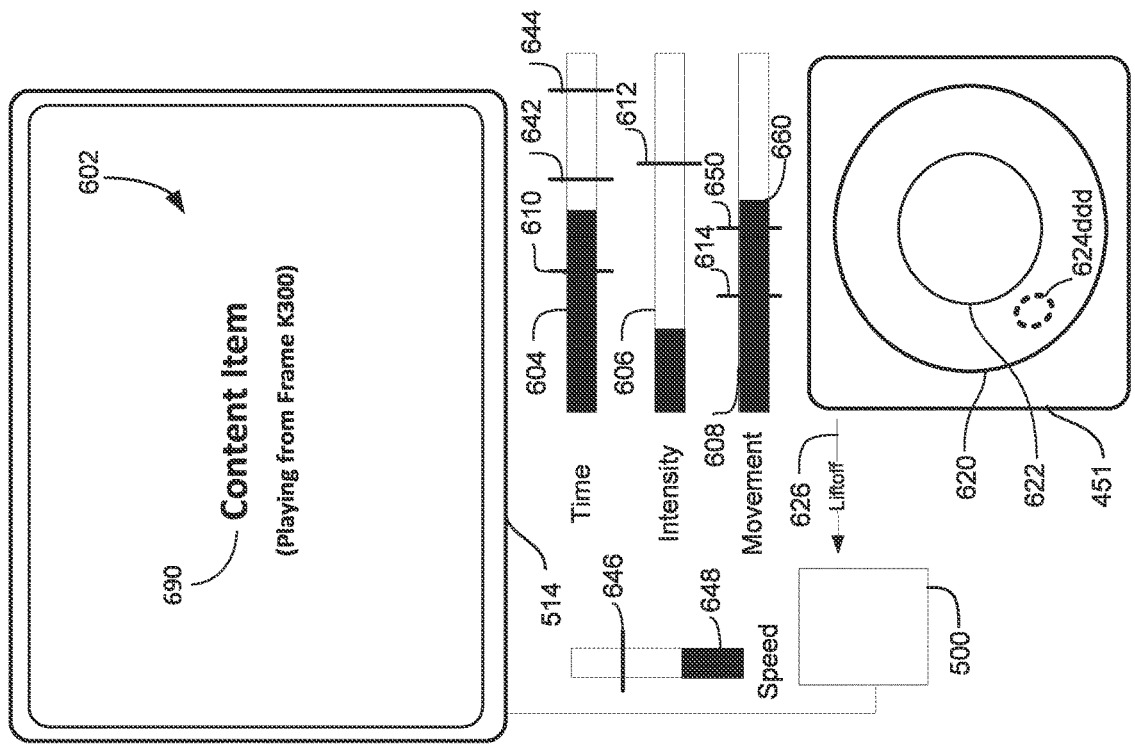
FIG. 6FFF

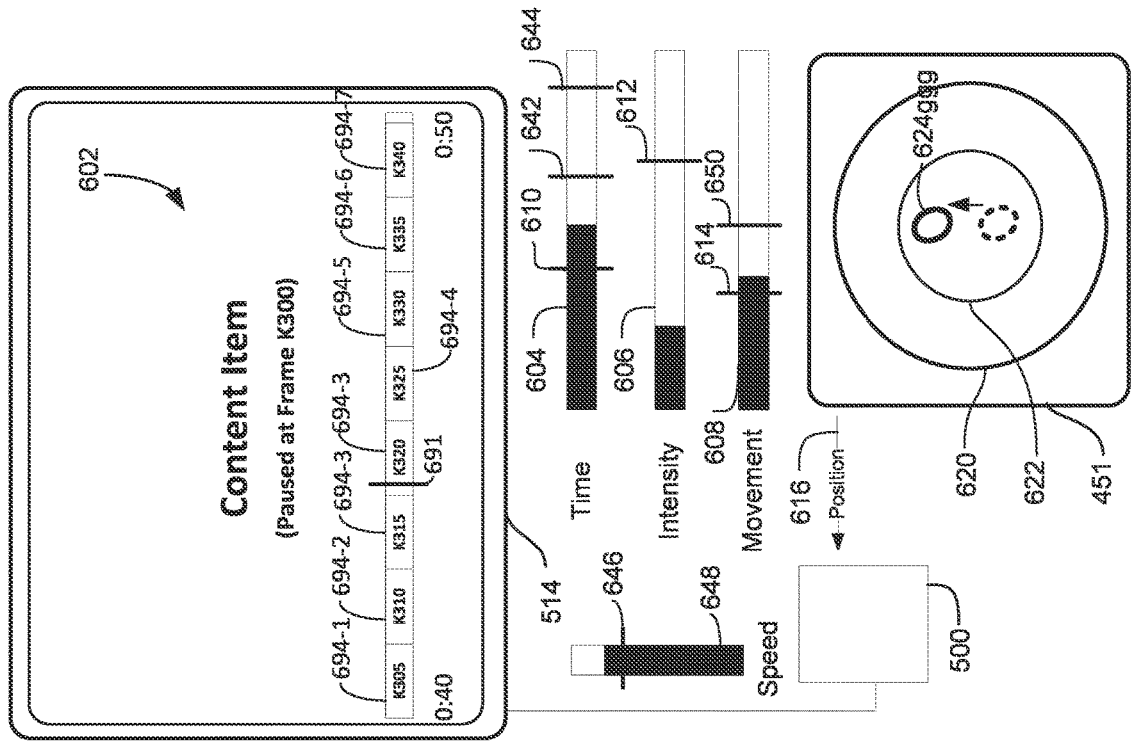
FIG. 6III
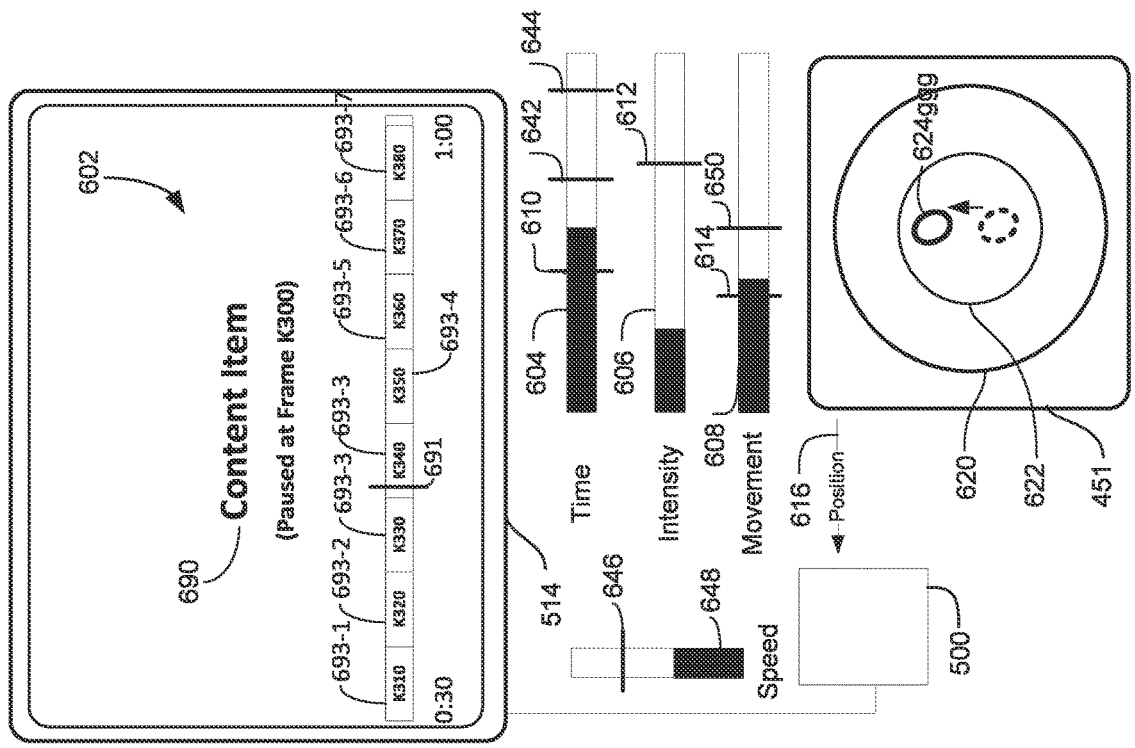
FIG. 6HHH

NAVIGATING USER INTERFACES WITH MULTIPLE NAVIGATION MODES

CROSS-REFERENCE TO RELATED APPLICATIONS

This application claims the benefit of U.S. Provisional Application No. 63/176,835, filed Apr. 19, 2021, and U.S. Provisional Application No. 63/303,014, filed Jan. 25, 2022, the contents of which are incorporated herein by reference in their entireties for all purposes.

FIELD OF THE DISCLOSURE

This disclosure relates generally to navigating user interfaces with a touch-sensitive surface.

BACKGROUND OF THE DISCLOSURE

User interaction with electronic devices has increased significantly in recent years. These devices can be devices such as computers, tablet computers, televisions, multimedia devices, or mobile devices. Sometimes a user may wish to navigate a user interface with a touch-sensitive surface and with different modes of navigation. The user may therefore desire efficient ways for switching between different modes of navigation based on touch input detected at the touch-sensitive surface.

SUMMARY OF THE DISCLOSURE

In some circumstances, a first electronic device (e.g., a set top box) can display one or more user interfaces that are configured to accept navigation input from a touch-sensitive surface and be navigated with multiple modes of navigations. Providing efficient ways of accessing different modes of navigation from the touch-sensitive surface may improve a user's experience with the first electronic and decrease user interaction time, which is particularly important where the input devices are battery-operated.

Some embodiments described in this disclosure are directed to ways of navigating user interfaces with multiple modes of navigation based on characteristics of one or more touch contacts detected on a touch-sensitive surface. Some embodiments described in this disclosure are directed to ways of accessing different modes of navigation based on a touchdown location and subsequent movement of the touch contact on the touch-sensitive surface. The full descriptions of the embodiments are provided in the Drawings and the Detailed Description, and it is understood that the Summary provided above does not limit the scope of the disclosure in any way.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
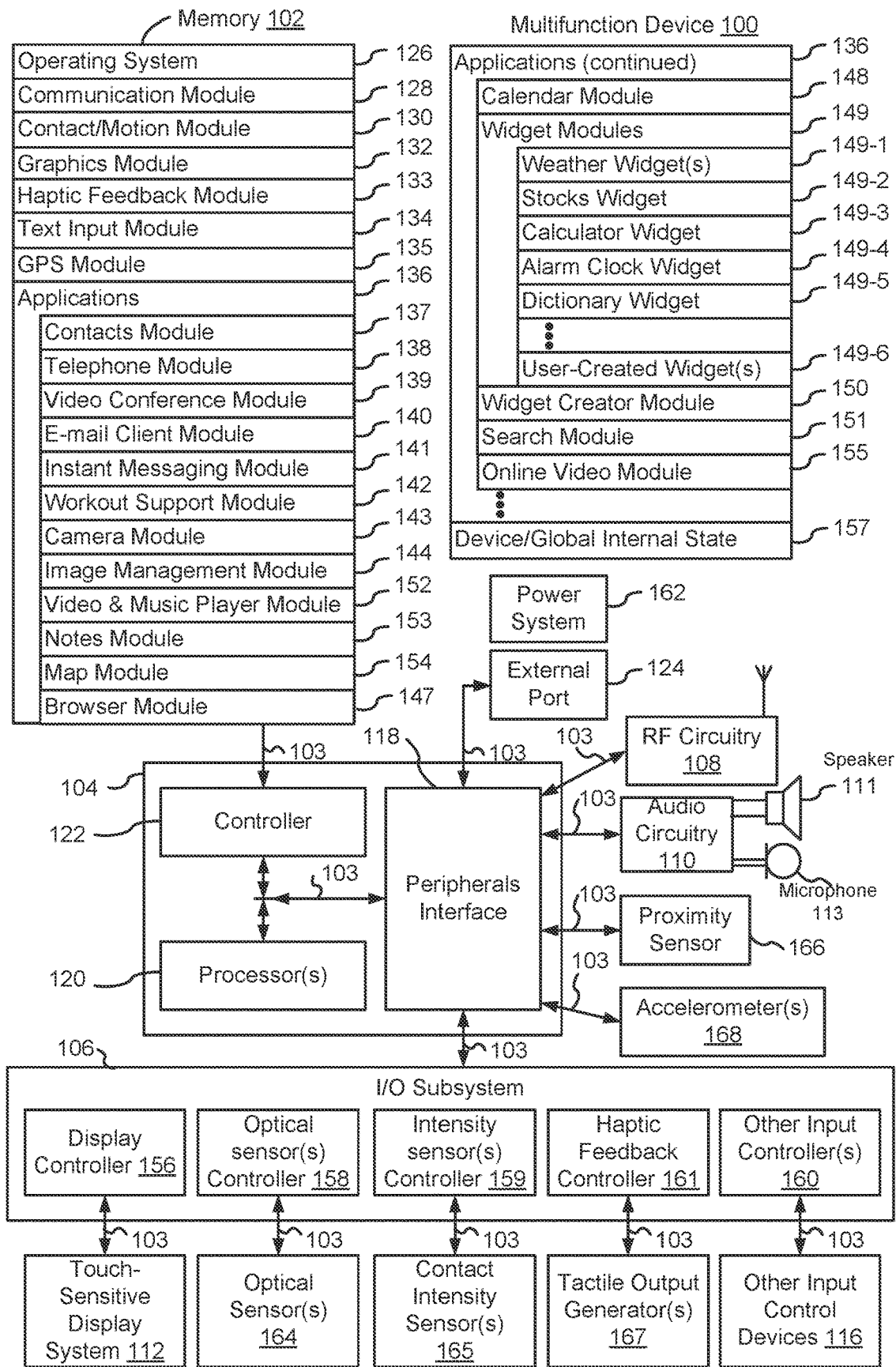
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

There is a need for navigating user interfaces with multiple modes of navigation that are accessed from a touch-sensitive surface. In some implementations, user interfaces are navigated with a first mode of navigation when a touch contact on the touch-sensitive surface touches down in a first region of the touch-sensitive surface. In some implementations, user interfaces are navigated with a second mode of navigation when a touch contact on the touch-sensitive surface touches down in the first region and subsequently moves to a second region of the touch-sensitive surface. Such switching of navigation modes provides efficient ways of accessing different modes of navigation with the same touch contact. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

EXEMPLARY DEVICES

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
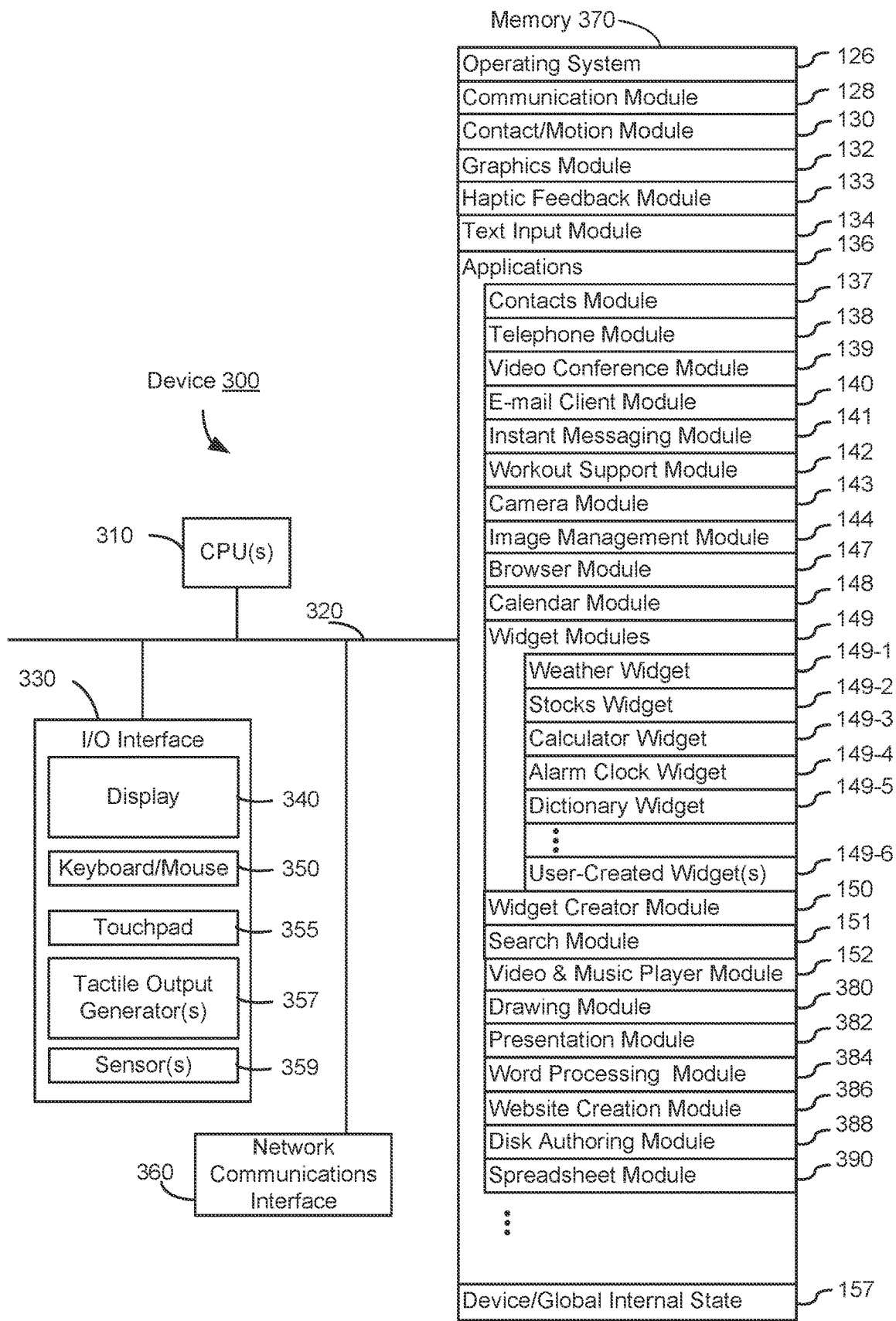
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module;
- music player module;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module and music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
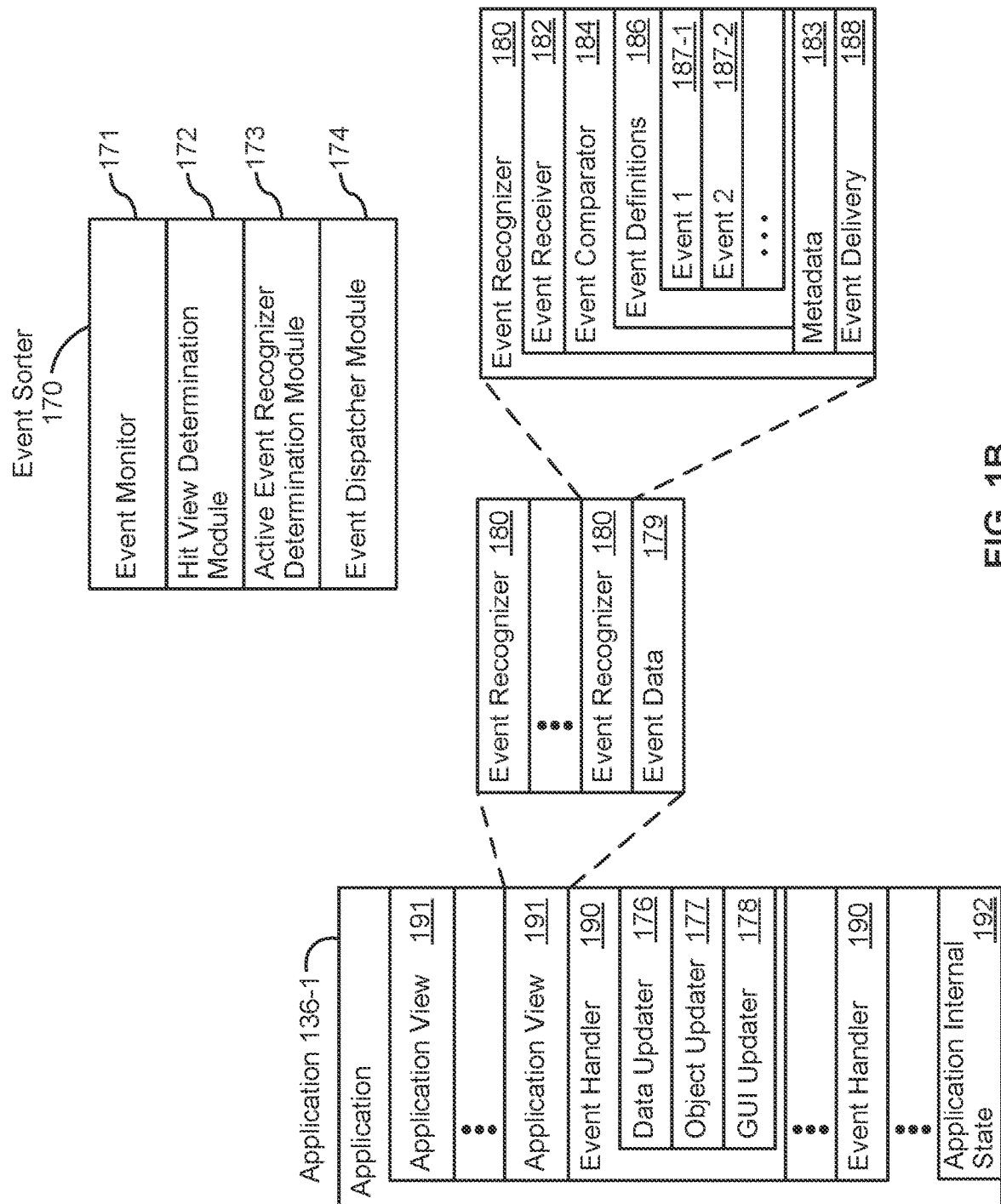
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
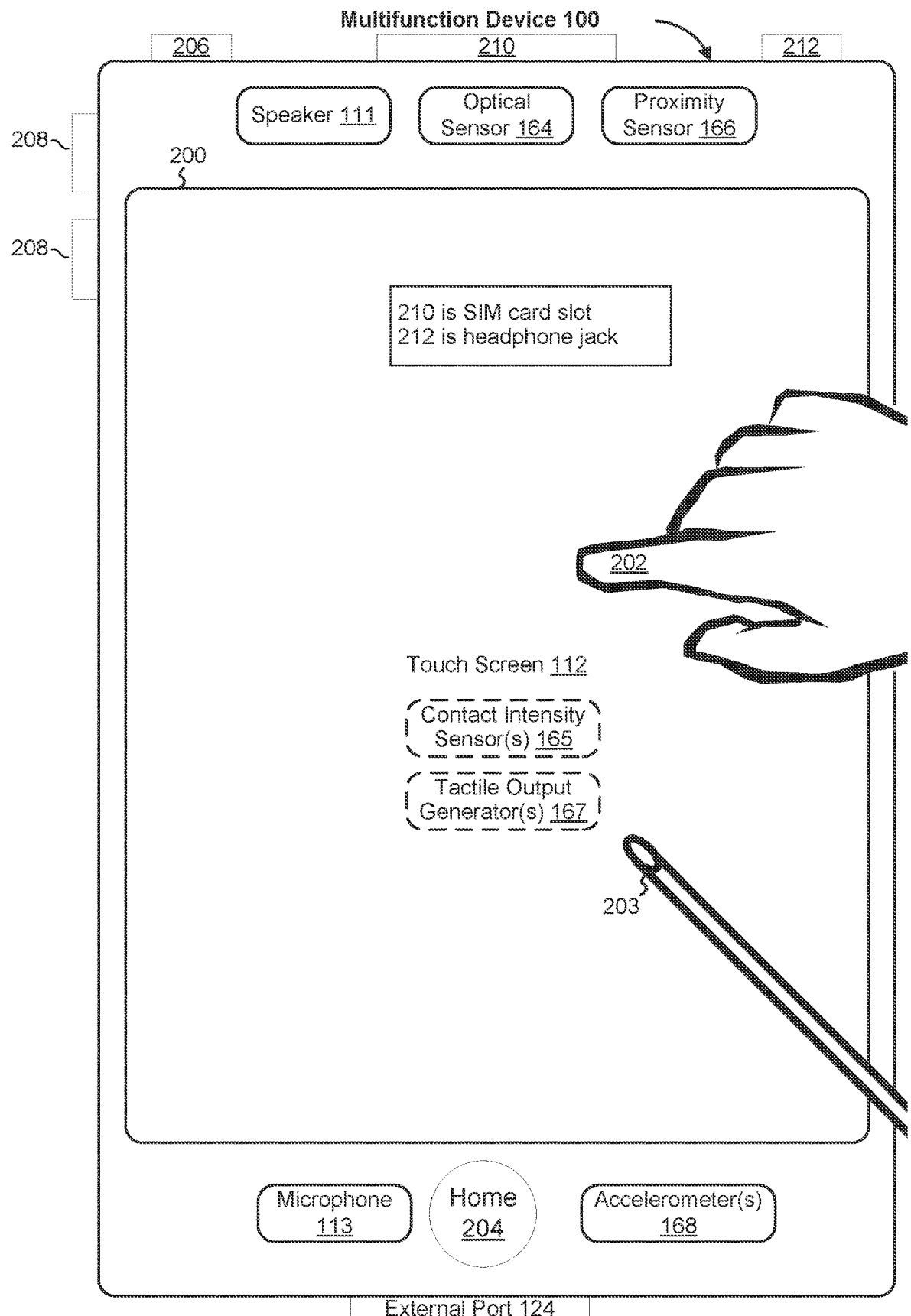
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
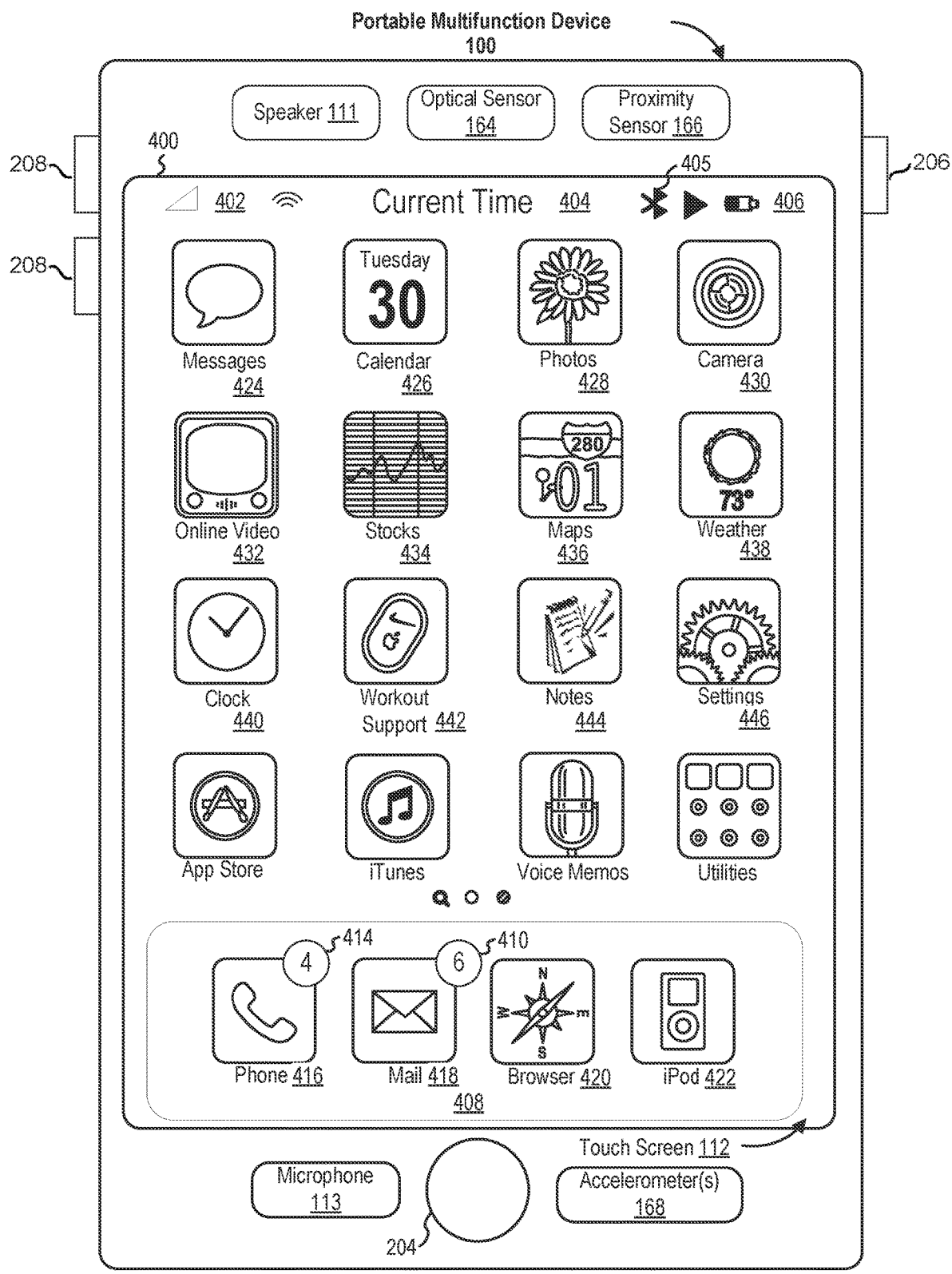
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
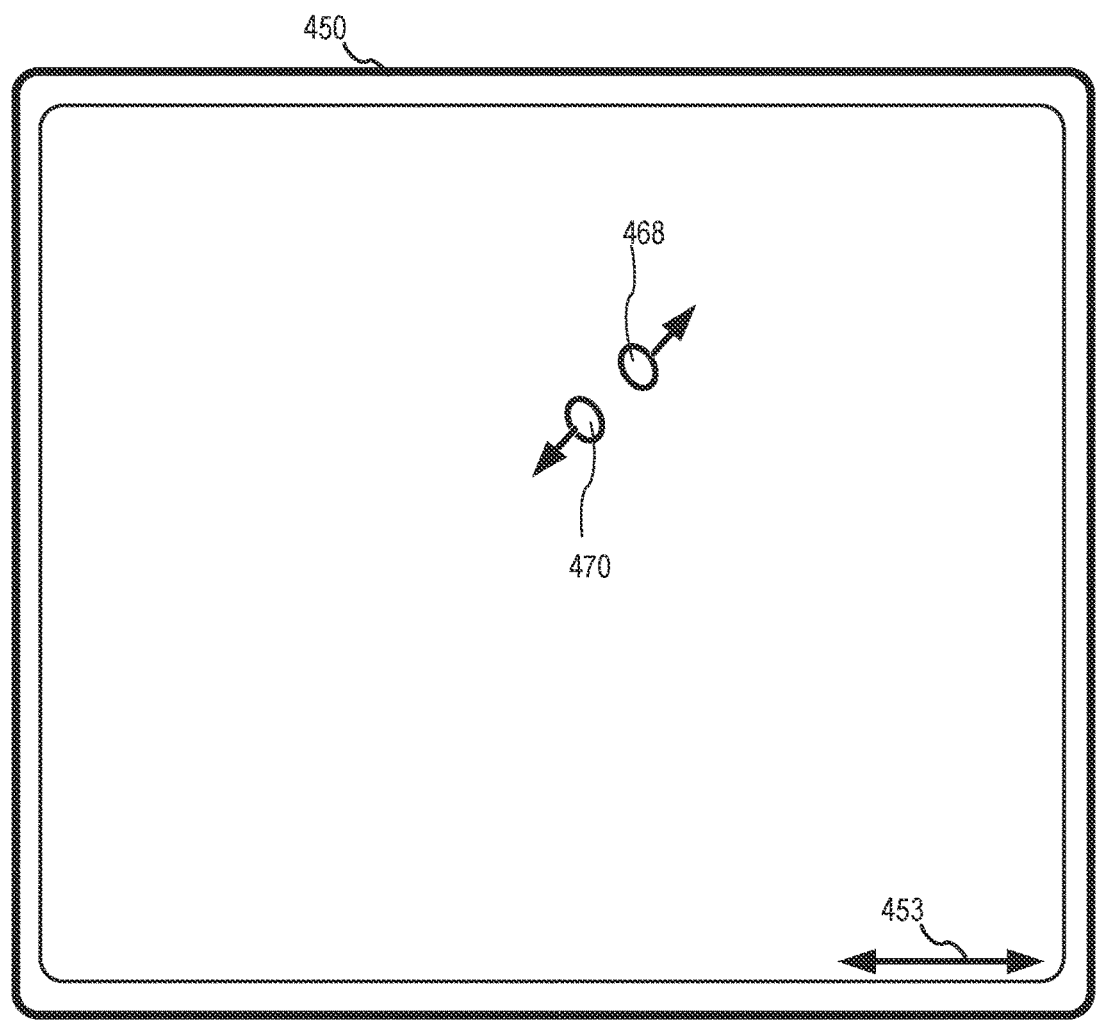
FIG. 4B illustrates an exemplary user interface for a multifunction device with a touch-sensitive surface that is separate from the display in accordance with some embodiments.
Figure 4B:
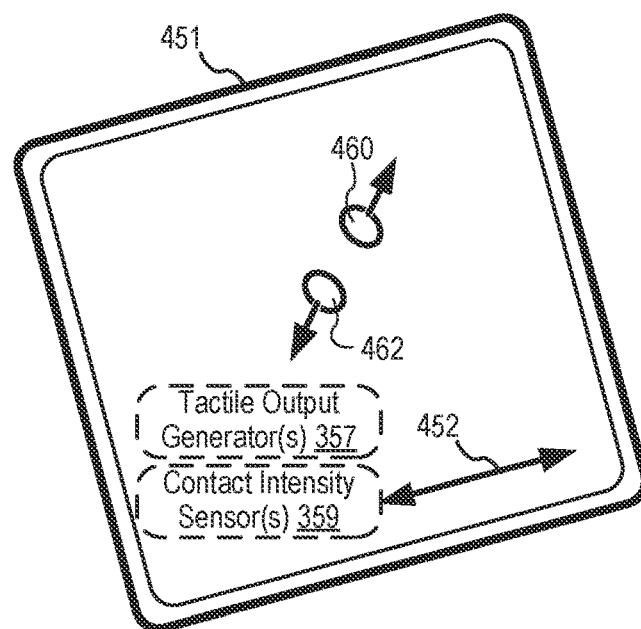

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
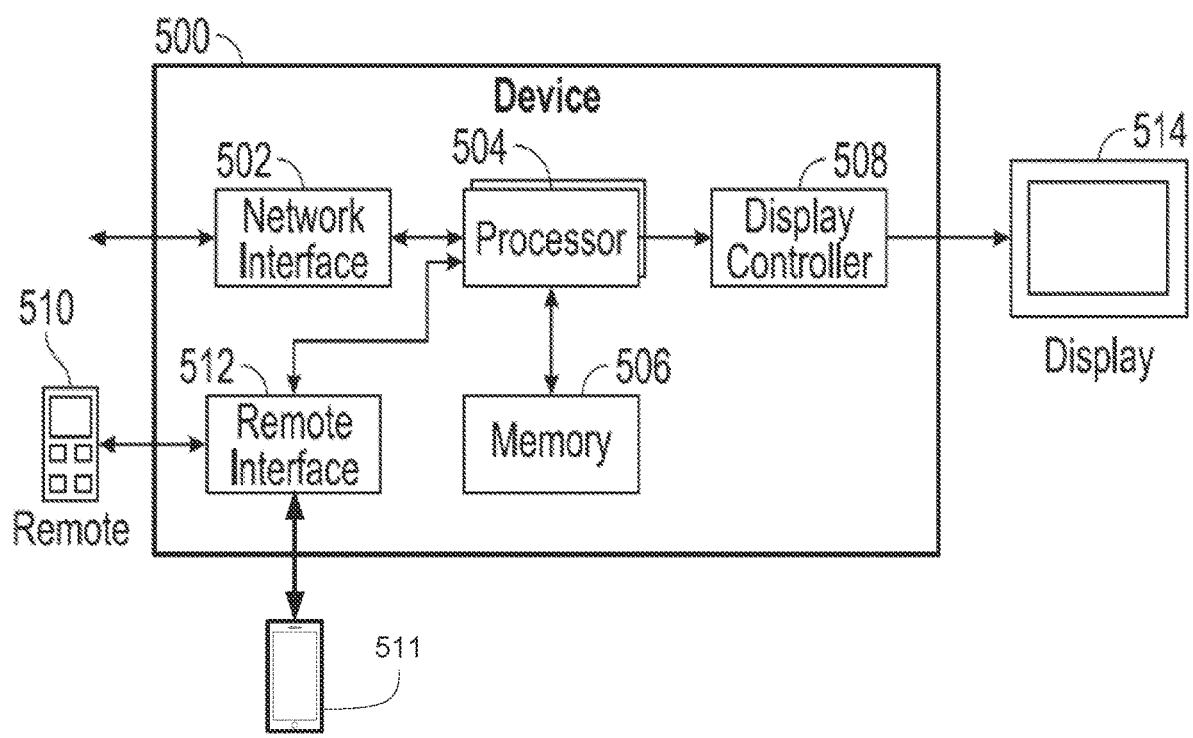
FIGS. 5A-5C illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., method 700).

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multi-function device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4B; and, display 514 optionally corresponds to one or more of touch-sensitive display system 112 in FIGS. 1A and 2, and display 340 in FIG. 3.

Figure 5B:
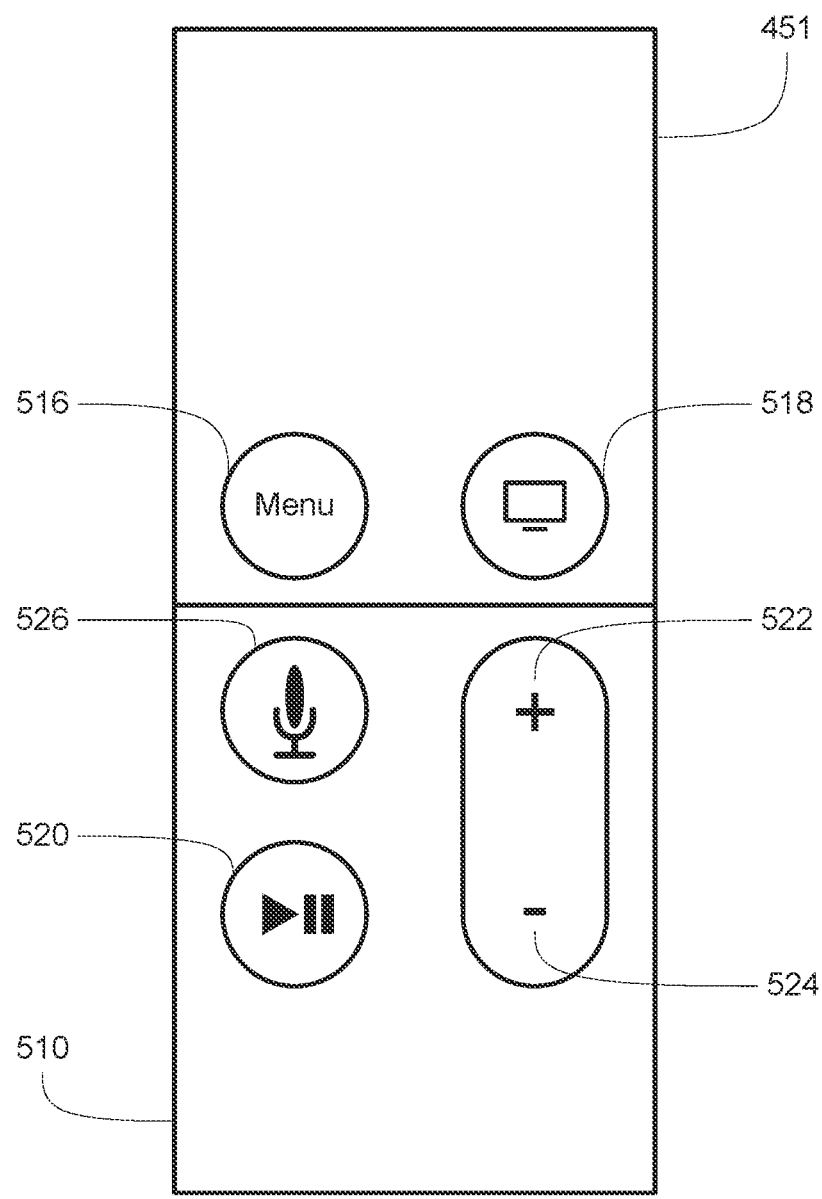

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5B). Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524 and 526. Buttons 516, 518, 520, 522, 524 and 526 are optionally mechanical buttons or mechanical button alternatives that are able to sense contact with, or depression of, such buttons to initiate corresponding action(s) on, for example, device 500. In some embodiments, selection of "menu" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 518 by a user navigates device 500 to a main, home, or root user interface from any user interface that is displayed on device 500 (e.g., to a home screen of device 500 that optionally includes one or more applications accessible on device 500). In some embodiments, selection of the "home" button 518 causes the electronic device to navigate to a unified media browsing application. In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote.

Figure 5C:
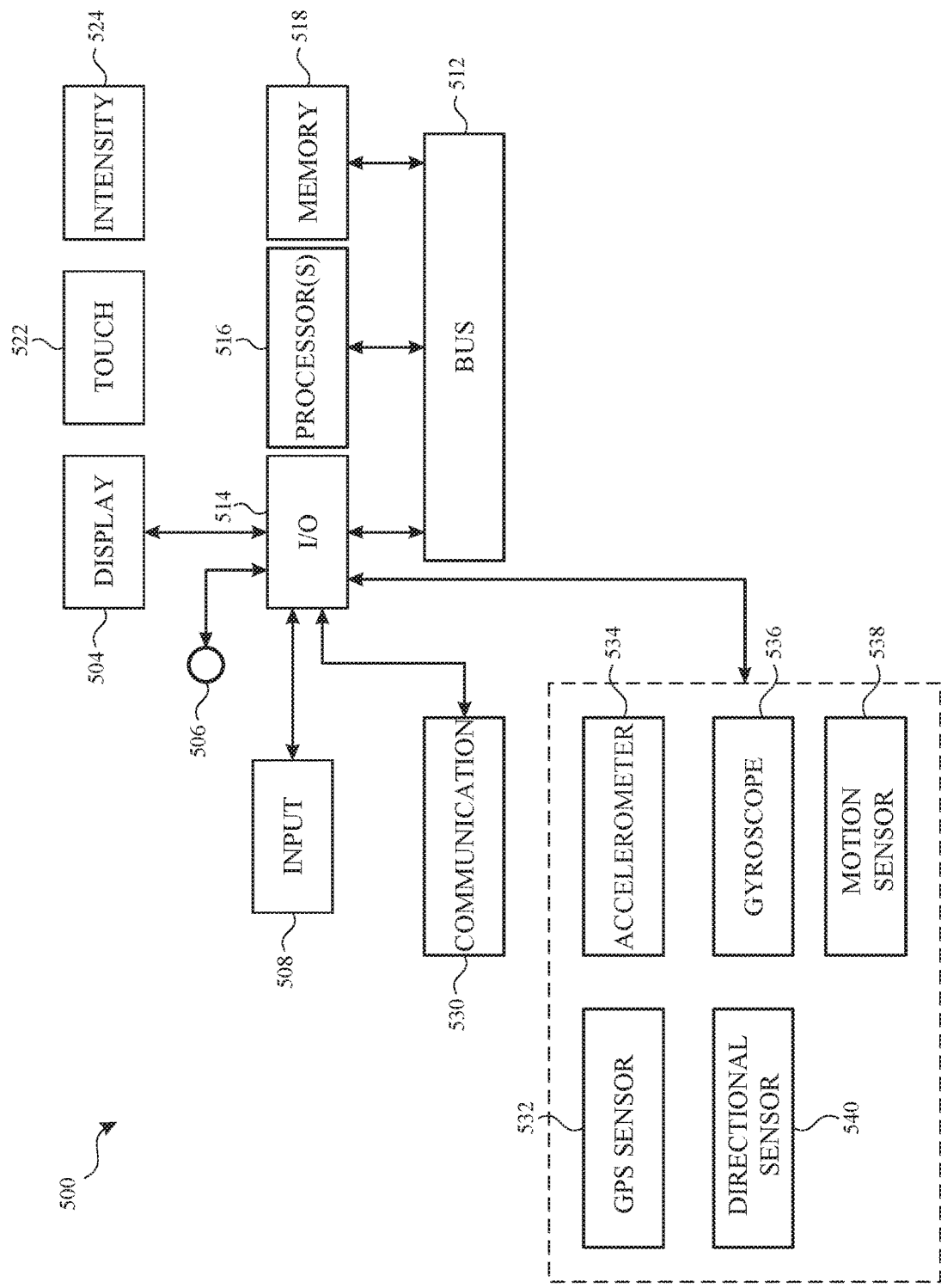

FIG. 5C depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes described with reference to FIGS. 6-11. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5C, but can include other or additional components in multiple configurations.

In some embodiments, electronic device 500 includes one or more tactile output generators, where the one or more tactile output generators generate different types of tactile output sequences, as described below in Table 1. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:
 an active application, which is currently displayed on a display screen of the device that the application is being used on;
 a background application (or background processes), which is not currently displayed, but one or more processes for the application are being processed by one or more processors; and
 a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

One or more of the embodiments disclosed herein optionally include one or more of the features disclosed in the following patent applications: "User Interfaces For Interacting with Channels that Provide Content that Plays in a Media Browsing Application" Ser. No. 62/822,952, filed Mar. 24, 2019, "User Interfaces For a Media Browsing Application" Ser. No. 62/822,948, filed Mar. 24, 2019, and "User Interface Specific to Respective Content Items" Ser. No. 62/822,966, filed Mar. 24, 2019, each of which is hereby incorporated by reference.

Attention is now directed towards embodiments of user interfaces ("UP") and associated processes that are implemented on an electronic device, such as portable multifunction device 100, device 300, or device 500.

User Interfaces and Associated Processes

Accessing Multiple Modes of User Interface Navigation

Users wish to navigate users interfaces that include may types of content, including media content and/or selectable content. In some circumstances, navigating a user interface with a first mode of navigation allows the user to more efficiently complete a navigation task, and in other circumstances navigating the user interface with a second mode of navigation allows the user to more efficiently complete a different navigation task. Using a touch-sensitive surface to access the different modes of navigation provides an efficient way for a user to more quickly complete the desired navigation task, thus reducing the amount of time a user needs to perform operations with the electronic device, and reducing the power usage of the electronic device, which increases battery life for battery-powered devices. It is understood that people use devices. When a person uses a device, that person is optionally referred to as a user of the device.

FIGS. 6A-6III illustrate exemplary ways of navigating user interfaces with a touch-sensitive surface in accordance with some embodiments of the disclosure. The embodiments in these figures are used to illustrate the processes described below, including the processes described with reference to FIG. 7. Although FIGS. 6A-6III illustrate various examples of ways an electronic device is able to perform the processes described below with reference to FIG. 7, it should be understood that these examples are not meant to be limiting, and the electronic device is able to perform one or more processes described below with reference to FIG. 7 in ways not expressly described with reference to FIGS. 6A-6III.

FIGS. 6A-6D illustrate an exemplary way of pausing playback of a media content item when a tap (e.g., selection) event is detected in the inner (e.g., circular) touch region of a touch-sensitive surface. In some embodiments, the touch-sensitive surface detects a tap event in the inner region when a touchdown and liftoff of a touch contact occur within a threshold amount of time of one another, without the touch contact moving more than a threshold amount or having an intensity greater than an intensity threshold, as will be described below.

Figure 6B:
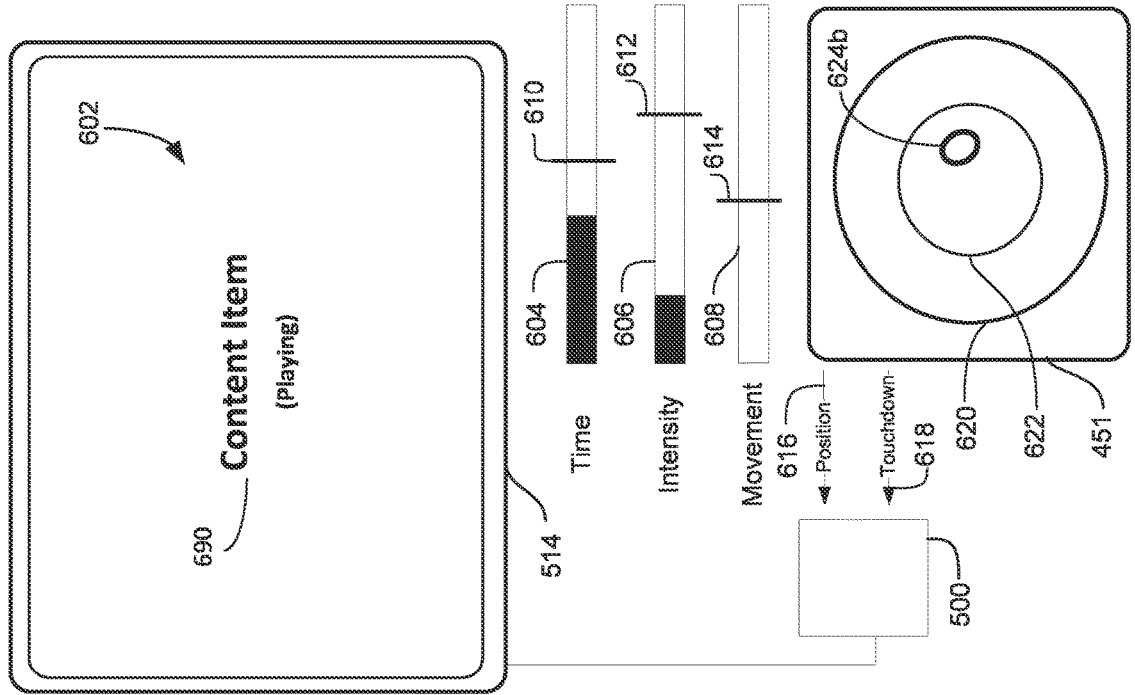
FIGS. 6A-6III illustrate exemplary ways of navigating user interfaces with a touch-sensitive surface in accordance with some embodiments of the disclosure.
Figure 6A:
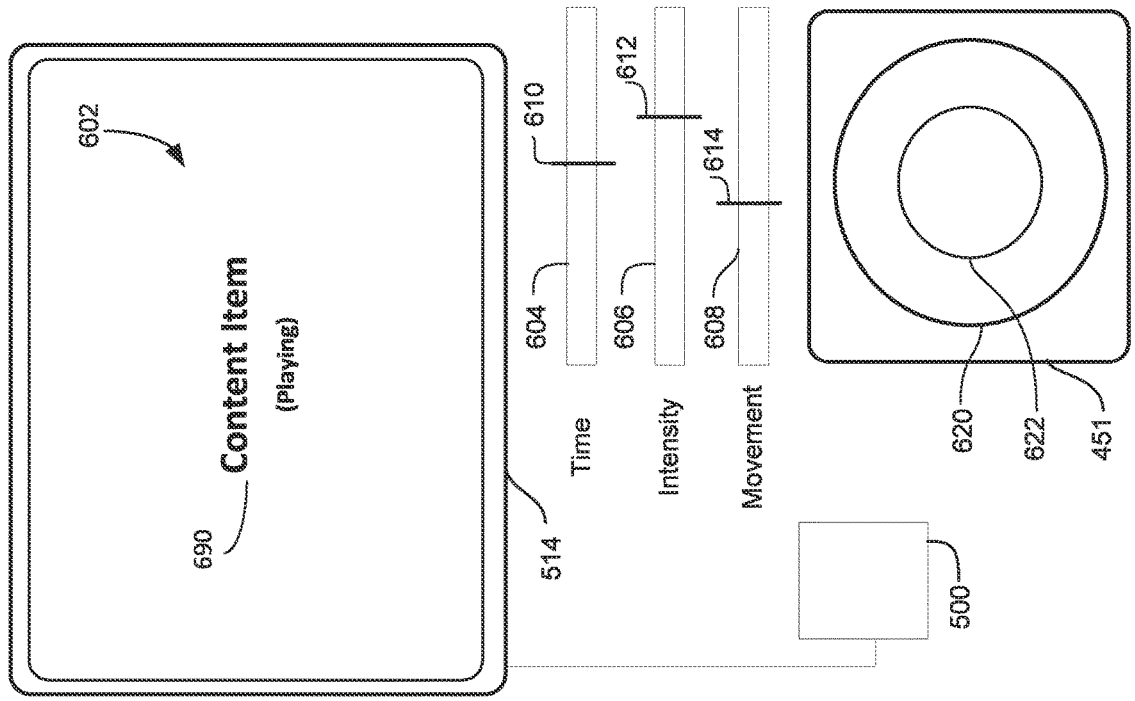

FIG. 6A illustrates exemplary display 514. Display 514 optionally displays one or more user interfaces that include various content and user interface elements/controls displayed by device 500. In the example illustrated in FIG. 6A, display 514 displays a user interface 602 running on an electronic device (e.g., electronic device 500 of FIG. 5A) of which display 514 is a part of, or to which display 514 is connected. The user interface 602, illustrated in FIG. 6A, includes media content item 690 (e.g., a movie, TV show, song, etc.), which is currently playing on electronic device 500. Media content item 690 is optionally controlled/navigated by a dedicated remote control (e.g., remote 510 in FIG. 5B), such as via a click of a button on the remote control (e.g., volume adjustment buttons 522 and 524, play/pause buttons 520) or by touch input detected on a touch-sensitive surface 451 of the remote control or a separate electronic device (e.g., such as device 511 in FIG. 5B). The touch-sensitive surface 451 shown in FIG. 6A, includes outer circular touch region 620 and inner circular touch region 622 (e.g., regions of a single touch-sensitive surface 451, or separate touch-sensitive surfaces corresponding to inner 622 and outer 620 regions). In some embodiments, the touch-sensitive surface 451 only includes the outer circular touch region 620 and inner circular touch region 622 (e.g., and does not include areas outside of outer circular touch region 620). Alternatively, in some embodiments, the touch-sensitive surface optionally includes additional touch-sensitive areas other than outer circular touch region 620 and inner circular touch region 622, as shown in FIG. 6A (e.g., inner and outer circular touch region 620 and 622 do not occupy the entire area of touch-sensitive surface 451). In some embodiments, inner region 622 and outer region 620 are not visually distinguished from one another on touch-sensitive surface 451; in some embodiments, inner region 622 and outer region 620 are visually distinguished from one another on touch-sensitive surface 451 (e.g., are visually separated by a visible line between the two regions, have different visual designs or appearances, etc.).

As will be described in greater detail below, user interface 602 is navigated in accordance with characteristics of touch contacts detected on the touch-sensitive surface 451, including, but not limited to, a duration of time a touch contact has been on the touch-sensitive surface 451 (indicated by time duration bar 604 and time threshold 610) (e.g., amount of time between touchdown and liftoff of the touch contact on the touch-sensitive surface 451), an intensity of a touch contact (indicated by intensity bar 606 and intensity threshold 612) (e.g., an intensity corresponding to a finger resting on the touch-sensitive surface 451), and a magnitude of movement of a touch contact (indicated by movement bar 608 and movement threshold 614) (e.g., an amount the touch contact moves on the touch-sensitive surface 451). In some embodiments, one or more of these characteristics of the touch contacts are detected and/or analyzed by touch-sensitive surface 451 (e.g., or the device including touch-sensitive surface, such as remote 510) or device 500, or both by touch-sensitive surface 451 (e.g., or the device including touch-sensitive surface, such as remote 510) and device 500. Therefore, it is understood that the various descriptions of detecting and/or analyzing touch contacts described herein can be performed by touch-sensitive surface 451 (e.g., or the device including touch-sensitive surface, such as remote 510) or device 500, or both. Further, it is understood that the various descriptions of touch-sensitive surface 451 transmitting information to device 500 can include touch-sensitive surface 451 transmitting information to device 500, the device including touch-sensitive surface 451 transmitting information to device 500, and/or device 500 that includes touch-sensitive surface 451 obtaining such information from touch-sensitive surface 451.

Specifically, in FIG. 6B, while media content item 690 is currently playing in user interface 602, the touch-sensitive surface 451 detects a touchdown of touch contact 624b in inner circular touch region 622. When the touchdown of touch contact 624b is detected, touch-sensitive surface 451 transmits information about the position 616 of the touch contact 624b and/or the touchdown event 618 to electronic device 500 to allow the electronic device to respond accordingly. Additionally, when the touchdown of the touch contact 624b is detected, the touch-sensitive surface 451 optionally begins detecting characteristics of touch contact 624b. For example, in FIG. 6B, touch-sensitive surface 451 detects that touch contact 624b has been on the touch-sensitive surface for a duration of time that is less than time threshold 610, detects that the intensity of touch contact 624b is less than intensity threshold 612, and movement of touch contact 624b is less than movement threshold 614.

Figure 6C:
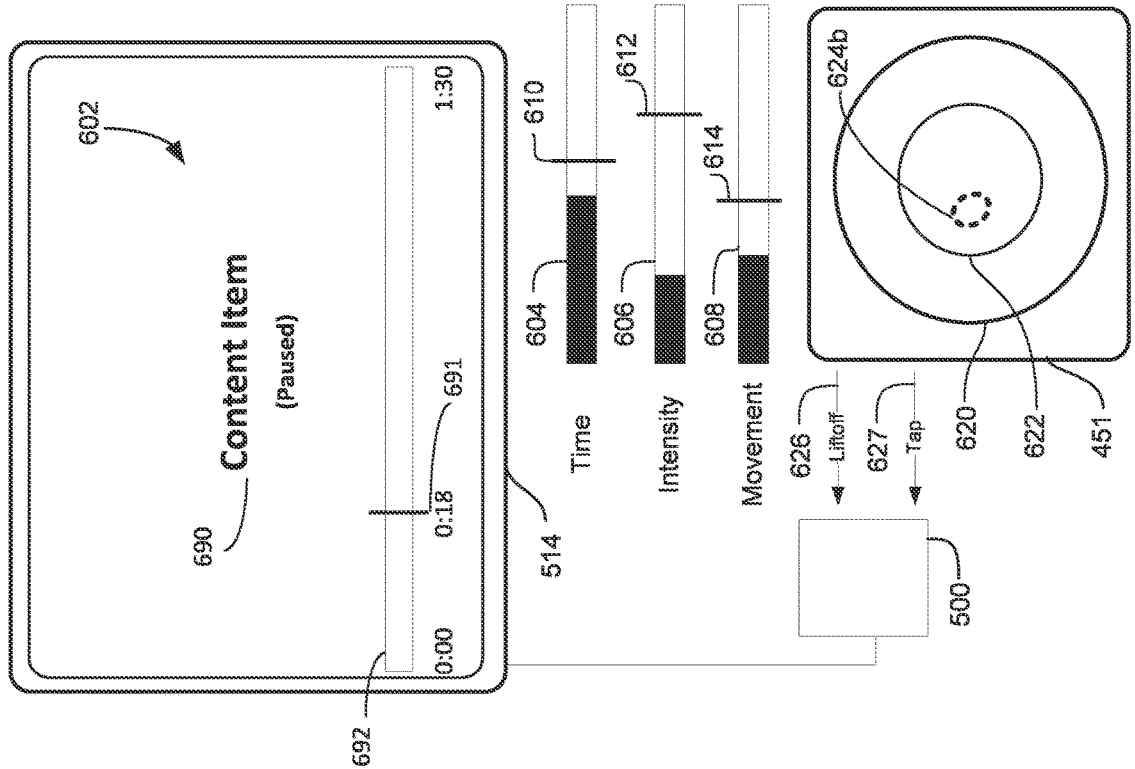

In FIG. 6C, after detecting the touchdown of touch contact 624b and after some amount of time has passed, the touch-sensitive surface 451 detects touch contact 624b has moved from its initial touchdown location (indicated by the dashed-line touch contact) to a new location in the inner circular touch region 622 (indicated by solid-line touch contact 624b). In addition, in FIG. 6C, the touch sensitive surface 451 detects that at some point while the touch contact 624b was moving to the new location in the inner circular touch region 622, the intensity 606 of the touch contact 624b has increased by a respective amount, but remains less than an intensity threshold 612. Similarly, the touch-sensitive surface 451 detects that touch contact 624b moved to the new location in the inner circular touch region 622 without exceeding time threshold 610 and movement threshold 614. As a result of the touch-sensitive surface 451 detecting movement of touch contact 624b, the touch-sensitive surface 451 transmits information about the new position 616 of touch contact 624b to device 500.

Figure 6D:
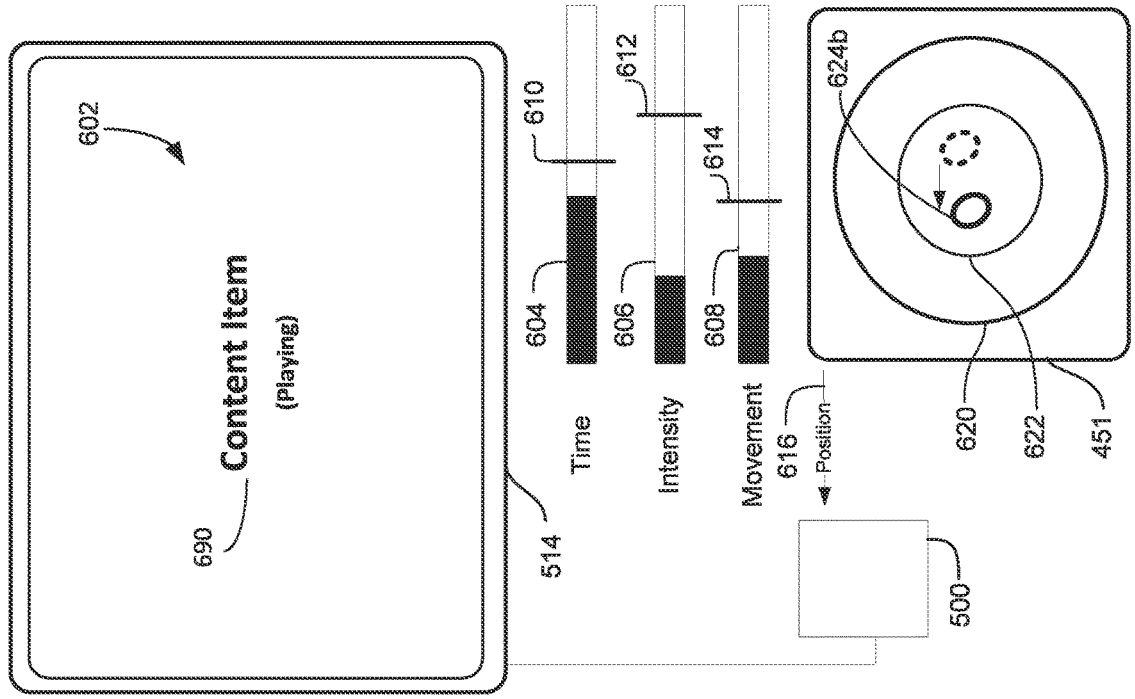

In FIG. 6D, after detecting movement of touch contact 624b and after some more amount of time has passed, the touch-sensitive surface 451 has detected liftoff of touch contact 624b. In response to the touch-sensitive surface 451 detecting liftoff of the touch contact 624b, touch-sensitive surface 451 optionally transmits information about the liftoff event 626 to electronic device 500. Additionally, in FIG. 6D, the touch-sensitive surface 451 identifies touch contact 624b as a tap input, because the touchdown and liftoff of the touch contact 624b occurred before time threshold 610, because an intensity of the touch contact 624b was below intensity threshold 612 while touch contact 624b was in contact with the touch-sensitive surface 451, and because the touch contact did not move more than movement threshold 614 while contact 624b was on touch-sensitive surface 451. As a result of the touch-sensitive surface 451 identifying touch contact 624b as a tap, the touch-sensitive surface 451 transmits a tap event 627 to electronic device 500. In some embodiments, such as in FIG. 6D, if the tap event 627 is received while media content item 690 is playing, the electronic device 500 optionally pauses media content item 690. Additionally, in some embodiments, as shown in FIG. 6D, when media content item 690 is paused, a scrubber bar 692 is concurrently displayed with the paused media content item 690. Scrubber bar 692 optionally includes an indication of a current playback position 691 in the media content item 690 (e.g., vertical line at playback position '0:18') and information about the length of the media content item 690 (e.g., 1.5 hours long). It would be understood that although scrubber bar 692 includes an indication about the start and end time of media content item 690 and an indication about a current playback position 691 in the media content item 690, in some embodiments scrubber bar 692 optionally identifies more or less information associated with media content item 690. Additionally, while FIGS. 6B-6D specifically illustrated pausing media content item 690 when a tap event was detected within the inner circular touch region 622, in some embodiments, if electronic device 500 is currently playing media content item 690 and a touch contact is identified as a tap outside of the inner circular touch region 622, the media content is optionally also paused. In some embodiments, a click event must occur within the inner circular region 622 to pause media content that is currently being played by electronic device 500, and a tap causes scrubber bar 692 to be displayed without pausing the media content item 690. Additional details of skipping through a media content item using scrubber bar 692 will be described later.

Figure 6F:
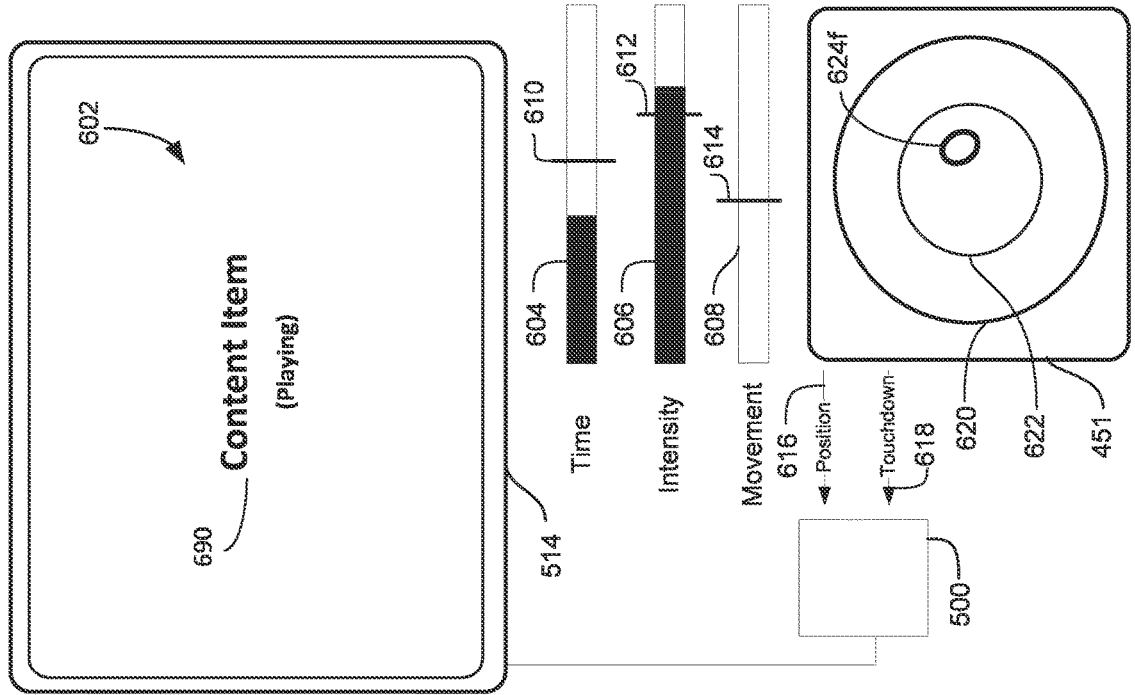
Figure 6E:
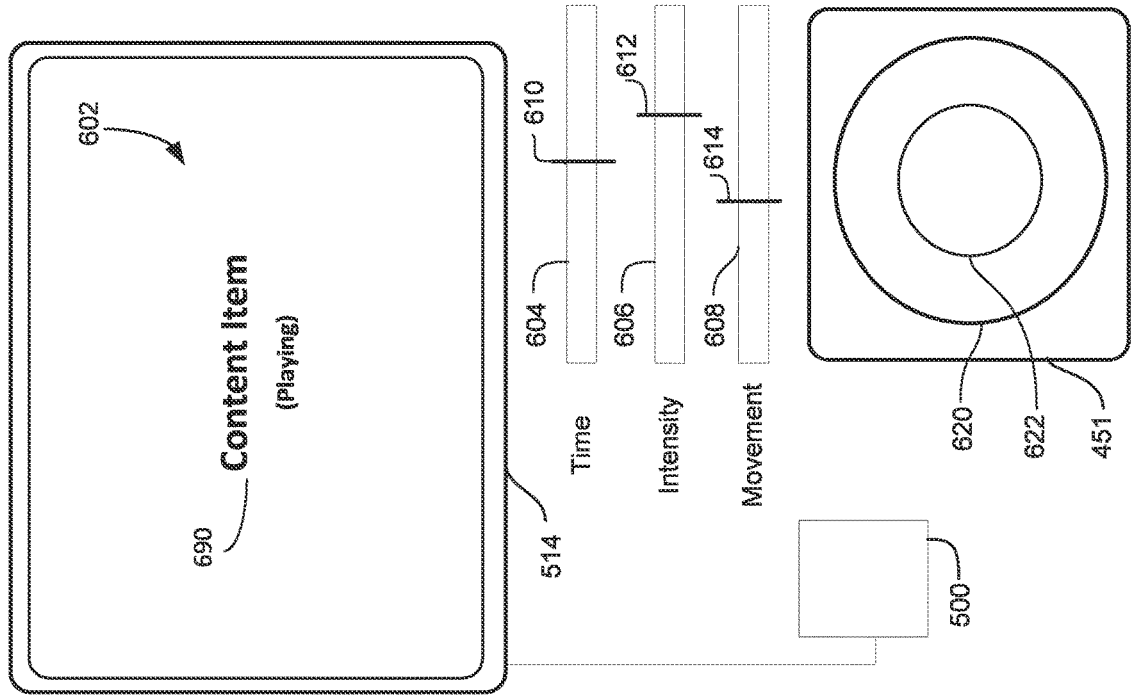
Figure 6H:
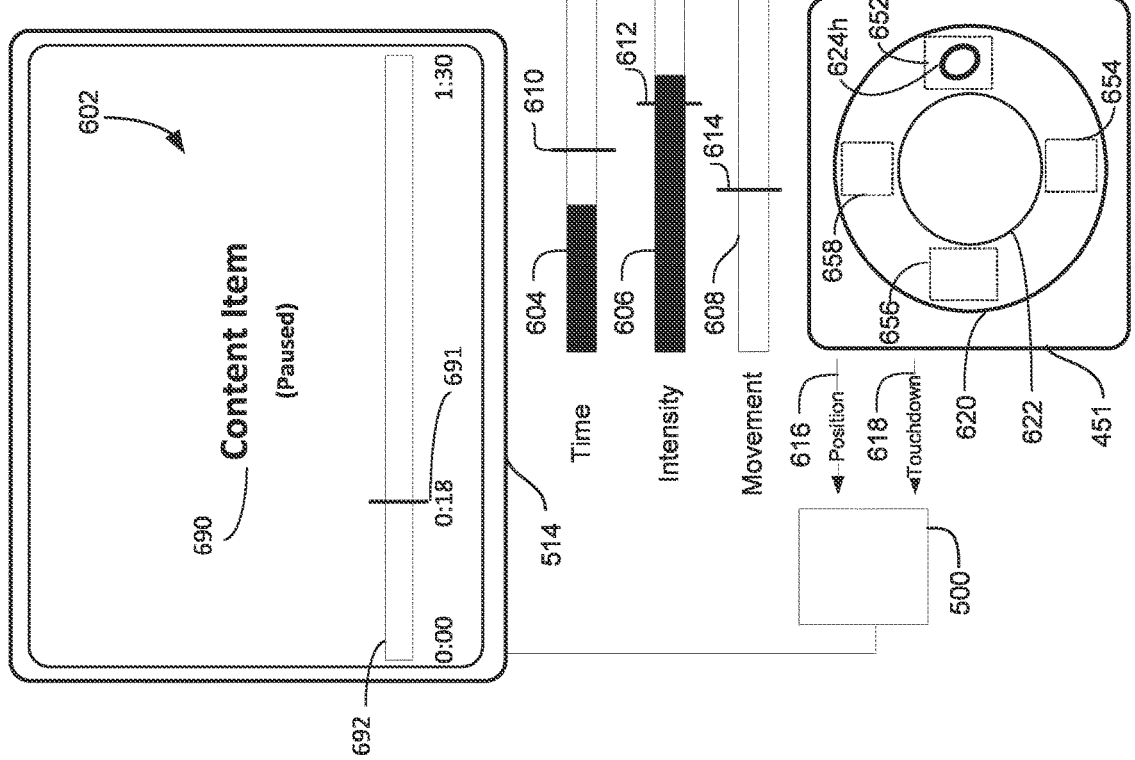
Figure 6G:
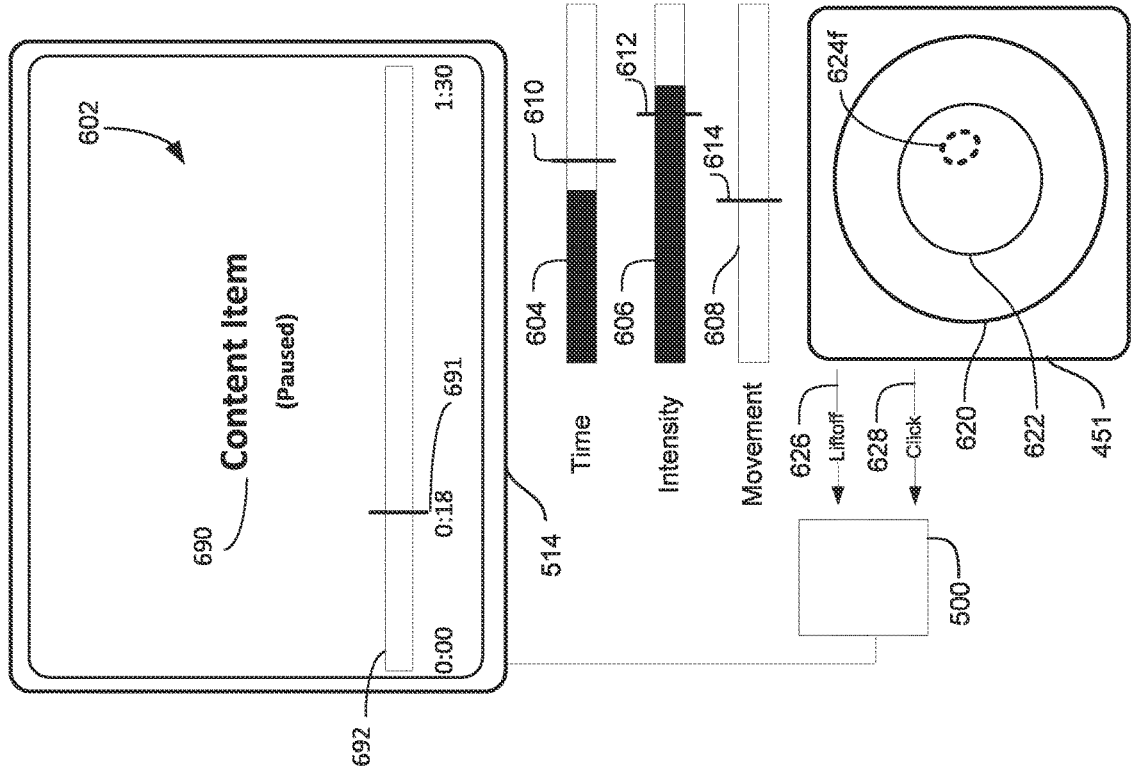

FIGS. 6E-6G illustrate an exemplary way of pausing playback of media content item 690 when a click event is detected in inner circular touch region 622. In some embodiments, the touch-sensitive surface 451 detects a click event in the inner circular touch region 622 if an intensity of a touch contact is greater than an intensity threshold, if the touchdown and liftoff of the touch contact are detected within a threshold amount of time of one another, and if the touch contact has not moved more than a movement threshold during the threshold amount of time.

For example, in FIG. 6E, device 500 is displaying a user interface 602 that is similar to the user interface 602 described with reference to FIG. 6A. In FIG. 6F, while media content item 690 is currently playing in user interface 602, touch-sensitive surface 451 detects a touchdown of touch contact 624f in the inner circular touch region 622. Additionally, the touch-sensitive surface 451 detects that touch contact 624f has been on the touch-sensitive surface for a duration of time that is less than time threshold 610, has an intensity greater than an intensity threshold 612, and has moved less than a movement threshold 614. Additionally, as shown in FIG. 6F, when the touchdown of touch contact 624f is detected, the touch-sensitive surface 451 sends information about the position 616 of touch contact 624f and the touchdown event 618 to device 500.

In FIG. 6G, after detecting the touchdown of touch contact 624f and after some amount of time has passed, the touch-sensitive surface 451 detects a liftoff of touch contact 624f, as shown in FIG. 6G. In response to the touch-sensitive surface 451 detecting the liftoff of touch contact 624f, the touch-sensitive surface 451 transmits the liftoff event 626 to the electronic device 500. Additionally, the touch-sensitive surface 451 detects that the touchdown and liftoff of touch contact 624f occurred within time threshold 610, that the intensity of touch contact 624f was greater than intensity threshold 612 while touch contact 624f was on the touch-sensitive surface 451, and that touch contact 624f moved less than a movement threshold 614 while touch contact 624f was on the touch-sensitive surface 451. As a result, the touch-sensitive surface 451 identifies the touch contact 624f as a click and transmits click event 628 to the electronic device 500. In some embodiments, as shown in FIG. 6G, if the electronic device 500 receives a click event while electronic device 500 is currently playing media content, the media content is optionally paused. Additionally, in some embodiments, as shown in FIG. 6G, when media content item 690 is paused, a scrubber bar 692 is concurrently displayed with the paused media content item 690. Scrubber bar 692 optionally includes an indication of a current playback position 691 in the media content item 690 (e.g., vertical line at playback position '0:18') and information about the length of the media content item 690 (e.g., 1.5 hours long). While FIGS. 6E-6G specifically illustrated pausing media content item 690 when a click event was detected within the inner circular touch region 622, in some embodiments, if electronic device 500 is currently playing media content item 690 and a touch contact is identified as a click outside of the inner circular touch region 622, the media content is optionally also paused. In some embodiments, a click event must occur within the inner circular region 622 to pause media content currently playing by electronic device 500.

Figure 6I:
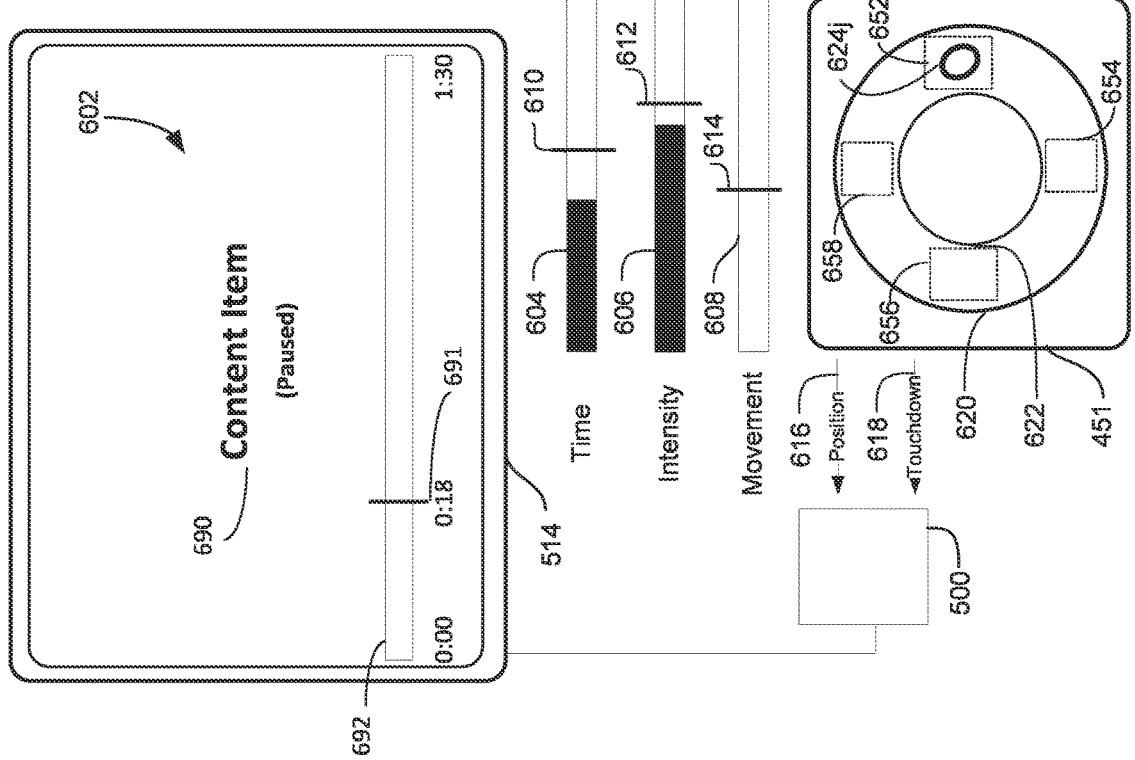

FIGS. 6H-6I illustrate an exemplary way of skipping a playback position in a scrubber bar when a click is detected in a pre-determined region of the outer circular touch region 620. In some embodiments, the outer circular touch region 620 includes one or predefined regions, such as a predefined region in an upper, lower, left, and/or right portion of outer circular touch region 620. For example, in FIG. 6H, the touch-sensitive 451 includes predefined regions 652, 654, 656, and 658 in the outer circular touch region 620, and detects that touch contact 624h has touched down on the right side of the outer circular touch region 620 and in predefined region 652. As a result of the touch-sensitive surface 451 detecting a touchdown of contact 624h in the outer circular touch region 620, the touch-sensitive surface 451 sends information about the position 616 of touch contact 624h and the touchdown event 618 to device 500. Additionally, the touch-sensitive surface 451 detects that the touch contact 624h has been on the touch-sensitive surface for a duration of time less than a time threshold 610, has an intensity greater than intensity threshold 612, and has not moved more than a movement threshold 614. In some embodiments, when a touch contact is detected in one of the predefined regions in the outer circular touch region, subsequent movement of the touch contact does not cause the touch-sensitive surface to send information about the new position/location of the touch contact on the touch-sensitive surface, which optionally prevents the electronic device 500 from navigating a user interface when the touch contact is associated with a click event.

In FIG. 6I, after detecting touchdown of touch contact 624h and after some amount of time has passed, the touch-sensitive surface 451 detects liftoff of touch contact 624h. In response to the touch-sensitive surface 451 detecting liftoff of touch contact 624h, the touch-sensitive surface 451 transmits the liftoff event 626 to the electronic device 500. Additionally, the touch-sensitive surface 451 identifies touch contact 624*h* as a click because the touchdown and liftoff of the touch contact 624 occurred before time threshold 610, because the intensity of touch contact 624*h* was greater than intensity threshold 612 while touch contact 624*h* was on the touch-sensitive surface 451, and because touch contact 624*h* moved less than a movement threshold 614 while touch contact 624*h* was on the touch-sensitive surface 451. As a result of touch contact 624*h* satisfying the above mentioned click criteria, the touch-sensitive surface 451 identifies touch contact 624*h* as a click and transmits click event 628 to the electronic device 500.

In some embodiments, when a click input is received in a predefined region of the outer circular touch region 622, a playback position in the scrubber bar is optionally skipped in a direction and/or in an amount defined by that predefined region. For example, in FIG. 6I, because a click was detected in predefined region 652, the current playback position 691 in the scrubber bar 692 advances forward by one minute from playback position '0:18' to playback position '0:19'. While the click event detected in the predefined region 652 advanced the playback position in the scrubber bar by one minute in FIG. 6I, it would be understood by one of skill in the art that the direction and/or amount of content skipping associated with the predefined region 652 could be different (e.g., adjust the playback position backwards or by a different amount greater than or less than one minute). In some embodiments, if the touch-sensitive surface 451 detects a click in a different predefined region (e.g., in predefined region 656), a currently playback position indicator 691 in the scrubber bar 690 is optionally adjusted backwards by one minute (or in a different direction and/or amount).

Figure 6J:
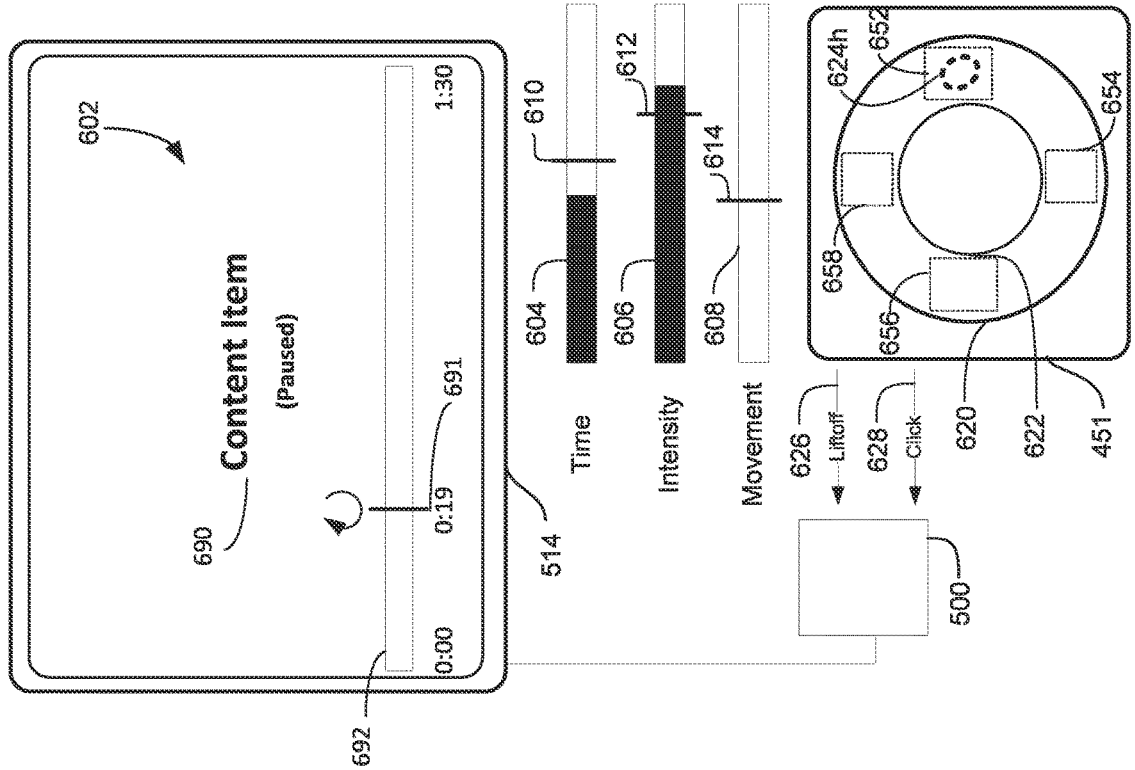
Figure 6K:
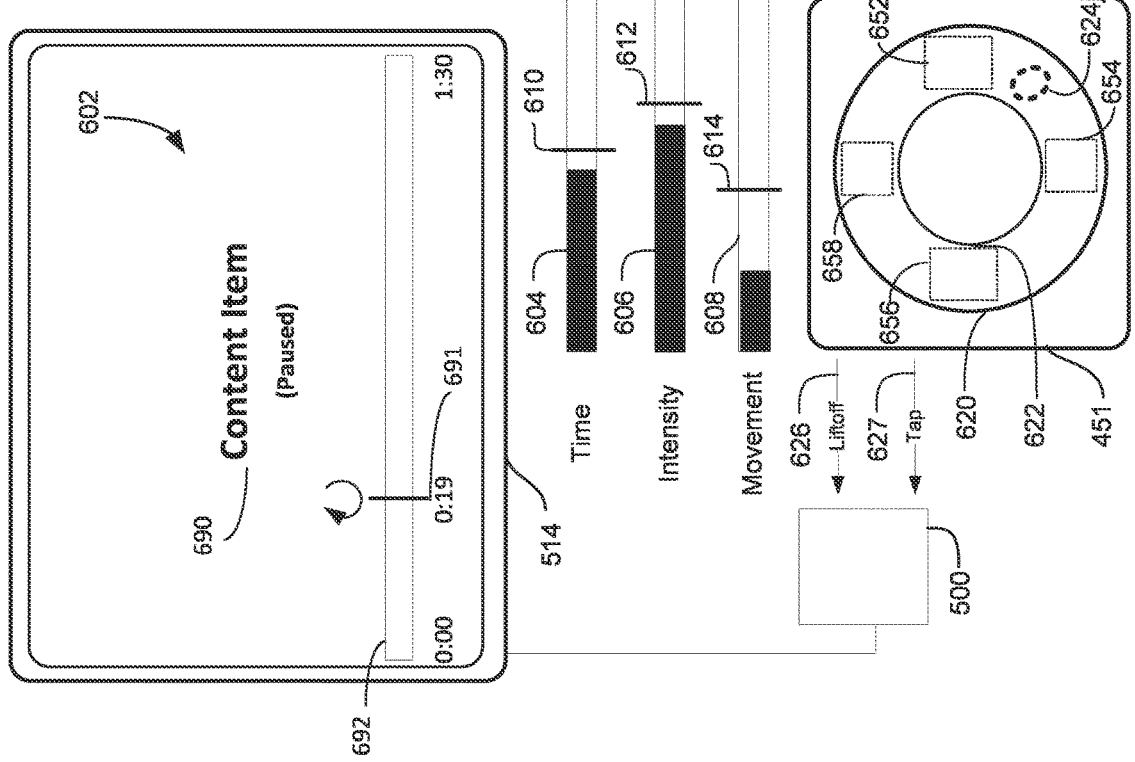
Figure 6L:
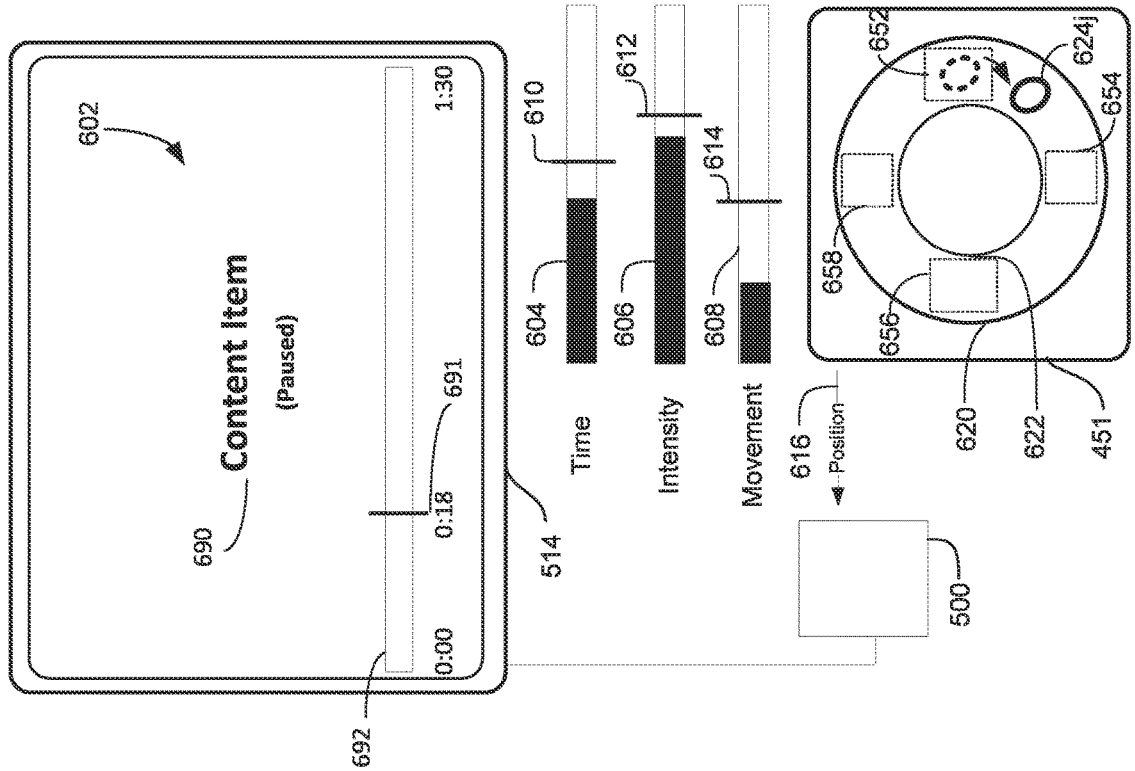

FIGS. 6J-6L illustrate an exemplary way of skipping a playback position in a scrubber bar when a tap is detected in a pre-determined region of the outer circular touch region 620. As described above, in some embodiments, the outer circular touch region 620 includes one or more predefined regions, such as a predefined region an upper, lower, left, and right portion of the outer circular touch region 620. In the example illustrated in FIG. 6J, the touch-sensitive surface 451 includes predefined regions 652, 654, 656, and 658 in the outer circular touch region 620, and detects that touch contact 624*j* has touched down on the right side of the outer circular touch region 620 and in predefined region 652. As a result of the touch-sensitive surface 451 detecting a touchdown of contact 624*j* in the predefined region 652, the touch-sensitive surface 451 sends information about the position 616 of touch contact 624*j* and the touchdown event 618 to the electronic device 500. Additionally, while touch contact 624*j* is on the touch-sensitive surface 451, the touch-sensitive surface 451 detects that the touch contact 624*j* has been on the touch-sensitive surface for a duration of time less than a time threshold 610, has an intensity less than intensity threshold 612, and has not moved more than a movement threshold 614.

In FIG. 6K, after detecting the touchdown of touch contact 624*j* and after some amount of time has passed, the touch-sensitive surface 451 detects that touch contact 624*j* has moved to a new location in the outer region 620 that is outside of predetermined region 652. Additionally, in FIG. 6K, the touch-sensitive surface 451 detects that touch contact 624*j* has been on the touch-sensitive surface 451 for less than time threshold 610, has an intensity less than intensity threshold 612, and has moved less than a movement threshold 614.

After detecting movement of the touch contact 624*j* and after some amount of time has passed, in FIG. 6L, the touch-sensitive surface 451 detects liftoff of touch contact 624*j*. In response to the touch-sensitive surface 451 detecting liftoff of touch contact 624*j*, the touch-sensitive surface 451 transmits the liftoff event 626 to the electronic device 500. Additionally, the touch-sensitive surface 451 identifies touch contact as a tap because the touchdown and liftoff of the touch contact 624*j* occurred before time threshold 610, because the intensity of touch contact 624*h* was less than intensity threshold 612 while touch contact 624*j* was on the touch-sensitive surface 451, and because touch contact 624*j* moved less than a movement threshold 614 while touch contact 624*j* was on the touch-sensitive surface 451. As a result of touch contact 624*j* being identified as a tap, the touch-sensitive surface 451 identifies touch contact 624*h* as a tap and transmits tap event 626 to the electronic device 500.

In some embodiments, when a tap input is received and a touchdown of that tap input occurred within a predefined region of the outer circular touch region, a playback position in the scrubber bar is optionally skipped in a direction and/or in an amount defined by that predefined region. For example, in FIG. 6L, a tap was identified and a touchdown of that tap occurred within predefined region 652 (as shown in FIG. 6J), and as a result the current playback position 691 in the scrubber bar 692 advances forward by one minute from the playback position '0:18' to playback position '0:19'. While the tap event detected in predefined region 652 advanced the playback position in the scrubber bar by one minute, it would be understood by one of skill in the art that the direction and/or amount associated with predefined region 652 could be different (e.g., adjust the playback position backwards or by a different amount greater than or less than one minute). In some embodiments, the touch-sensitive surface 451 detects a tap in a different predefined region (e.g., in predefined region 656), and a current playback position indicator 691 in the scrubber bar 690 is optionally adjusted backwards by one minute (or in a different direction and/or amount).

FIGS. 6M-6Q illustrate an exemplary way of scrubbing a playback position in a scrubber bar in accordance with movement of a touch contact and a first mode of navigation. In some embodiments, a scrubber bar is scrubbed in accordance with a first mode of navigation when a touch contact has touched down in the outer circular region 620 for more than a threshold amount of time and has not moved more than a threshold amount of movement during the threshold amount of time. When a scrubber bar is being navigated with the first mode of navigation, a movement direction of the touch contact in a clockwise or counterclockwise direction optionally controls which direction the content is scrubbed (e.g., a touch contact moving in a clockwise direction optionally results in forward scrubbing, a touch contact moving in counterclockwise direction optionally results in backward scrubbing). In some embodiment, as a touch contact is moving in the outer circular touch region, the movement of the touch contact closer or further away from a center of the touch-sensitive surface 451 does not affect the amount of navigation performed in the scrubber bar, but rather detects the amount of movement for the touch contact and/or the movement direction of the touch contact (clockwise or counterclockwise) based on a tangential motion of the contact with respect to the center of the touch-sensitive surface 451. Specifically, in FIG. 6M, the electronic device 500 is displaying user interface 602. User interface 602 includes media content item 690 which is currently paused and a scrubber bar 692 which includes a current playback position indicator 691. The current playback position indicator 691 includes a vertical line for indicating the current playback progress with respect to the length of media content item 690 and a timestamp of the current playback position. While the electronic device 500 is displaying user interface 602, the touch-sensitive surface 451 detects a touchdown of touch contact 624*m* in the outer circular touch region 620. When the touch-sensitive 451 detects the touchdown of touch contact 624*m*, the touch-sensitive surface 451 transmits information about the position 616 and touchdown event 618 to electronic device 500. Additionally, the touch-sensitive surface 451 detects that touch contact 624*m* has been on the touch-sensitive surface 451 for a duration of time less than time threshold 610, has an intensity less than an intensity threshold 612, and has moved less than movement threshold 614. Because touch contact 624*m* does not satisfy criteria for navigating scrubber bar 692 with the first mode of navigation because touch contact 624*m* has not been on the touch-sensitive surface for more than a time threshold 610, movement of touch contact 624*m* more than movement threshold 614 before time threshold 610, detected by the touch-sensitive surface 451, optionally would cause the scrubber bar to be scrubbed in accordance with a different (e.g., second) mode of navigation, as will be described in more detail later. In some embodiments, requiring a touch contact to satisfy time threshold criteria before navigating (e.g., scrubbing) with the first mode of navigation optionally prevents the electronic device 500 from scrubbing when touch contact is not intended to be associated with scrubbing.

Figure 6N:
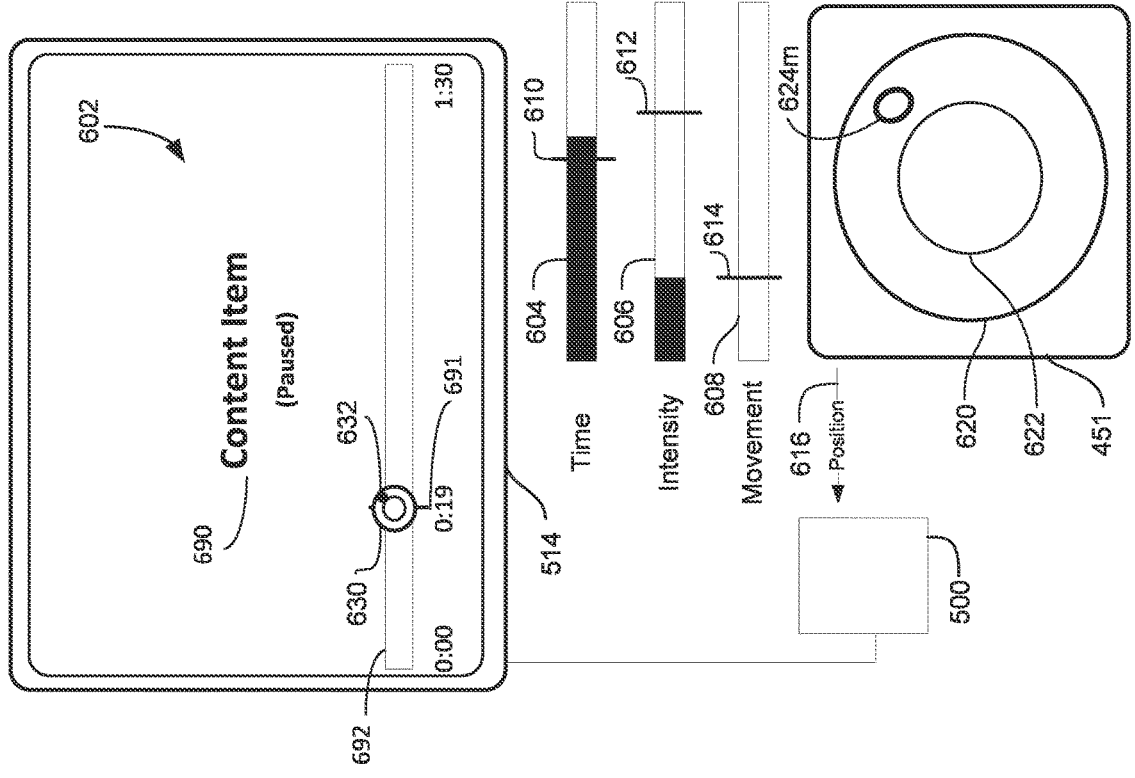

In FIG. 6N, after detecting the touchdown of touch contact 624*m*, the touch-sensitive surface 451 has detected that touch contact 624*m* satisfies criteria for navigating the scrubber bar in accordance with the first mode of navigation because touch contact 624*m* has been within region 620 on the touch-sensitive for a duration of time more than time threshold 610 and because touch contact 624*m* did not move more than movement threshold 614 during the time threshold 610. Additionally, in FIG. 6N, the touch-sensitive surface 451 detects that the intensity of touch contact 624*m* is less than an intensity threshold. As a result of touch contact 624*m* satisfying criteria for scrubbing in accordance with the first mode of navigation, in some embodiments, the current playback position indicator 691 in scrubber bar 692 is updated to indicate that movement of contact 624*m* in the outer circular touch region 620 will result in scrubbing through scrubber bar 692 and/or media content item 690 in the first mode of navigation. For example, in FIG. 6N, as a result of touch contact 624*m* satisfying criteria for scrubbing in accordance with the first mode of navigation, electronic device 500 updates the current playback position indicator 691 to include a representation 630 of the touch-sensitive surface 451. In some embodiments, the representation 630 of the touch sensitive surface 451 includes representations of the inner and outer circular touch regions 620 and 622. Additionally, in some embodiments, the representation 630 of the touch sensitive surface 451 optionally includes a representation of the touch contact that satisfied the criteria for scrubbing in accordance with the first mode of navigation, displayed at a position within the representation of the outer touch region included in representation 630. For example, as shown in FIG. 6N, the representation 630 of the touch-surface 451 includes a representation 632 of touch contact 624*m* at a location corresponding to the location of touch contact 624*m* on the touch-sensitive surface 451 (e.g., within the outer region 620 of the touch-sensitive surface).

In some embodiments, in addition or alternatively to transitioning to navigating the scrubber bar in accordance with the first mode of navigation based on the criteria described with reference to FIGS. 6M-6N, the electronic device 500 transitions to navigating the scrubber bar in accordance with the first mode of navigation in response to detecting contact 624*m* moving at least a threshold amount (e.g., after touching down within or moving into touch region 620) while remaining within touch region 620 (e.g., without crossing over into touch region 622) without contact 624*m* being required to first remain stationary within touch region 620 for time threshold 610 (and/or for any time threshold). In some embodiments, the intensity of contact 624*m* must also be less than the above-described intensity threshold; otherwise, the electronic device 500 optionally does not transition to navigating the scrubber bar in accordance with the first mode of navigation. In some embodiments, the threshold amount is a distance (e.g., 0.1, 0.3, 0.5, 1, 3, or 5 cm). In some embodiments, the threshold amount is an angular amount (e.g., 5, 15, 30, 45, 60, 90, 120, 180, 270 or 360 degrees of movement within touch region 620, where 360 degrees of movement corresponds to contact 624*m* moving clockwise or counterclockwise from a first location within touch region 620 and back to that same first location within touch region 620). In some embodiments, electronic device 500 responds to the initial movement of contact 624*m* within touch region 620 (e.g., movement after detecting touchdown of contact 624*m* in touch region 620 or after detecting contact 624*m* enter region 620 from region 622, and movement before reaching the threshold amount of movement) by navigating the scrubber bar in accordance with the second mode of navigation as described in this disclosure in accordance with that initial movement of contact 624*m*; in response to detecting the threshold amount of movement by contact 624*m*, the electronic device 500 optionally transitions to navigating the scrubber bar in accordance with the first mode of navigation as described in this disclosure in accordance with the movement of contact 624*m* after the threshold amount of movement.

In some embodiments, the threshold amount of movement of contact 624*m* that is required to transition to the first mode of navigation is based on the size and/or area of contact 624*m* detected by touch-surface 451 (e.g., the larger the size and/or area of contact 624*m*, the greater the threshold amount of movement required, and the smaller the size and/or area of contact 624*m*, the lower the threshold amount of movement required). In some embodiments, the threshold amount of movement of contact 624*m* that is required to transition to the first mode of navigation is additionally or alternatively based on the location within touch region 620 of the initial touchdown of contact 624*m* (or the location within touch region 620 where contact 624*m* first entered touch region 620 (e.g., from touch region 622)) from which detection of the threshold amount of movement is initiated. For example, the closer the initial location of contact 624*m* in touch region 620 is to locations 652 or 656 illustrated in FIGS. 6H-6L—for example, the 0 degree or the 180 degree positions within touch region 620, respectively—the lower the threshold amount of movement is required, and the closer the initial location of contact 624*m* in touch region 620 is to locations 654 or 658—for example, the 90 degree or the 270 degree positions within touch region 620, respectively—the greater the threshold amount of movement is required.

In some embodiments, electronic device 500 transitions out of the first mode of navigation (e.g., and into the second mode of navigation) in one or more of the ways described in this disclosure; for example, such as described with reference to FIGS. 6S-6T.

In some embodiments, the first mode of navigation defines an amount of precision (e.g., scrubbing) that is performed based on the amount of movement of touch contact 624*m* within outer region 620, and scrubs the scrubber bar/media content item based on the direction of movement of the touch contact 624*m*. For example, in FIG. 6O, after detecting that touch contact 624*m* satisfied criteria for navigating the first user interface with the first mode of navigation, the touch-sensitive surface 451 detects touch contact 624*m* has moved in a clockwise direction from the touch down location (indicated by the dashed-line touch contact) to a new location in the outer circular touch region 620 (indicated by the solid touch contact 624*m*). Additionally, the touch-sensitive surface 451 detects that touch contact 624*m* has moved, on the touch-sensitive surface, an amount corresponding to movement magnitude 634, which is greater than movement threshold 614, and detects that the intensity of the touch contact is below intensity threshold 612. In some embodiments, in order for touch contact 624*m* to begin scrubbing the playback position in the scrubber bar, the touch contact 624*m* needs to move more than movement threshold 614 and/or more than a speed threshold 646, such that touch contact 624*m* corresponds to a swipe (e.g., to differentiate between click/tap events on the touch-sensitive surface 451 (e.g., in predefined regions of the touch-sensitive surface)). In some embodiments, if the touch contact 624*m* does not move more than movement threshold 614, the touch contact 624*m* is optionally not associated with a swipe event and the movement of touch contact 624*m* does not scrub the playback position in the scrubber bar 692. As a result of touch contact 624*m* having a magnitude of movement 634 greater than movement threshold 614 and touch contact 624*m* moving in a clockwise direction, the electronic device receives information about the position 616 of touch contact 624*m* and a current playback position indicator 691 is scrubbed forwards by thirty seconds (e.g., the precision of the first mode of navigation determines that for the amount of movement touch contact 624*m* moved (indicated by movement magnitude 634), the playback position should be scrubbed forwards by thirty seconds)—from playback position 691 '0:19:00' in FIG. 6N to playback position 691 '0:19:30' in FIG. 6O. Additionally, the representation 632 of touch contact 624*m* within representation 630 is also updated to correspond to the new location of touch contact 624*m* on the touch-sensitive surface 451, and the scrubber bar 692 is optionally updated to include initial playback position indicator 698 for indicating a playback position in the media content item 690 before performing any scrubbing in the first mode of navigation. Initial playback position indicator 698 is optionally represented as a circle (as shown in FIG. 6O) and is displayed at the current (e.g., pre-scrub) playback position of the media content item 690. In some embodiments, initial playback position indicator 698 is displayed in other embodiments of this disclosure that are associated with scrubbing in the first mode of navigation. Additionally, in some embodiments, as touch contact 624*m* was moving from its initial touchdown location to its current location in FIG. 6O, the representation 632 of the touch contact 624*m* was updated in real-time (e.g., live) to correspond to its real-time location on touch-sensitive surface 451 (e.g., within outer region 620).

Figure 6M:
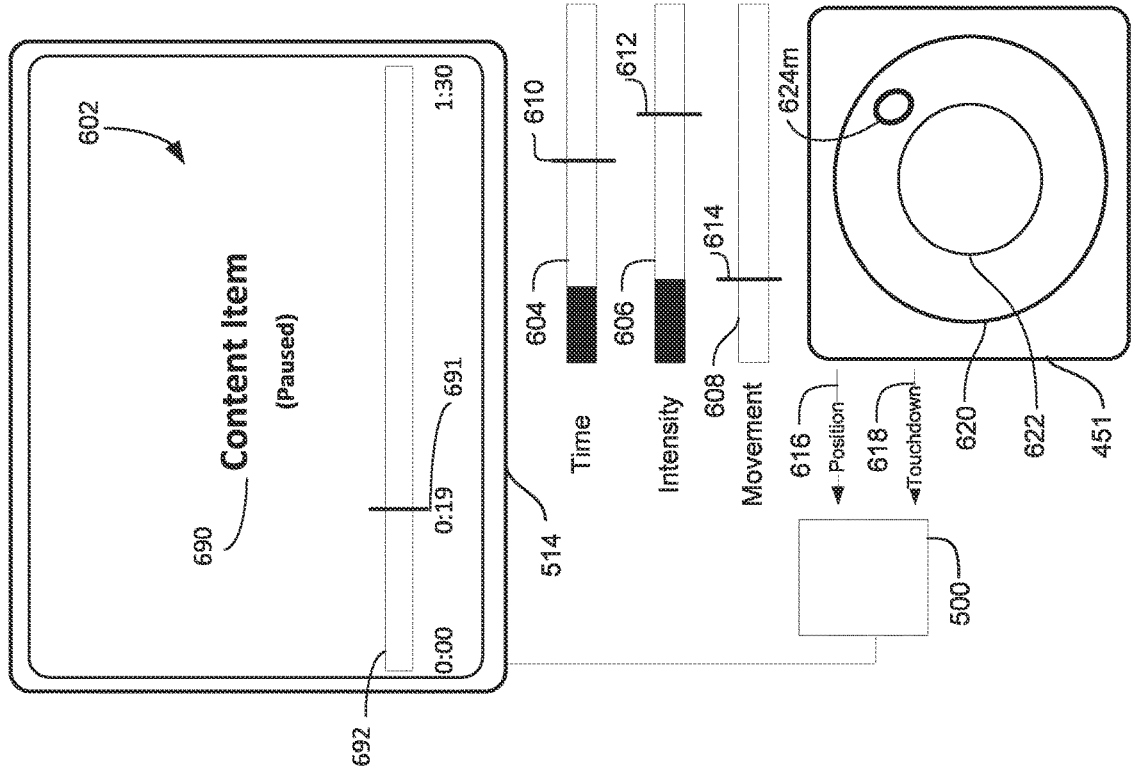
Figure 6O:
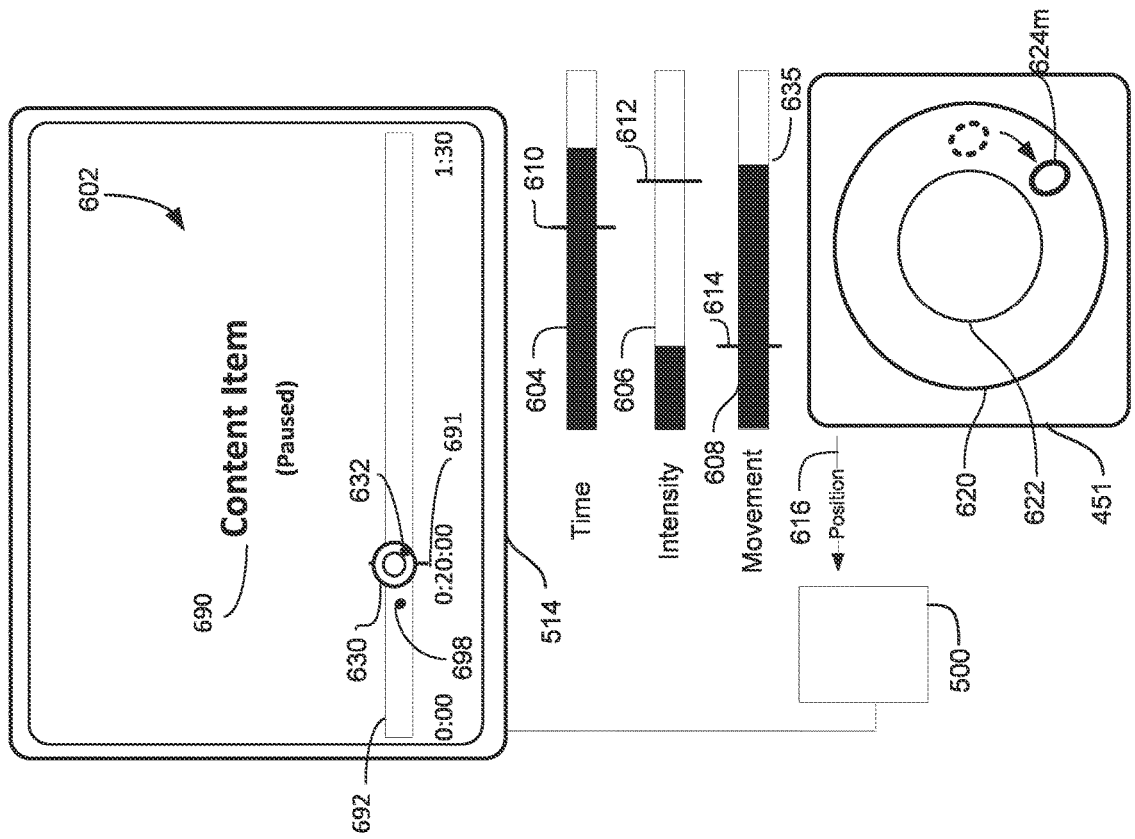
Figure 6P:
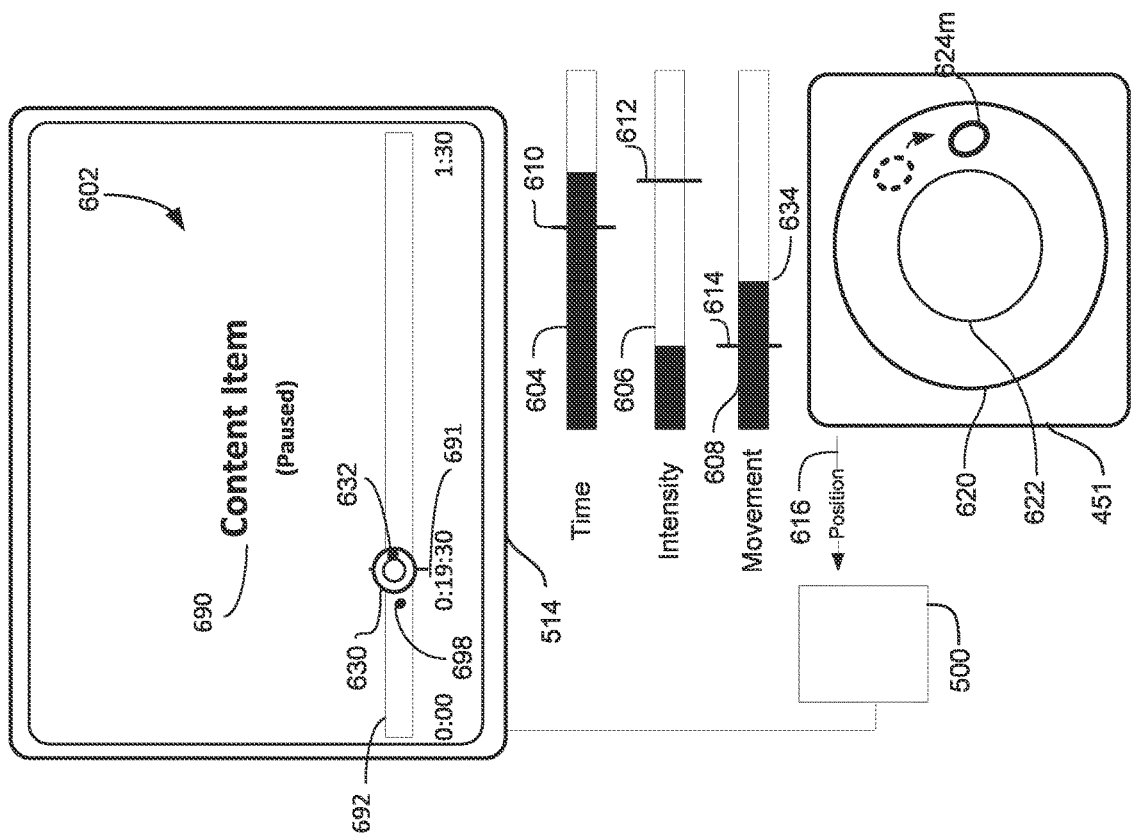

In FIG. 6P, after detecting movement of the touch contact 624*m* and while satisfying criteria for navigating the scrubber bar in accordance with the first mode of navigation, the touch sensitive surface 451 detects further movement of touch contact 624*m* in the clockwise direction in the outer circular touch region 620 (indicated by solid contact 624*m*). Specifically, the touch-sensitive surface 451 detects that touch contact 624*m* has continued to move on the touch-sensitive surface corresponding to a new magnitude of movement 635 and has an intensity less than intensity threshold 612. In some embodiment scrubber 692 continues being navigated with the first mode of navigation as long movement of a touch contact remains in the outer circular touch region 620. As a result of the touch-sensitive surface 451 detecting additional movement of touch contact 624*m* and continuing to satisfy criteria for navigating with the first mode of navigation, the touch-sensitive surface 451 transmits information about position 616 of touch contact 624*m* and the current playback indicator is scrubbed forwards by thirty seconds (e.g., the amount of movement the touch contact moved (e.g., from movement magnitude 634 to movement magnitude 635) corresponds to scrubbing forwards by another thirty seconds in the first mode of navigation—from playback position '0:19:30' in FIG. 6O to playback position '0:20:00' in FIG. 6P). Put differently, the amount of total clockwise movement of touch contact 624*m* in the outer circular touch region 620 corresponds to one minute of scrubbing (from playback position '0:19:00' in FIG. 6M to playback position '0:20:00' in FIG. 6P). In FIG. 6P, the representation 632 of touch contact 624*m* is also updated to correspond to the new location of touch contact 624*m* on the touch-sensitive surface 451. Additionally, in some embodiments, as touch contact 624*m* moves to its new current location in FIG. 6P, the representation 632 of the touch contact 624*m* is updated in real-time (e.g., live) to correspond to its real-time location on touch-sensitive surface 451.

Figure 6R:
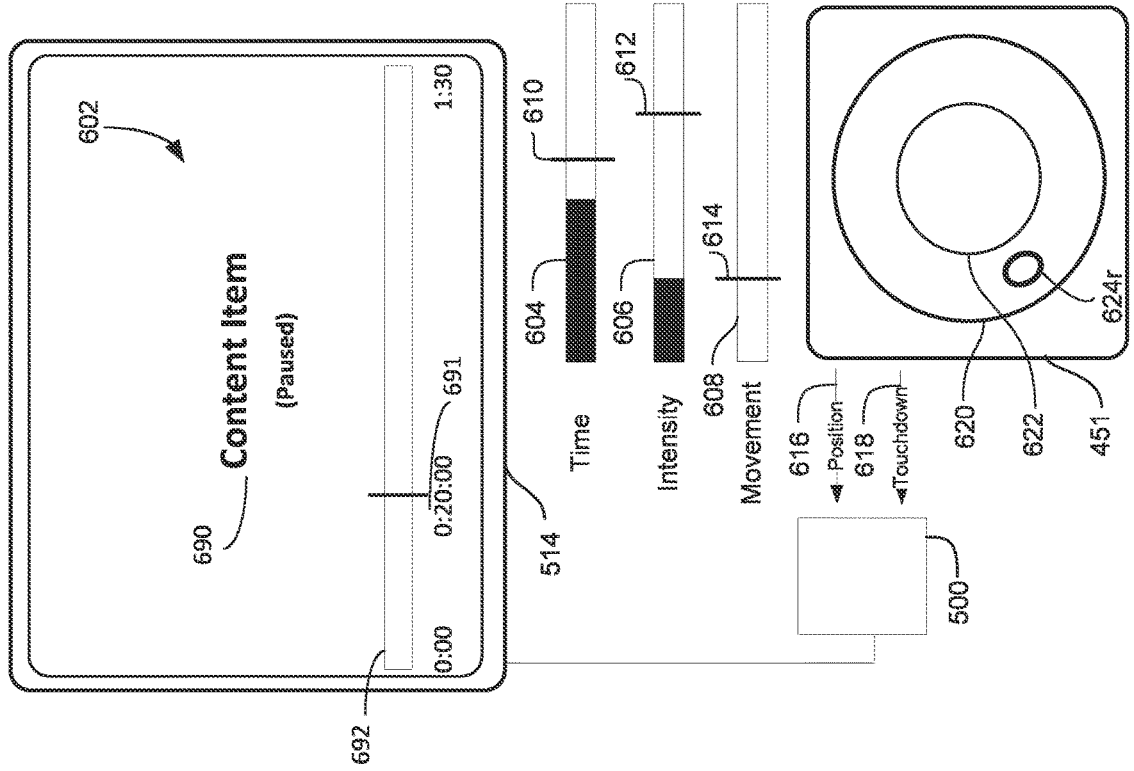
Figure 6Q:
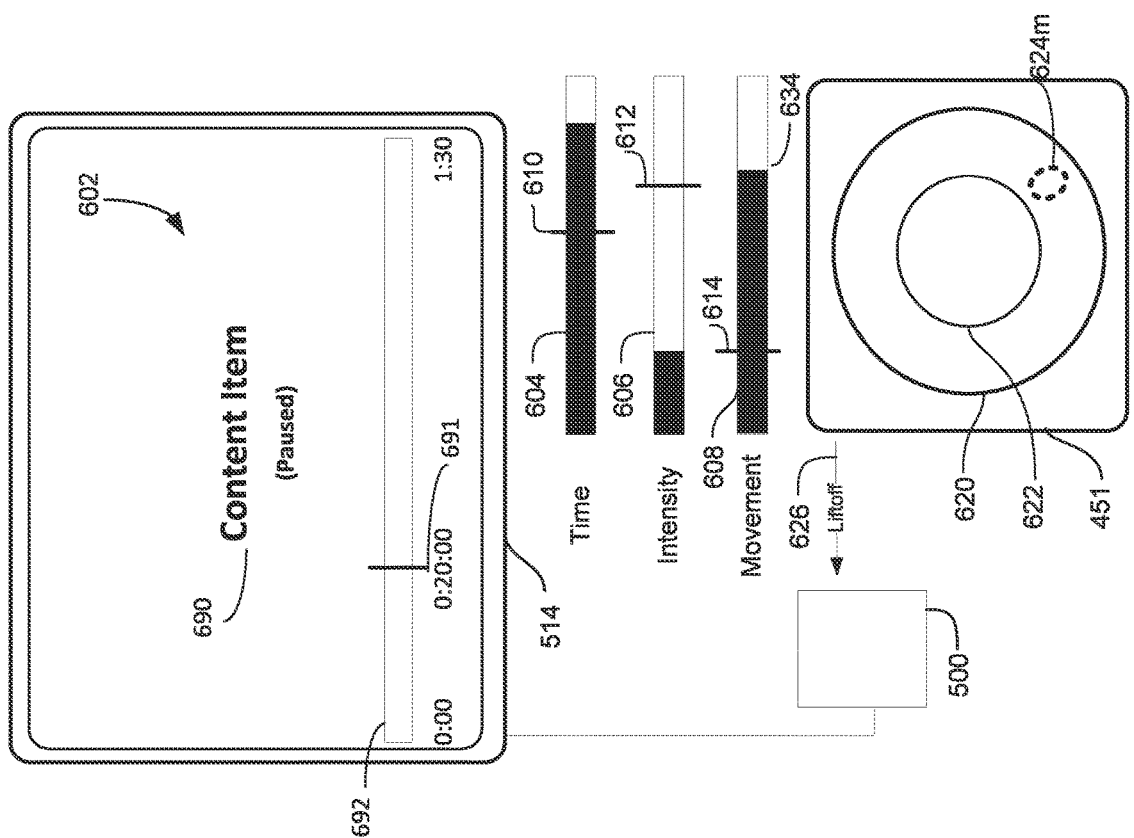

In FIG. 6Q, after detecting movement of touch contact 24*m*, the touch-sensitive surface 451 detects liftoff of touch contact 624*m*. In response to the touch-sensitive surface 451 detecting liftoff of touch contact 624*m*, the touch-sensitive surface 451 transmits a liftoff event to electronic device 500. In some embodiments, when a liftoff of the touch contact is detected for a touch contact that was scrubbing (e.g., navigating) in the first mode of navigation, the scrubber bar exits the first mode of navigation. When the scrubber bar is no longer being scrubbed in accordance with the first mode of navigation, the current playback indicator 691 is no longer displayed with the representation 630 of the touch-sensitive surface. For example, in FIG. 6Q, as a result of the electronic device receiving information about the liftoff event of touch contact 624*m*, the scrubber bar exits the first mode of navigation, ceases displaying the representation 630 of the touch sensitive surface 451 in the current playback indicator 691, and displays the current playback indicator 691 with a vertical line to indicate future contact will be associated with a different mode of navigation—until subsequent touch contact is detected that satisfies criteria for scrubbing (e.g., navigating) in the first mode of navigation, as described above.

FIGS. 6R-6V illustrate an exemplary way of switching between navigating a scrubber bar in a first mode of navigation and a second mode of navigation with the same touch contact. In FIG. 6R, the touch-sensitive surface 451 detects a touchdown of touch contact 624*r* in the outer region 620. In response to the touch-sensitive surface detecting the touchdown of touch contact 624*r*, the electronic device 500 receives information about the position 616 of touch contact 624*r* and the touchdown event 618. Additionally, the touch-sensitive surface 451 detects that touch contact 624*r* has been on the touch-sensitive surface for less than time threshold 610, has an intensity less than intensity threshold 612, and has not moved more than a movement threshold 614 on the touch-sensitive surface 451. As mentioned before, in some embodiments, scrubber bar 692 enters the first navigation mode when a touch contact has a touchdown location in the outer circular region 620 for more than a threshold amount of time and has not moved move than threshold amount of movement during the threshold amount time. As a result of touch contact 624*r* not satisfying the criteria for scrubbing the scrubber bar in accordance with the first mode of navigation, the scrubber bar does not enter the first mode of navigation and remains in the second mode of navigation. The second mode of navigation optionally defines an amount of precision (e.g., scrubbing) that is performed based on the amount of movement of touch contact 624*r*, which is optionally different from the amount of precision defined for the first mode of navigation.

Figure 6T:
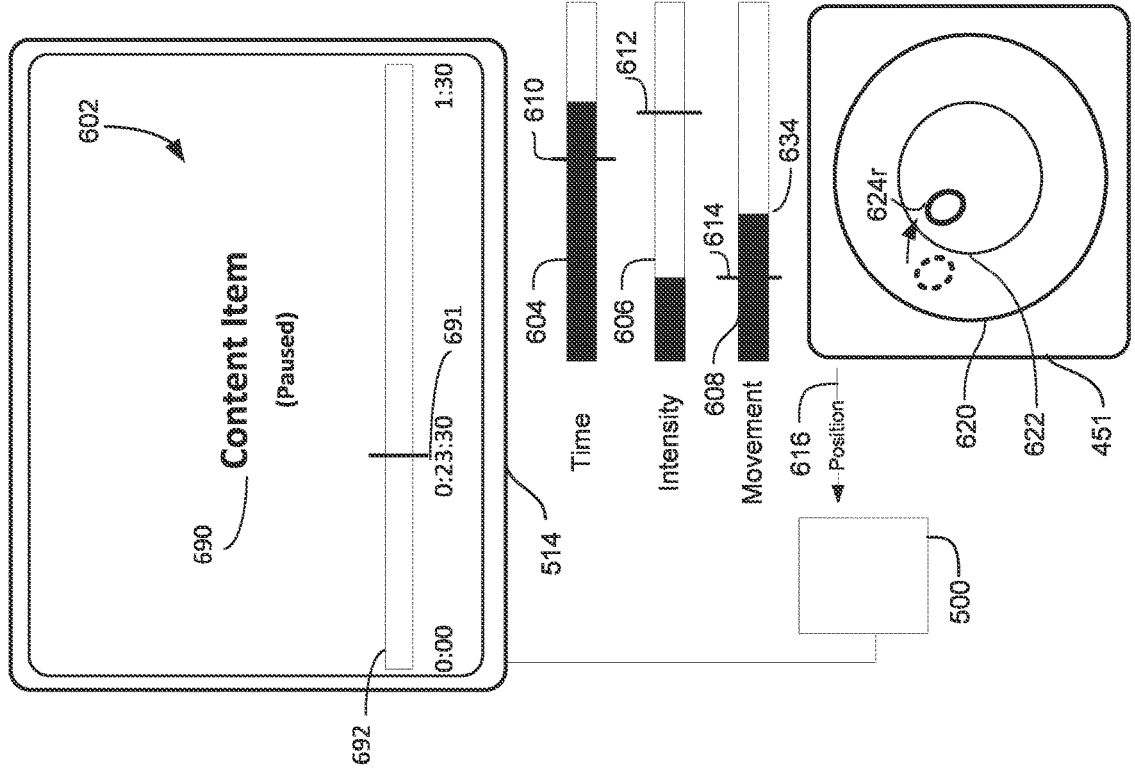
Figure 6S:
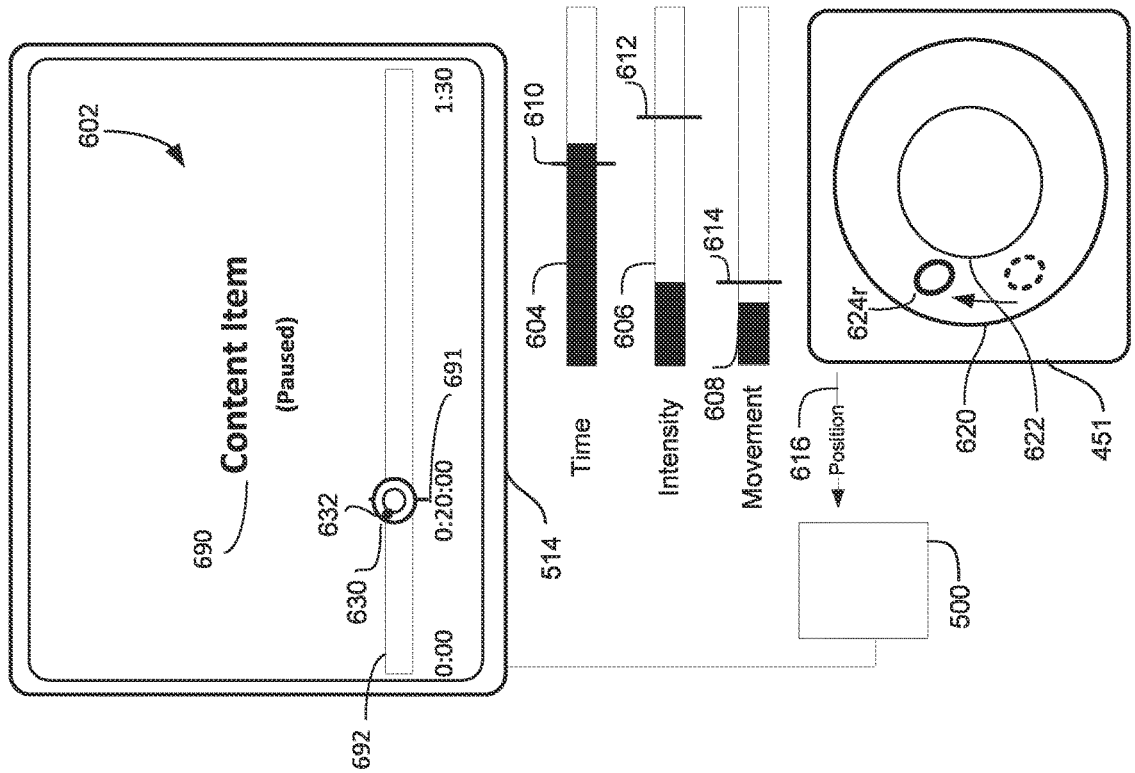

In FIG. 6S, the touch-sensitive surface 451 detects movement of touch contact 624*r* from its touchdown location (indicated by the dashed-line touch contact) to a new location in the outer circular touch region 620. In response to the touch-sensitive surface 451 detecting movement of touch contact 624*r*, the touch-sensitive surface 451 transmits information about the position 616 of the touch contact 624*r* to device 500. The touch-sensitive surface 451 additionally detects that touch contact 624*r* has been in the outer circular touch region 620 for more than a time threshold 610, has not moved more than a movement threshold 614, and has an intensity less than intensity threshold 612. In FIG. 6S, the touch contact 624*s* satisfies the above mentioned criteria for scrubbing the scrubber bar in accordance with the first mode of navigation. As a result, the electronic device 500 updates the current playback position indicator 691 to include a representation 630 of the touch-sensitive surface 451 and a representation 632 of touch contact 624*r* that indicates that movement of touch contact 624*r* more than movement threshold 614 (e.g., touch sensitive surface 451 identifies touch contact 624*r* as a swipe) will result in the scrubber bar being scrubbed in accordance with the first mode of navigation.

In FIG. 6T, after the scenario in FIG. 6S, the touch-sensitive surface 451 detects touch contact 624*r* moving from a location in the outer touch circular region 620 to a location in the inter touch circular region 622. In response to the touch-sensitive surface 451 detecting movement of touch contact 624*r*, the touch-sensitive surface 451 transmits information about the position 616 of touch contact 624*r* to device 500. The touch-sensitive surface 451 additionally detects touch contact 624*r* has been on the touch-sensitive surface for more than a time threshold 610, has an intensity less than intensity threshold 612, and has moved more than movement threshold 614 (as indicated by movement magnitude 634).

In some embodiments, while a scrubber bar is being scrubbed with the first mode of navigation, the scrubber bar continues to be navigated in the first mode of navigation until a touch contact, associated with scrubbing in the first mode of navigation, moves from the outer circular touch region 620 to inner circular touch region 622. For example, as illustrated in FIG. 6T, in response to the touch contact moving out of outer circular touch region 620, the scrubber bar 692 exits the first mode of navigation and becomes associated with the second mode of navigation. As a result of the scrubber bar no longer being navigated in accordance with the first mode of navigation, the representation 630 of the touch sensitive surface is no longer displayed, and the current playback indicator 691 is updated to indicate that scrubbing in the scrubber bar will be in accordance with the second mode of navigation (indicated by the current playback indicator 691 being displayed with a vertical line) rather than the first mode of navigation.

Additionally, because the touch contact 624*r* moved more than movement threshold 614 (e.g., identified as a swipe), the scrubber bar 692 is scrubbed in accordance with the second mode of navigation. In response to the touch-sensitive surface 451 detecting movement of touch contact 624*r* in a 'right' movement direction, the current playback position indicator 691 is scrubbed forwards by 3.5 minutes—from playback position '0:20:00' in FIG. 6S to playback position '0:23:30'. In other words, the precision of the second mode of navigation defines that for the amount of movement detected for touch contact 624*r* (indicated by movement magnitude 634), the current playback position should be scrubbed by 3.5 minutes and the movement direction of touch contact 624*r* to the right resulted in the scrubber bar being scrubbed forward. Referring back to FIG. 6O, the precision of the first mode of navigation determined that for the same amount of movement of a touch contact 624*m* (indicated by movement magnitude 634 in FIG. 6O) that the current playback position should be scrubbed by only thirty seconds. Therefore, in some embodiments, the first mode of navigation provides a higher degree of precision of scrubbing as compared with the second mode of navigation.

Figure 6U:
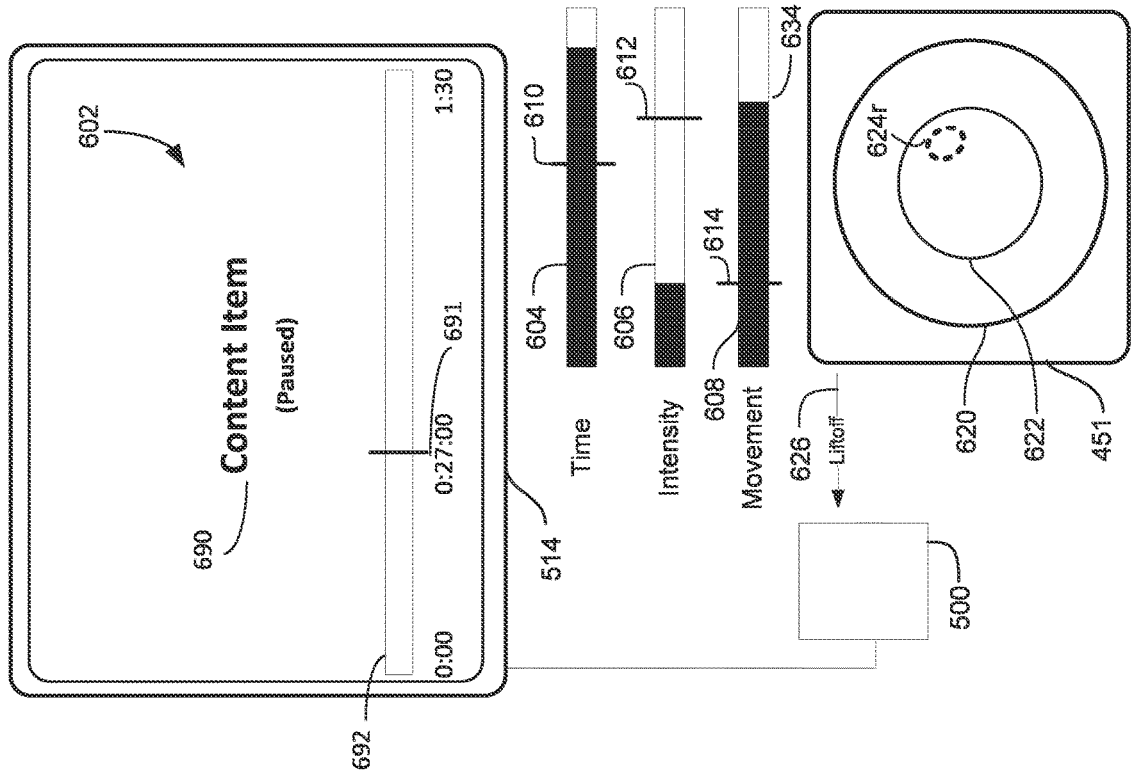

In FIG. 6U, after detecting movement of touch contact 624*r* and while scrubbing with the second mode of navigation, the touch-sensitive surface 451 detects further rightward movement of touch contact 624*r* from the location of touch contact in FIG. 6T (indicated by dashed-line touch contact) to a new location in the inner circular touch region 622 (indicated by solid touch contact 624*r*). In response to the touch-sensitive surface 451 detecting further movement of touch contact 624*r* in the rightward direction, the touch-sensitive surface 451 transmits information about the position 616 of the touch contact 624*r* to device 500. Additionally, the touch-sensitive surface 451 detects that touch contact 624*r* has been on the touch-sensitive surface for a duration of time more than time threshold 610, has an intensity less than intensity threshold 612, and has movement more than movement threshold 614 (indicated by movement magnitude 634). In response to the touch-sensitive surface 451 detecting additional movement of touch contact 624*r* in a rightward movement direction, the current playback position indicator 691 is scrubbed forwards by 3.5 minutes—from playback position '0:23:30' in FIG. 6T to playback position '0:27:00'. In other words, the precision of the second mode of navigation determined that for the amount of additional movement detected for touch contact 624*r* (indicated by movement magnitude 634), the current playback position should be scrubbed forwards by 3.5 minutes. Referring back to FIG. 6P, when compared to the first mode of navigation, the precision of the first mode of navigation determined for the same amount of movement of a touch contact 624*m* (indicated by movement magnitude 634 in FIG. 6P), the current playback position should be scrubbed forwards by thirty seconds.

Figure 6V:
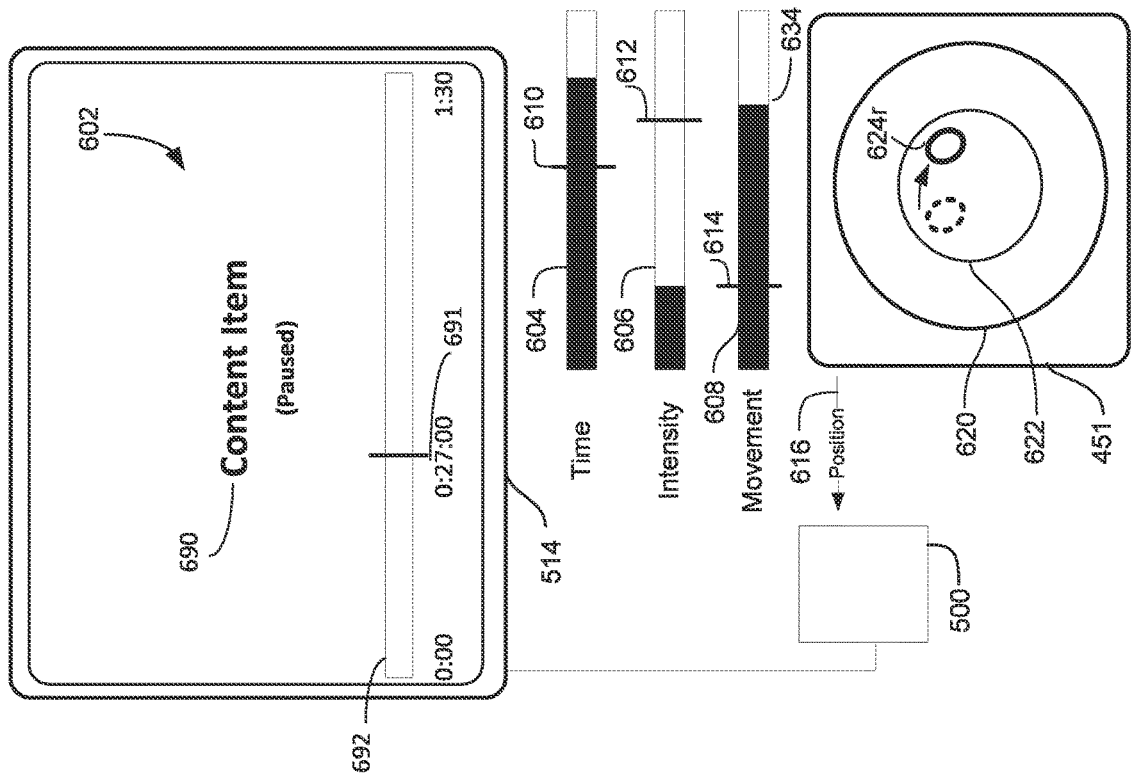

In FIG. 6V, after detecting the further movement of touch contact 624*r* and after some amount of time has passed, the touch-sensitive surface 451 detects liftoff of touch contact 624*r*. In response to the touch-sensitive surface 451 detecting liftoff of touch contact 624*r*, the touch-sensitive surface 451 transmits a liftoff event to electronic device 500. In response to the touch-sensitive surface 451 detecting liftoff of touch contact 624r, the current playback indicator 691 is continued to be displayed with a vertical line to indicate future contact will be associated with the second mode of navigation—until subsequent touch contact is detected that satisfies criteria for scrubbing (e.g., navigating) in the first mode of navigation.

Figure 6X:
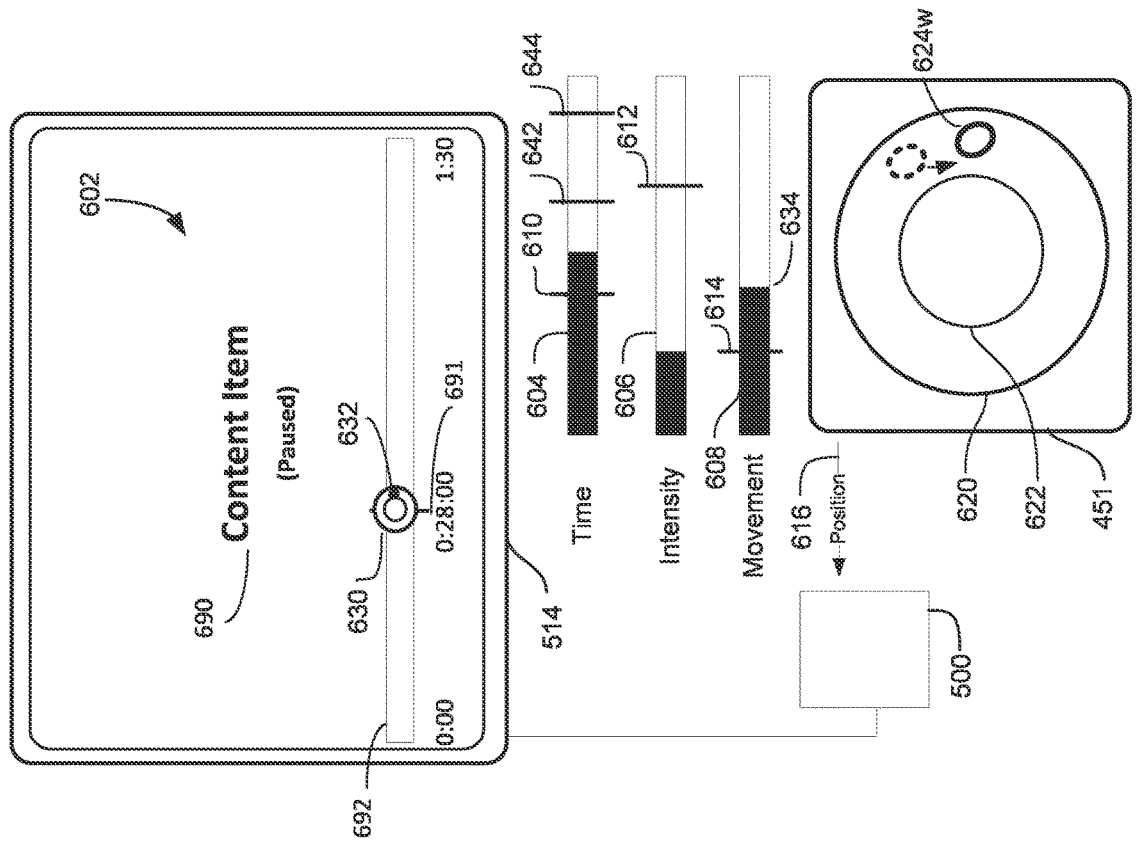
Figure 6W:
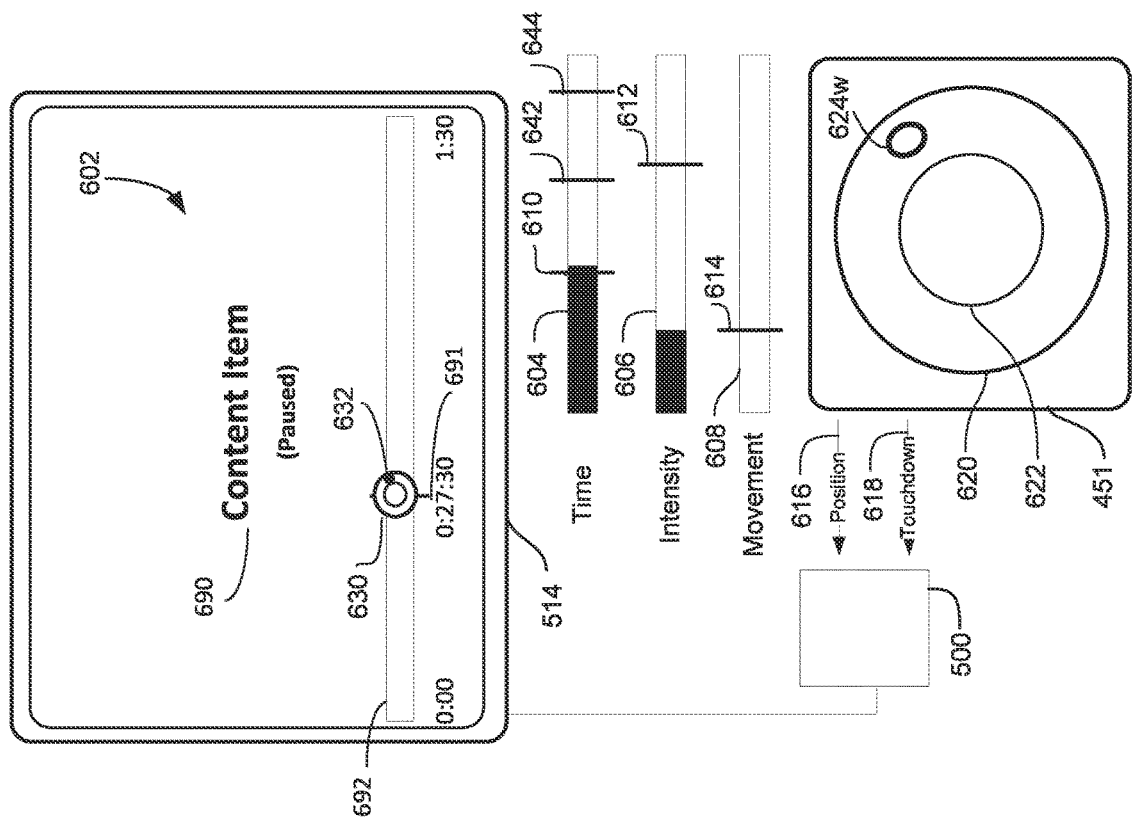
Figure 6D:
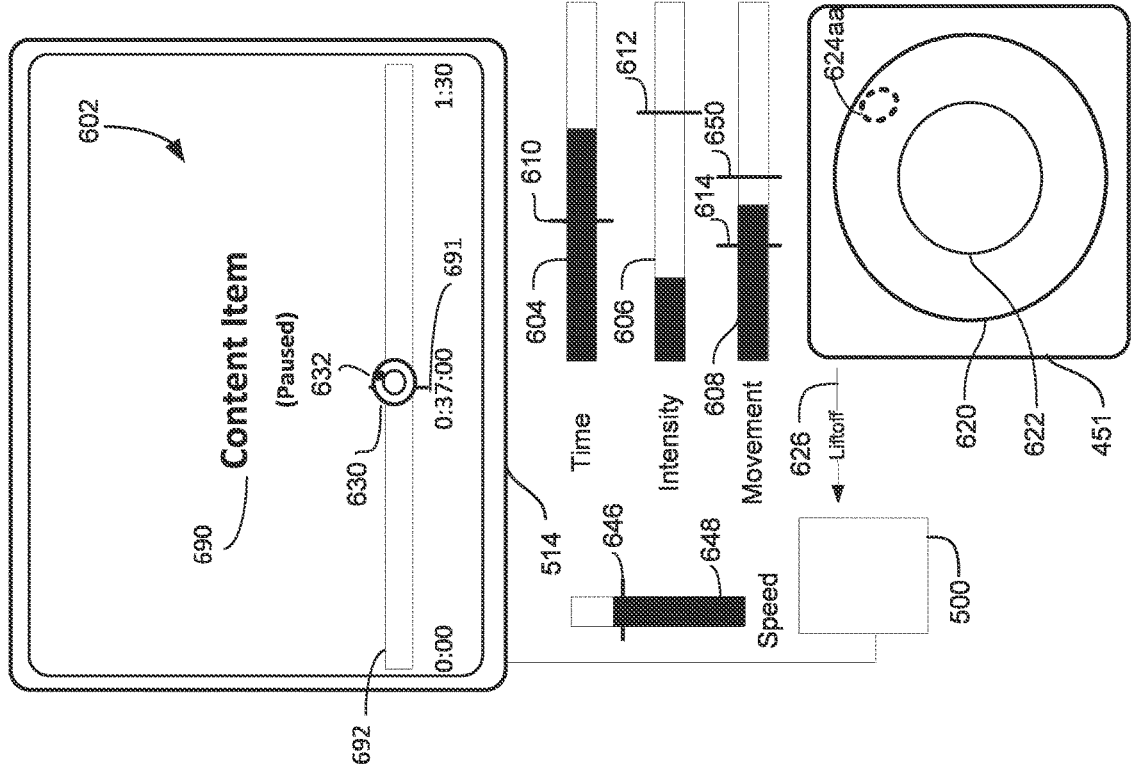
Figure 6C:
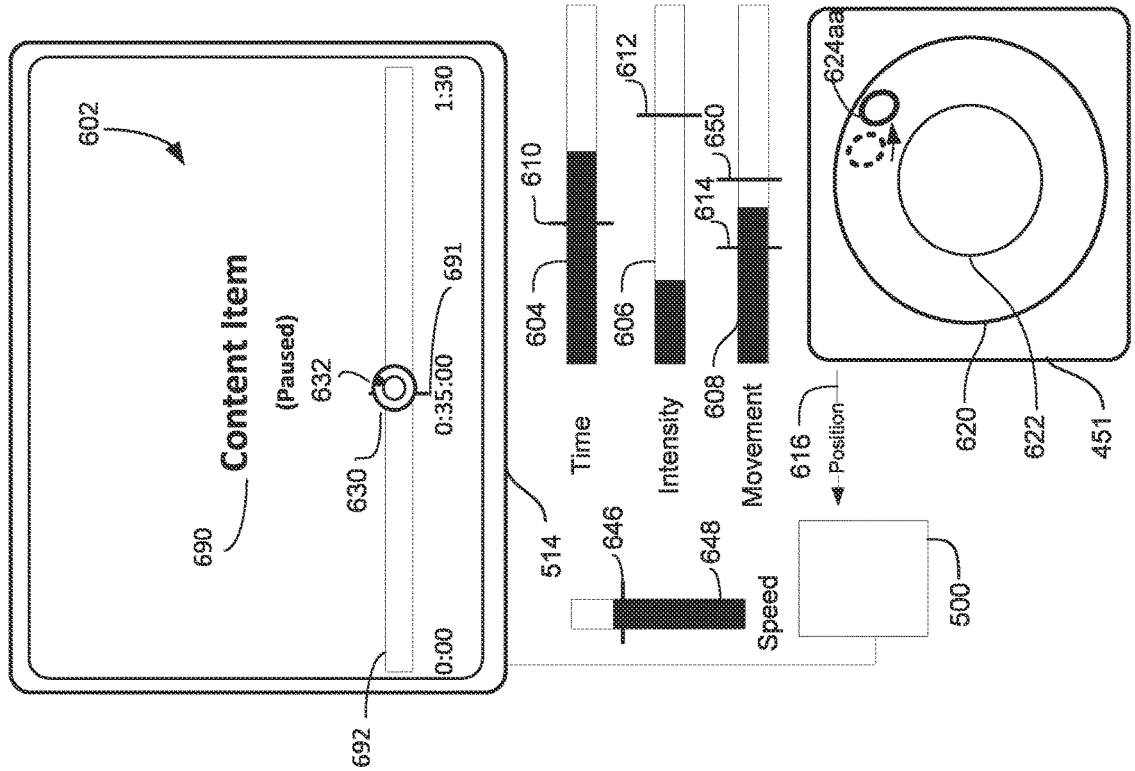
Figure 6G:
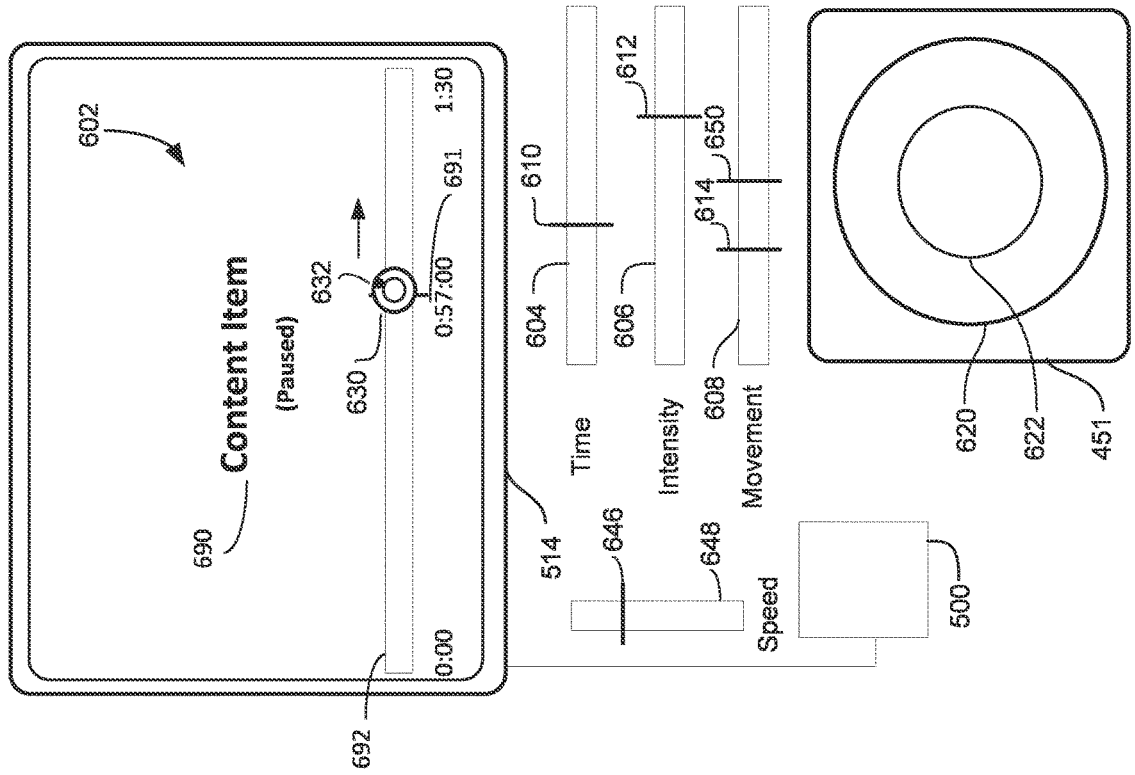
Figure 6H:
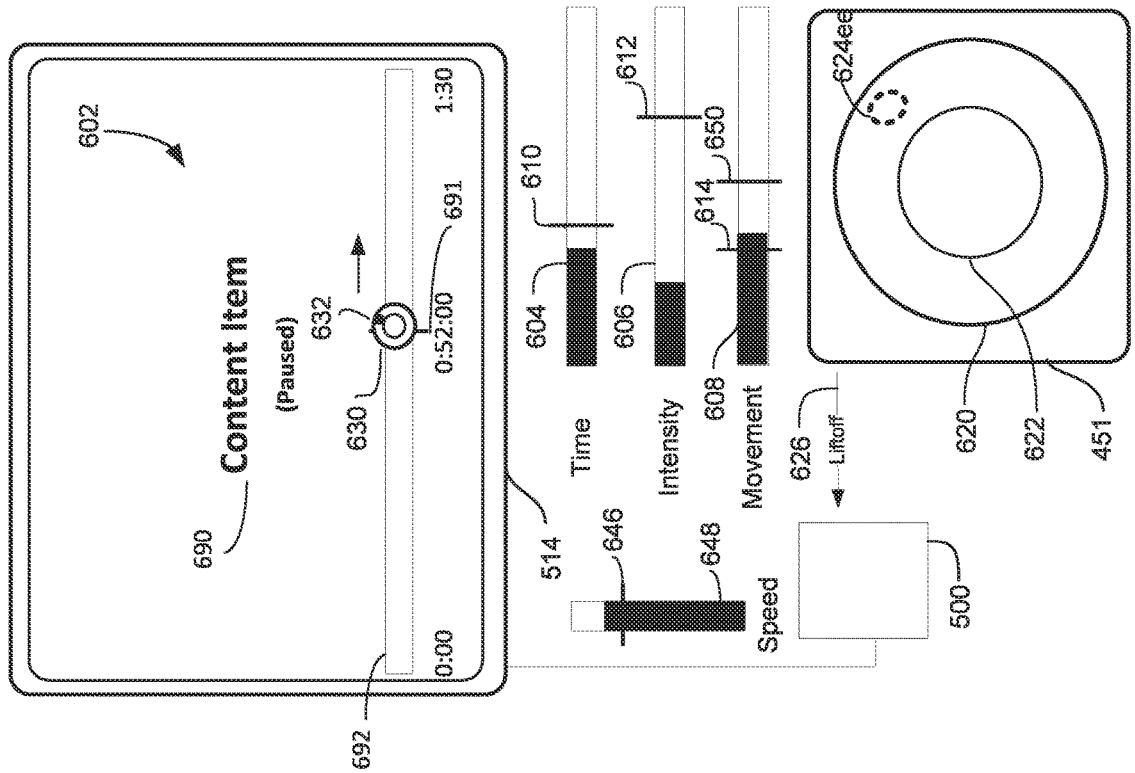
Figure 6N:
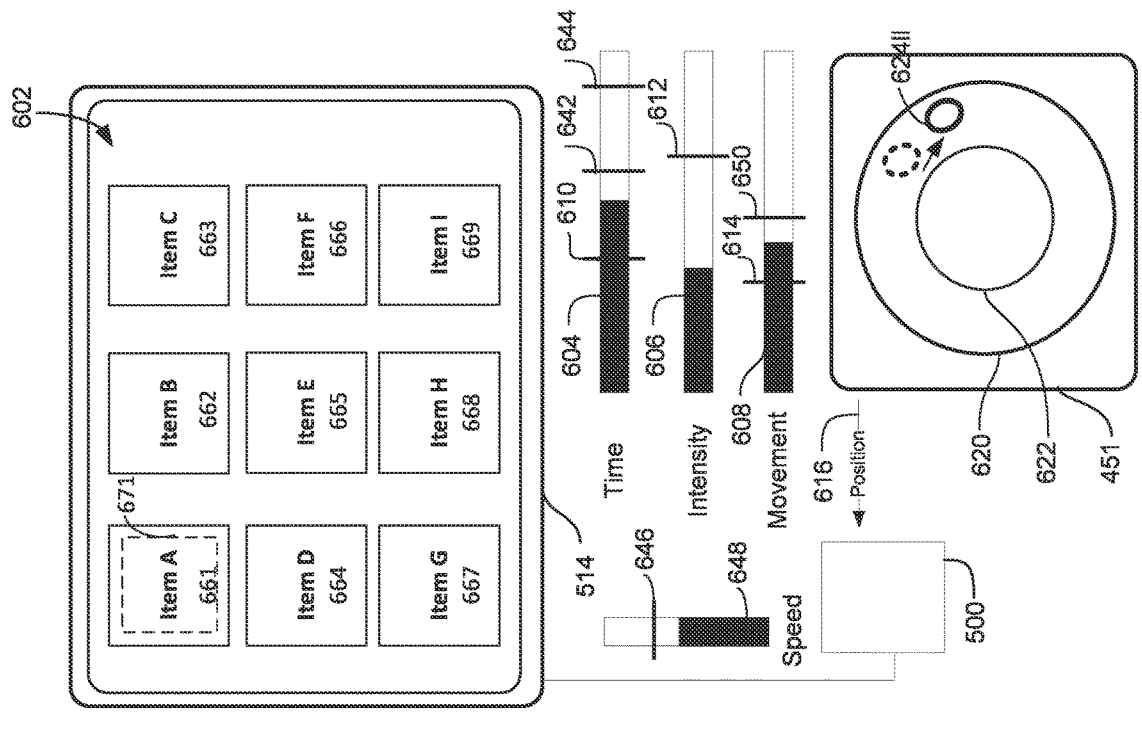
Figure 6M:
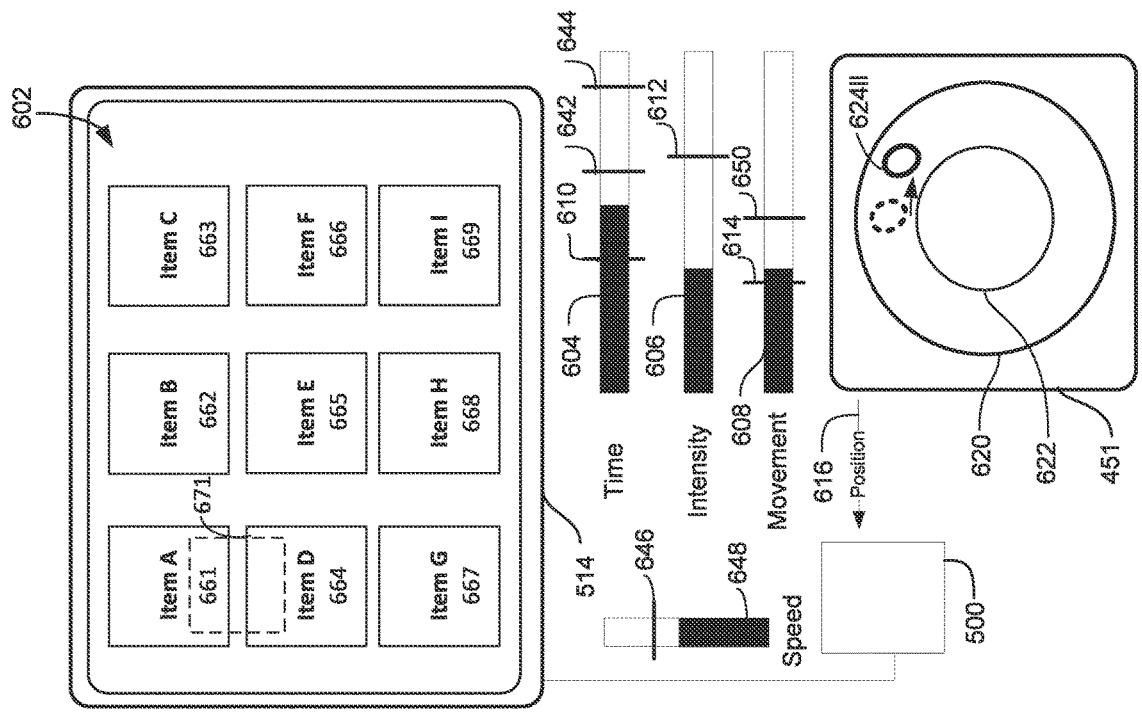
Figure 6P:
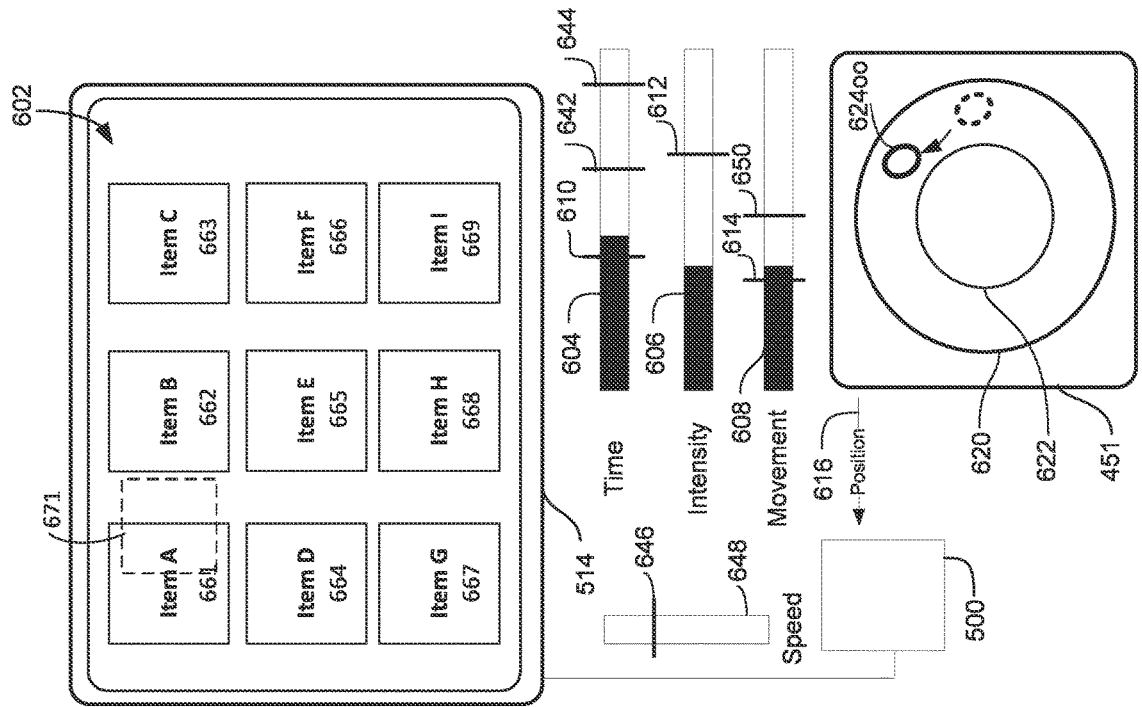
Figure 6O:
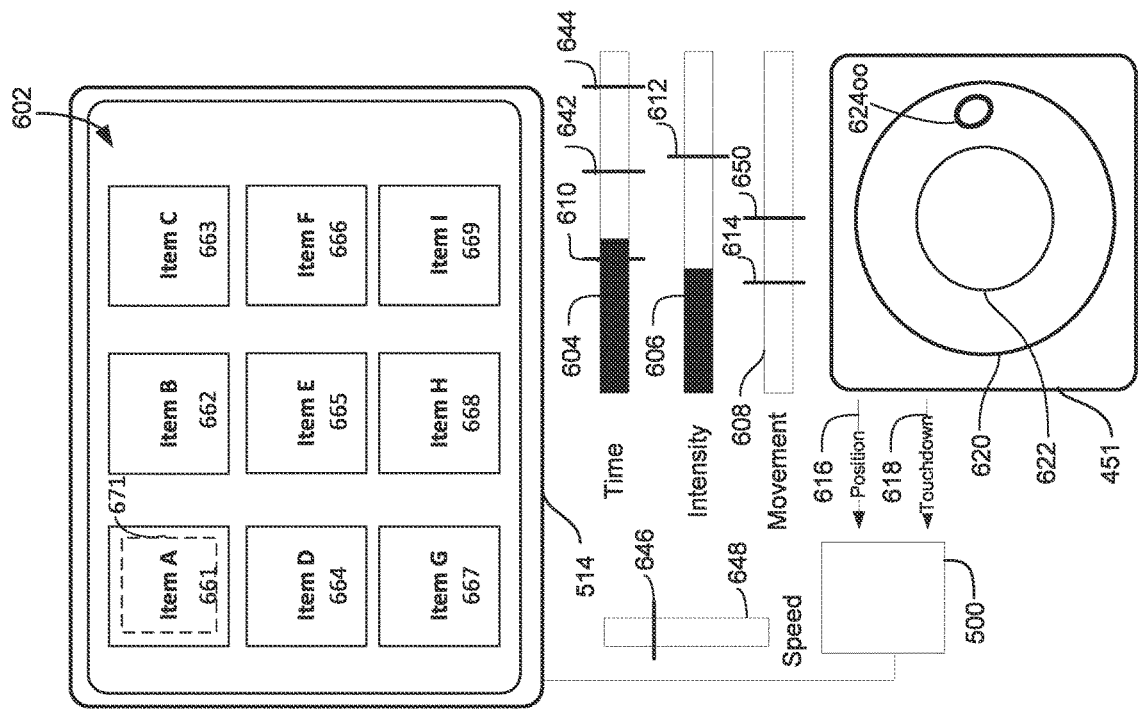
Figure 6R:
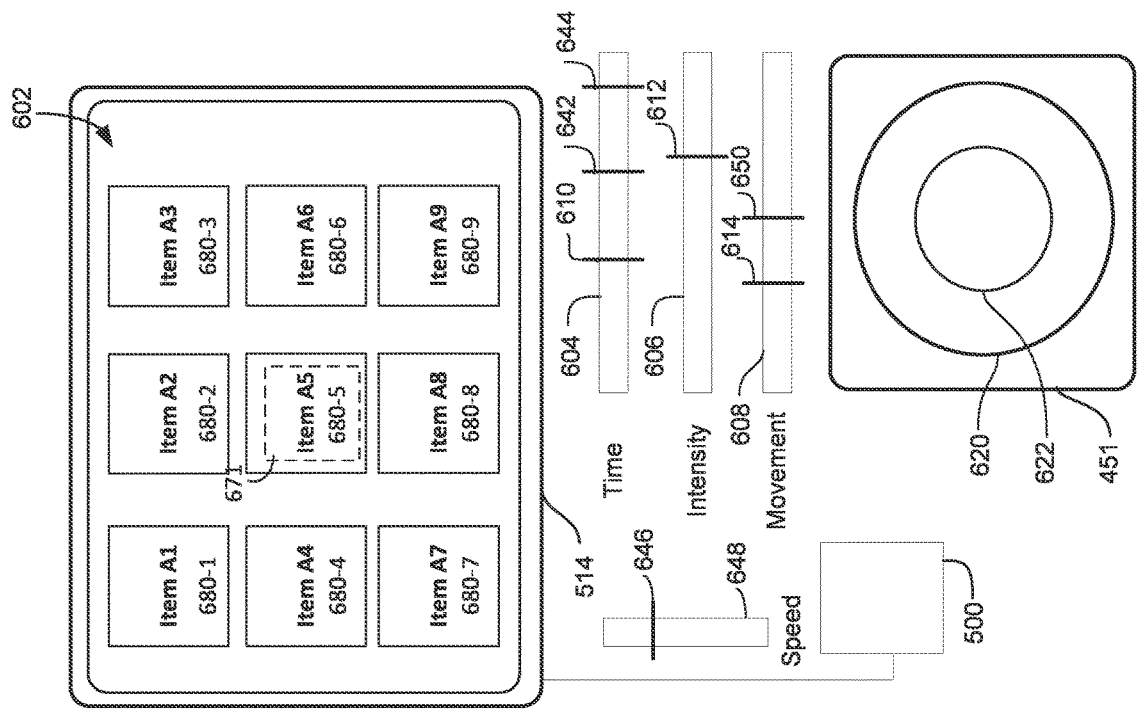
Figure 6Q:
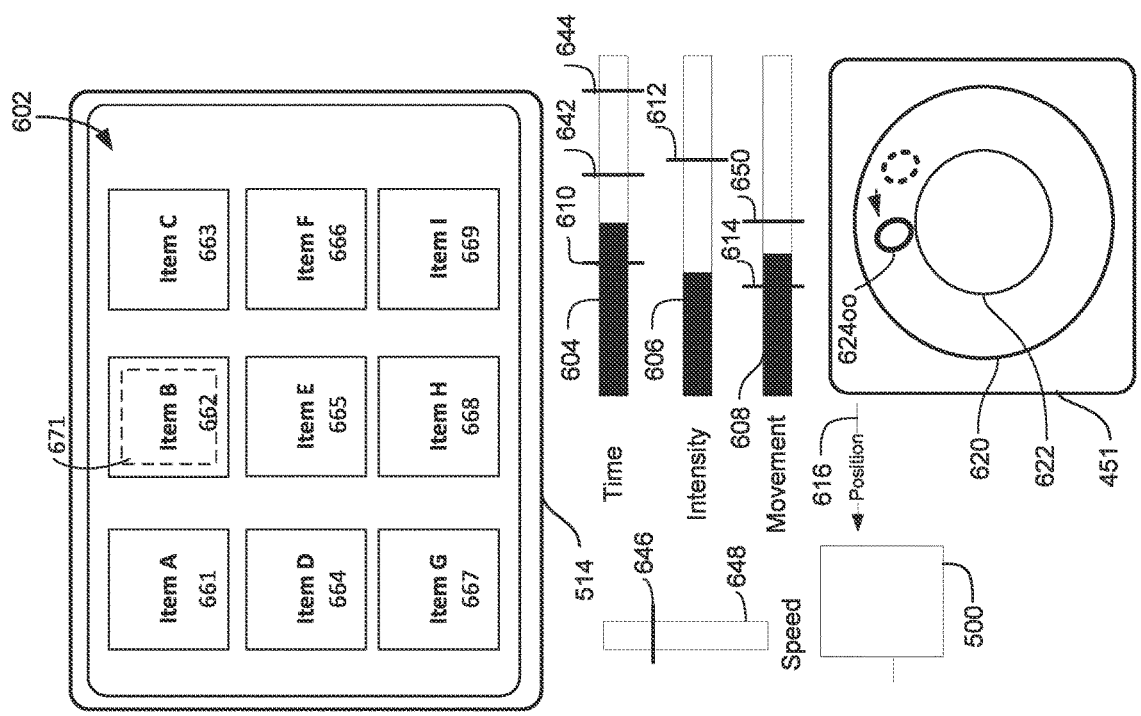
Figure 6X:
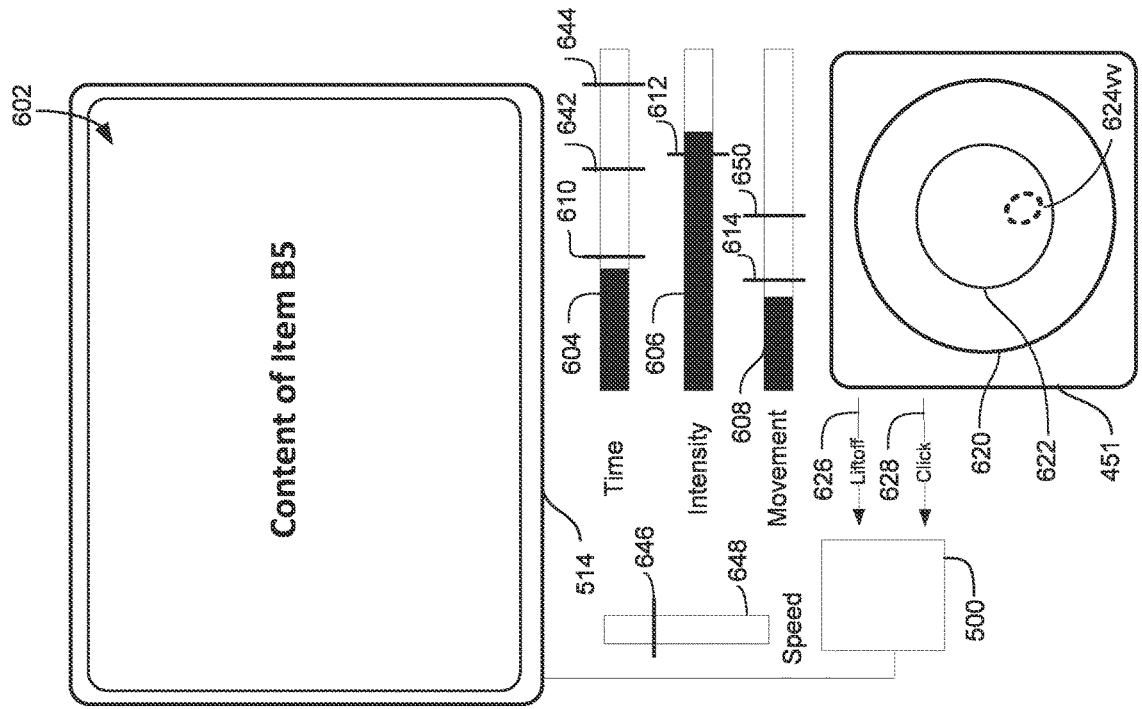
Figure 6W:
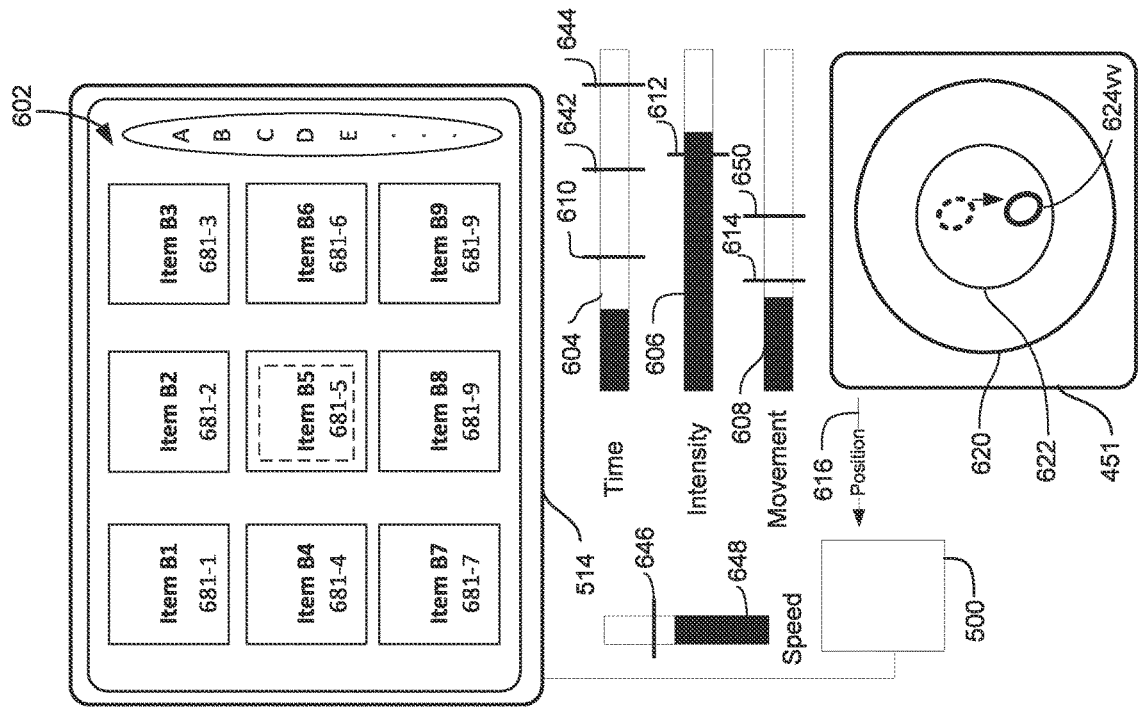

FIGS. 6W-6Z illustrate an exemplary way of changing the precision of the first mode of navigation based on the amount of time a touch contact has been on the touch-sensitive surface. In FIG. 6W, the touch-sensitive surface detects a touchdown of touch contact 624w in the outer circular touch region 620 after device 500 had performed an additional thirty seconds of scrubbing from FIG. 6V. In response to the touch-sensitive surface 451 detecting the touchdown of touch contact 624w, the touch-sensitive surface 451 transmits information about the position 616 of touch contact 624w and the touchdown event 618 to device 500. Additionally, the touch-sensitive surface 451 detects that the touch contact 624w has been on the touch-sensitive surface 451 for a duration longer than time threshold 610, but not longer than time thresholds 642 and 644. The touch-sensitive surface 451 also detects that the intensity of touch contact 624w is less than intensity threshold 612 and the movement of touch contact 624w is less than movement threshold 614. As a result of touch contact 624w having a touchdown location within the outer circular touch region 620, having been on the touch-sensitive surface 451 for more than time threshold 610, and not having moved more than a threshold amount during time threshold 610, the touch contact 624w satisfies criteria for navigating in the first mode of navigation, indicated by the current playback indicator 691 including the representation 630 of the touch sensitive surface 451.

In FIG. 6X, the touch-sensitive surface 451 detects that touch contact 624w has moved from its initial touch down location (indicated by the dashed touch contact) to a new location in the outer circular touch region 620 (indicated by solid touch contact 624w). In response to detecting movement of touch contact 624w, the touch-sensitive surface 451 transmits information about the position 616 of touch contact 624w to device 500. Additionally, the touch-sensitive surface 451 detects that touch contact 624w moved more than a movement threshold 614 (indicated by movement magnitude 634) while the duration the touch contact 624w has been on the touch-sensitive surface is more than time threshold 610, but less than time thresholds 642 and 644.

In some embodiments, the precision of the first mode of navigation is adjusted in accordance with the duration of time a touch contact has been on the touch-sensitive surface during the current instance of the first mode of navigation. For example, in FIG. 6X, because touch contact 624 has been on the touch-sensitive surface for a duration of time greater than time threshold 610, but less than time threshold 642, the precision of the first mode of navigation determines that for the amount of movement touch contact 624w moved (indicated by movement magnitude 634), the playback position should be scrubbed forwards by thirty seconds—from playback position '0:27:30' in FIG. 6W to playback position '0:28:00' in FIG. 6X. Additionally, in FIG. 6X, the location of the representation 632 of touch contact 624w is updated in a similar manner described previously.

In FIG. 6Y, the touch-sensitive surface 451 detects further movement of touch contact 624w—in a clock wise direction—from the location of touch contact 624w in FIG. 6X (indicated by dashed touch contact) to a new location in the outer circular touch region 620. In response to detecting movement of touch contact 624w in a clock wise direction, the touch-sensitive surface 451 transmits information about the new position 616 of touch contact 624w to device 500. Additionally, the touch-sensitive surface 451 detects that touch contact 624w moved more than a movement threshold (indicated by movement magnitude 634) while the duration the touch contact 624w has been on the touch-sensitive surface is more than time threshold 642, but less than time threshold 644.

As mentioned previously, in some embodiments, the precision of the first mode of navigation is adjusted in accordance with the duration of time a touch contact has been on the touch-sensitive surface. For example, in FIG. 6Y, because touch contact 624 has now been on the touch-sensitive surface for a duration of time greater than time threshold 642, but less than time threshold 644, the precision of the first mode of navigation determines that for the amount of movement contact 624w moved (indicated by movement magnitude 634), the playback position should be scrubbed forwards by sixty seconds—from playback position '0:28:00' in FIG. 6X to playback position '0:29:00' in FIG. 6Y, even though the amount of movement of touch contact 624w between its touchdown location and the location of touch contact 624w in FIG. 6Y, and the amount of movement of touch contact 624w between the location of touch contact 624w in FIG. 6Y and the location of touch contact 624w in FIG. 6X had the same magnitude. Additionally, in FIG. 6X, the location of the representation 632 of touch contact 624w is updated in a similar manner described previously.

Figure 6Z:
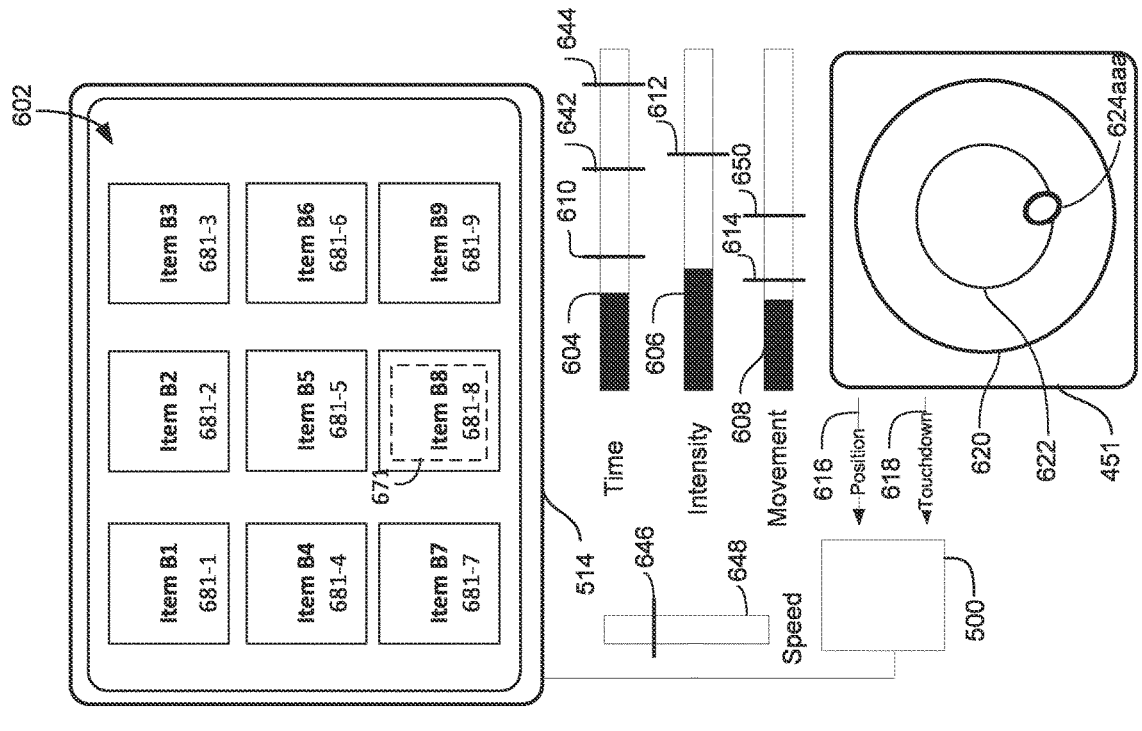
Figure 6Z:
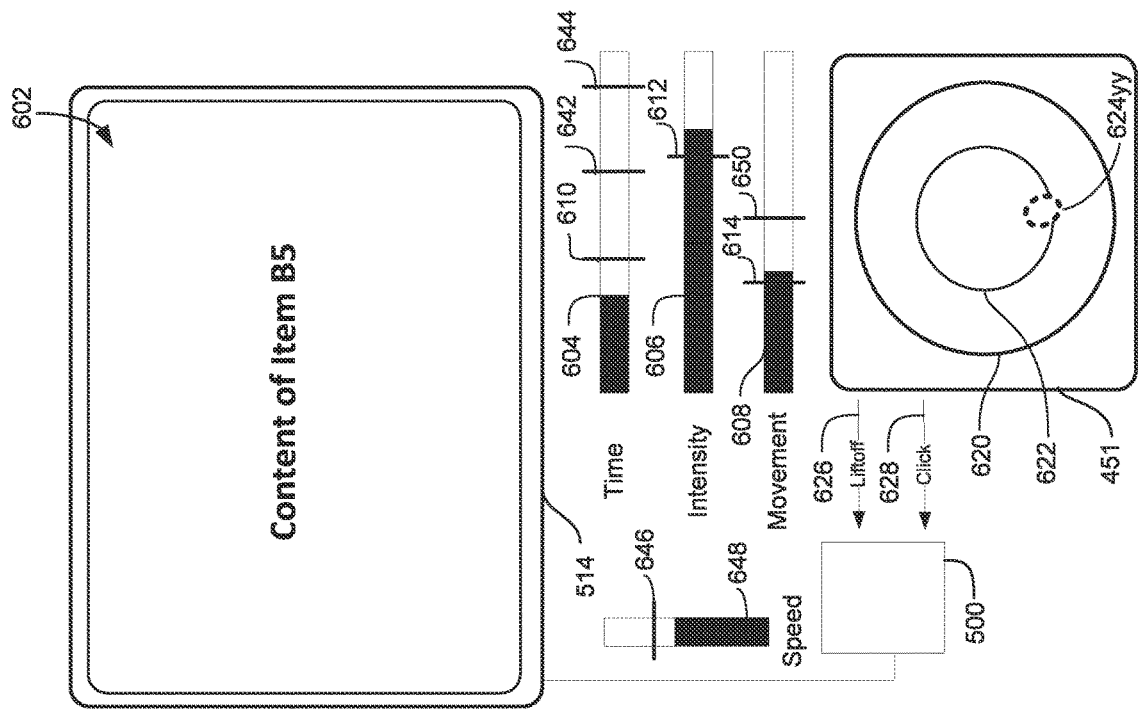

In FIG. 6Z, after some amount of time has passed from FIG. 6Y, the touch-sensitive surface 451 detects liftoff of touch contact 624w. In response to the touch-sensitive surface 451 detecting liftoff of touch contact 624w, the touch-sensitive surface 451 transmits a liftoff event to electronic device 500. In response to the touch-sensitive surface 451 detecting liftoff of touch contact 624w, the current playback indicator 691 continues to be displayed with a vertical line to indicate future contact will be associated with the second mode of navigation—until subsequent touch contact is detected that satisfies criteria for scrubbing (e.g., navigating) in the first mode of navigation. In some embodiments, the electronic device 500 remains in the first mode of navigation in response to detecting liftoff of touch contact 624w until a time threshold (e.g., 0.1, 0.3, 0.5, 1, 3, 5 or 10 seconds) after liftoff of touch contact 624w is reached, at which point the electronic device 500 transitions to the second mode of navigation.

FIGS. 6AA-6JJ illustrate an exemplary way of scrubbing a playback position in a scrubber bar based on an inertia associated with one or more touch contacts. In FIG. 6AA, the touch-sensitive surface detects a touchdown of touch contact 624aa in the outer circular touch region 620. In response to the touch-sensitive surface 451 detecting the touchdown of touch contact 624aa, the touch-sensitive surface 451 transmits information about the position of touch contact 624aa and the touchdown event 618 to device 500. Additionally, the touch-sensitive surface detects that the touch contact 624aa has been on the touch sensitive surface 451 for a duration longer than time threshold 610, has an intensity less than intensity threshold 612, has moved less than movement threshold 614, and a speed less than speed threshold 646 (shown in speed bar 648). As a result of touch contact 624w having a touchdown location within the outer circular touch region 620, having been on the touch-sensitive surface 541 for more than time threshold 610, and not having moved more than movement threshold 614 during time threshold 610, the touch contact 624aa satisfies criteria for navigating in the first mode of navigation, indicated by the current playback indicator 691 including the representation 630 of the touch sensitive surface 451.

In FIG. 6BB, the touch-sensitive surface 451 detects movement—in a clockwise direction—from the touchdown location of touch contact 624*aa* (indicated by the dashed-line touch contact) to a new location in the outer circular touch region 620 (indicated by solid touch contact 624*aa*). In response to detecting movement of touch contact 624*aa*, the touch-sensitive surface transmits information about the position 616 of the touch contact 624*aa* in the outer circular tough region 620 to device 500. The touch-sensitive surface also detects that the movement of touch contact 624*aa* is more than movement threshold 614 but less than movement threshold 650 and moved at a speed less than speed threshold 646.

In some embodiments, when a touch contact moves more than movement threshold 614 but less than movement threshold 650, the touch-sensitive surface 451 identifies the touch contact as a short swipe, and when the touch contact moves more than movement threshold 650, the touch-sensitive surface 451 identifies the touch contact as a long swipe. In some embodiments, if a touch contact does not move more than movement threshold 614, the touch contact is not identified as any type of swipe. In the example of FIG. 6BB, the touch-sensitive identifies touch contact 624*aa* as a short swipe, because the touch contact has moved more than movement threshold 614 but less than movement threshold 650.

In some embodiments, if a touch contact (or a plurality of touch contacts) is identified as a short swipe (or swipes) with a speed greater than speed threshold 646, a playback position in the scrubber is optionally scrubbed with inertia. For example, in FIG. 6BB, the touch-sensitive surface 451 identifies touch contact 624*aa* as a short swipe having a speed less than speed threshold 646. In response to determining that the touch contact 624*aa* does not meet the criteria for scrubbing the playback position with inertia, the precision of the first mode of navigation defines that the current playback indicator 691 should be scrubbed forward by one minute (from playback position '0:29:00' in FIG. 6AA to '0:30:00' in FIG. 6BB) based on the amount of movement of touch contact 624*aa* (indicated by movement bar 608). In other words, because touch contact 624*aa* did not meet the criteria for scrubbing with inertia, the amount of scrubbing caused by touch contact 624*aa* is optionally based on the characteristics of the first mode of navigation, described previously, and is not based on an inertial effect associated with touch contact 624*aa*.

In FIG. 6CC, the touch-sensitive surface 451 detects further movement of touch contact 624*aa*—in the clockwise direction—from the location of touch contact 624*aa* in FIG. 6BB (indicated by dashed-line touch contact) to a new location in the outer circular touch region 620 (indicated by solid touch contact 624*aa*). In response to detecting movement of touch contact 624*aa*, the touch-sensitive surface 451 transmits information about the new position 616 of touch contact 624*aa* to device 500. The touch-sensitive surface 451 also detects that the movement of touch contact 624*aa* is more than movement threshold 614 but less than movement threshold 650 and is moving at a speed more than speed threshold 646. As a result, the touch-sensitive surface 451 now identifies touch contact 624*aa* as a short swipe having a speed greater than speed threshold 646, which satisfies criteria for scrubbing the current playback indicator 691 with inertia. In response to determining that the touch contact 624*aa* satisfies the criteria for scrubbing the playback position with inertia, the precision of the first mode of navigation defines that the current playback indicator 691 should be scrubbed forward by a number of minutes. Specifically, in the example of FIG. 6CC, the precision of the first mode of navigation defines that the current playback indicator 691 should be scrubbed forward by five minutes (from playback position '0:30:00' in FIG. 6BB to playback position '0:35:00' in FIG. 6CC) based on the amount of movement of touch contact 624*aa* (indicated by movement bar 608) and the inertia generated from the touch contact 624*aa* moving across the touch-sensitive surface 451. Thus, in the example of FIG. 6CC, because touch contact 624*aa* satisfied criteria for scrubbing with inertia (e.g., a short swipe with a speed greater than a speed threshold), the scrubber bar 692 is scrubbed by an amount more than the scrubbing amount that would be performed if touch contact 624*aa* moved with the same amount of movement as shown in FIG. 6CC but at a speed less than the speed threshold 646 (e.g., short swipe with a speed less than a speed threshold). In addition, in the example of FIG. 6CC, because touch contact 624*aa* satisfied criteria for scrubbing with inertia, the scrubber bar 692 is additionally scrubbed with inertia associated with touch contact 624*aa*.

In some embodiments, if the touch-sensitive surface 451 detects further sequential short swipes that also satisfy the criteria for scrubbing with inertia, the scrubber bar 692 is optionally scrubbed with a higher level of inertia (e.g., faster). For example, in FIG. 6DD, after detecting movement of touch contact 624*aa*, scrubbing based on inertia (e.g., based on the movement of touch contact 624*aa*) and/or movement of the touch contact 624*aa*, the touch-sensitive surface 451 detects liftoff of touch contact 624*aa*. In response to the touch-sensitive surface 451 detecting liftoff of touch contact 624*aa*, the touch-sensitive surface 451 transmits a liftoff event to electronic device 500. In FIG. 6DD, no further movement of touch contact 624*aa* was detected before the liftoff of touch contact 624*aa* (indicated by movement bar 608 in FIG. 6DD having the same amount of movement as in FIG. 6CC). In FIG. 6DD, even though no further movement of touch contact 624*aa* was detected and no other touch contacts were detected on the touch-sensitive surface 451, the current playback indicator 691 is scrubbing with inertia based on touch contact 624*aa*, and at the time shown in FIG. 6DD, the precision of the first mode of navigation defines that the current playback indicator 691 should be scrubbed forward by two minutes (from playback position '0:35:00' in FIG. 6CC to '0:37:00' in FIG. 6DD) based on inertia associated with touch contact 624*aa*.

In FIG. 6EE, after detecting liftoff of touch contact 624*aa* and scrubbing based on the inertia associated with touch contact 624*aa*, current playback indicator 691 continues scrubbing based on the inertia associated with touch contact 624*aa*—e.g., moving the current playback indicator 691 from playback position '0:37:00' in FIG. 6DD to playback position '0:40:00' in FIG. 6EE, without any other touch contact causing the scrubbing. In some embodiments, after a liftoff of a touch contact that satisfied criteria for causing the scrubber bar to be scrubbed with inertia, further touch contacts that also satisfy criteria for scrubbing with inertia optionally cause the scrubbing to occur with a higher level of inertia (e.g., faster). For example, in FIG. 6EE, while the current playback indicator 691 is being scrubbed with inertia, the touch-sensitive surface 451 detects a touchdown of touch contact 624*ee*. In response to detecting the touchdown of touch contact 624*ee*, the electronic device sends information about position 616 and the touchdown 618 to the electronic device 500. Additionally, the touch-sensitive surface 451 detects that the touch contact 624ee has been on the touch sensitive surface 451 for a duration of time less than time threshold 610, has an intensity less than intensity threshold 612, has moved less than movement threshold 614, and has a speed less than speed threshold 646 (shown in speed bar 648). As a result of touch contact 624ee not having moved more than movement threshold 614, the touch-sensitive system 451 does not identify the touch contact as a short swipe having a speed greater than a speed threshold. Thus, touch contact 624ee, in FIG. 6EE, does not satisfy touch contact criteria for scrubbing with inertia and does not cause the scrubbing to occur with a higher level of inertia.

In FIG. 6FF, after detecting the touchdown of touch contact 624ee, the touch-sensitive surface 451 detects movement of touch contact 624ee from its initial touchdown location in FIG. 6EE (indicated by dashed-line touch contact) to a new location in the outer circular touch region 620. Additionally, the touch-sensitive surface 451 detects that the touch contact 624ee has been on the touch sensitive surface 451 for a duration of time less than time threshold 610, has an intensity less than intensity threshold 612, has moved more than movement threshold 614, and has a speed more than speed threshold 646 (shown in speed bar 648). As a result, the touch-sensitive surface 451 now identifies touch contact 624ee as a short swipe having a speed greater than speed threshold 646, which satisfies criteria for scrubbing the current playback indicator 691 with inertia, previously mentioned above. In response to determining that the touch contact 624ee satisfies the criteria for scrubbing the playback position with inertia, the touch contact 624ee increases the inertia of the current playback indicator 691 and the current playback indicator 691 begins scrubbing with a higher level of inertia. The precision of the first mode of navigation defines that the current playback indicator 691 should be scrubbed forward by ten minutes (from playback position '0:40:00' in FIG. 6EE to '0:50:00' in FIG. 6FF) based on the amount of movement of touch contact 624ee (indicated by movement bar 608) and the inertia generated from the touch contact 624aa and the touch contact 624ee. The amount of movement of touch contact 624ee illustrated from FIG. 6EE to FIG. 6FF is optionally the same amount of movement detected for touch contact 624aa in FIGS. 6AA-6CC, but because scrubber bar 692 is already scrubbing with inertia when touch contact 624ee is detected, scrubber bar 692 is scrubbed in an amount more than the amount scrubbed in FIGS. 6AA-6CC.

In FIG. 6GG, while the current playback indicator 691 is being scrubbed with inertia based on touch contacts 624aa and 624ee and after some amount of time has passed, the touch-sensitive surface 451 detects liftoff of touch contact 624ee. In response to the touch-sensitive surface 451 detecting liftoff of touch contact 624ee, the touch-sensitive surface 451 transmits a liftoff event to electronic device 500. In FIG. 6GG, no further movement of touch contact 624ee was detected before the liftoff of touch contact 624ee (indicated by movement bar 608 in FIG. 6GG having the same amount of movement in FIG. 6FF). In FIG. 6GG, even though no further movement of touch contact 624aa was detected and no other touch contacts are detected on the touch-sensitive surface 451, the precision of the first mode of navigation defines that the current playback indicator 691 should be scrubbed forward by two minutes (from playback position '0:50:00' in FIG. 6FF to '0:52:00' in FIG. 6GG) based on inertia associated with touch contacts 624aa and 624ee.

In FIG. 6HH, after detecting liftoff of touch contact 624ee, the current playback indicator 691 continues scrubbing based on the inertia generated based on touch contacts 624aa and 624ee. In the example illustrated in FIG. 6HH, the precision of the first mode of navigation defines that the current playback indicator 691 should be scrubbed—by five minutes—from playback position '0:52:00' in FIG. 6GG to playback position '0:57:00' in FIG. 6HH based on the inertia generated based on touch contacts 624aa and 624ee.

In FIG. 6II, the current playback indicator 691 continues scrubbing based on the inertia generated based on touch contacts 624aa and 624ee. In the example illustrated in FIG. 6II, after some time has passed, the inertia, generated based on touch contacts 624aa and 624ee, is slowing and, thus, causing the scrubbing to slow. In the example illustrated in FIG. 6II, the precision of the first mode of navigation defines that the current playback indicator 691 should be scrubbed—by 4 minutes (as opposed to 5 minutes in FIG. 6HH)—from playback position '0:57:00' in FIG. 6HH to playback position '1:01:00' in FIG. 6II based on the inertia associated with touch contacts 624aa and 624ee.

In the example illustrated in FIG. 6JJ, after some time has passed from FIG. 6II, the inertia, generated based on touch contacts 624aa and 624ee is further slowing, thus causing the scrubbing to further slow. In the example illustrated in FIG. 6JJ, the precision of the first mode of navigation defines that the current playback indicator 691 should be scrubbed—by 1 minute (as opposed to 4 minutes in FIG. 6II)—from playback position '1:01:00' in FIG. 6II to playback position '1:02:00' in FIG. 6JJ based on the current inertia associated with touch contacts 624aa and 624ee.

In some embodiments, while the current playback indicator 691 is being scrubbed with inertia based on one or more prior-detected touch contacts, electronic device 500 optionally stops the scrubbing of current playback indicator 691 with inertia when a touch contact is detected on the touch-sensitive surface 451 in a respective area of the touch-sensitive surface and/or for more than a time threshold. For example, in FIG. 6JJ, the touch-sensitive surface 451 detects a touchdown of touch contact 624jj in a top portion of the outer circular touch region 620. In response to the touch-sensitive surface 451 detecting the touchdown of touch contact 624jj, the touch-sensitive surface 451 transmits information about the position of touch contact 624aa and the touchdown event 618 to device 500. Additionally, the touch-sensitive surface 451 detects that the touch contact 624jj has been on the touch sensitive surface 451 for a duration longer than time threshold 610. As a result of touch contact 624jj having a touchdown location within the top portion of the outer circular touch region 620, and having been on the touch-sensitive surface 451 for more than time threshold 610, the electronic device 500 stops current playback indicator 691 from scrubbing based on the inertia generated based on touch contacts 624aa and 624ee. In some embodiments, if touch contact 624jj had a touchdown location that was not in the top portion of the outer circular touch region 620, the scrubber bar 692 would continue scrubbing with inertia. Alternatively, if the touch-sensitive surface 451 detects a touchdown at any location on the touch-sensitive surface 451, electronic device 500 optionally stops the scrubbing of current playback indicator 691 with inertia. Additionally, or alternatively, if the touch-sensitive surface 451 detects a touchdown at any location in the outer circular touch region 620, the electronic device 500 optionally stops the scrubbing of current playback indicator 691 with inertia, while a touchdown at any location in the inner circular touch region 622 does not stop the scrubbing of current playback indicator 691 with inertia.

Various aspects of navigating based on touch contacts detected in the outer region 620 of touch-sensitive surface 451 described above in the context of a scrubber bar are also applicable to navigating other user interfaces. For example, FIGS. 6KK-6NN illustrate an exemplary way of navigating a plurality of objects based on the location of a touch contact in the outer circular touch region 620. In FIG. 6KK, display 514 displays a user interface 602 that includes a plurality of selectable content items 661-670. In some embodiments, selectable content items 661-670 optionally correspond to content items such as applications, games, media, etc. In user interface 602, Item D 664 currently has focus, indicated by dashed-line box 671. In some embodiments, when a touch contact moves more than a threshold amount such that touch-sensitive surface 451 identifies the touch contact as a swipe (movement more than movement threshold 614), a focus amongst the plurality of selectable content items optionally changes. In some embodiments, when a tap/click (e.g., selection) input is received, as will be further described below and as was discussed with reference to FIGS. 6B-6G, device 500 displays (e.g., plays) content corresponding to the content item that currently has the focus. The below examples of the disclosure are provided in the context of an array of selectable content items, but it is understood that the below examples of the disclosure are analogously applicable to navigating any array, row, column or other arrangement of items displayed in a user interface.

In FIG. 6LL, while Item D 664 has the focus, the touch-sensitive surface 451 detects a touchdown of touch contact 624*ll* in the outer circular touch region 620. In response to the touch-sensitive surface 451 detecting the touchdown of touch contact 624*ll*, the touch-sensitive surface 451 transmits information about the position of touch contact 624*ll* and the touchdown event 618 to device 500. Additionally, the touch-sensitive surface 451 detects that the touch contact 624*ll* has been on the touch sensitive surface 451 for a duration longer than time threshold 610, has an intensity less than intensity threshold 612, has moved less than movement threshold 614, and a speed less than speed threshold 646. As a result of touch contact 624*ll* having a touchdown location within the outer circular touch region 620, having been on the touch-sensitive surface 451 for more than time threshold 610, and not having moved more than movement threshold 614 during time threshold 610, the touch contact 624*aa* satisfies criteria for navigating user interface 602 in the first mode of navigation, as was previously described.

In some embodiments, while a user interface is being navigated with the first mode of navigation, the location of the touchdown that caused the user interface to begin navigating in the first mode of navigation determines a navigation direction for the navigation in the first mode of navigation. For example, in the example shown in FIG. 6LL, touch contact 624*ll* has a touchdown location in a top portion of outer circular touch region 620. As a result of touch contact 624*ll* touching down in the top portion of region 620, the electronic device 500 sets the navigation direction upward, thus causing any changes in focus resulting from movement of contact 624*ll* in region 620 to move in the upward direction.

For example, in FIG. 6MM, the touch-sensitive surface 451 detects movement—in a clockwise direction—from the touchdown location of touch contact 624*ll* (indicated by the dashed-line touch contact) to a new location in the outer circular touch region 620 (indicated by solid-line touch contact 624*ll*). In response to detecting movement of touch contact 624*ll*, the touch-sensitive surface 451 transmits information about the position 616 of the touch contact 624*ll* in the outer circular tough region 620 to the electronic device 500. The touch-sensitive surface 451 also detects that the movement of touch contact 624*ll* is more than movement threshold 614 but less than movement threshold 650 at a speed less than speed threshold 646. As stated previously, in some embodiments, if a touch contact moves more than movement threshold 614, the touch-sensitive surface identifies the touch contact as a swipe. In response to the touch-sensitive surface 451 identifying touch contact 624*ll* as a swipe, the focus begins to move upwards (e.g., because contact 624*ll* was first detected in the top region of region 620). As illustrated in FIG. 6MM, the precision of the first mode of navigation defines that the focus should move upward between Item A 671 and Item D 674 based on the amount of movement of touch contact 624*ll* (indicated by movement bar 608)—as touch contact 624*ll* did not move enough to fully move the focus upward to Item A 661.

In FIG. 6NN, the touch-sensitive surface 451 detects further movement of touch contact 624*ll*—in a clockwise direction—from the location of touch contact 624*ll* in FIG. 6MM (indicated by dashed-line touch contact) to a new location in the outer circular touch region 620 (indicated by solid touch contact 624*ll*). In response to detecting movement of touch contact 624*ll*, the touch-sensitive surface 451 transmits information about the new position 616 of touch contact 624*ll* to device 500. As illustrated in 6NN, the precision of the first mode of navigation defines that touch contact 624*ll* had moved enough to move the focus to Item A 661. Thus, as illustrated in FIGS. 6LL-6NN, in some embodiments, the touchdown location of a contact determines the direction in which a user interface will be navigated in accordance with subsequent movement of that contact in outer region 620.

FIGS. 6OO-6QQ illustrate another exemplary way of navigating a user interface based on the location of a touch contact in the outer circular touch region 620. In FIG. 6OO, while Item A 671 has the focus, the touch-sensitive surface 451 detects a touchdown of touch contact 624*oo* in the outer circular touch region 620. In response to the touch-sensitive surface 451 detecting the touchdown of touch contact 624*oo*, the touch-sensitive surface 451 transmits information about the position of touch contact 624*oo* and the touchdown event 618 to device 500. Additionally, the touch-sensitive surface 451 detects that the touch contact 624*oo* has been on the touch sensitive surface 451 for a duration of time longer than time threshold 610, has an intensity less than intensity threshold 612, has moved less than movement threshold 614, and a speed less than speed threshold 646. As a result of touch contact 624*oo* having a touchdown location within the outer circular touch region 620, having been on the touch-sensitive surface 451 for more than time threshold 610, and not having moved more than movement threshold 614 during time threshold 610, the touch contact 624*oo* satisfies criteria for navigating in the first mode of navigation, as was previously described.

As mentioned previously, in some embodiments, while a user interface is being navigated with the first mode of navigation, the location of the touchdown that caused the user interface to begin navigating in the first mode of navigation determines a navigation direction for that mode of navigation. For example, in the example shown in FIG. 6OO, touch contact 624*oo* has a touchdown location in a right portion of outer circular touch region 620. As a result of touch contact 624*oo* touching down in the right portion of region 620, the electronic device 500 sets the navigation direction to 'right', thus causing any changes in focus due to movements of contact 624*oo* in outer region 620 to move in the rightward direction.

In FIG. 6PP, the touch-sensitive surface 451 detects movement—in a counterclockwise direction—from the touchdown location of touch contact 624*oo* (indicated by the dashed-line touch contact) to a new location in the outer circular touch region 620 (indicated by solid-line touch contact 624*oo*). In response to detecting movement of touch contact 624*oo*, the touch-sensitive surface 451 transmits information about the position 616 of the touch contact 624*oo* in the outer circular region 620 to device 500. The touch-sensitive surface 451 also detects that the movement of touch contact 624*oo* is more than movement threshold 614 but less than movement threshold 650, and has moved at a speed less than speed threshold 646. As stated previously, in some embodiments, if a touch contact moves more than movement threshold 614, the touch-sensitive surface 451 identifies the touch contact as a swipe. In response to the touch-sensitive surface 451 identifying touch contact 624*oo* as a swipe, the focus begins to move rightwards (e.g., because contact 624*oo* touched-down in the right portion of region 620). As illustrated in FIG. 6PP, the precision of the first mode of navigation defines that the focus should move between Item A 661 and Item B 662 based on the amount of movement of touch contact 624*oo* (indicated by movement bar 608)—as touch contact 624*oo* did not move enough to fully move the focus rightward to Item B 662.

In FIG. 6QQ, the touch-sensitive surface 451 detects further movement of touch contact 624*oo*—in the counterclockwise direction—from the location of touch contact 624*oo* in FIG. 6PP (indicated by dashed-line touch contact) to a new location in the outer circular touch region 620 (indicated by solid touch contact 624*oo*). In response to detecting movement of touch contact 624*oo*, the touch-sensitive surface 451 transmits information about the new position 616 of touch contact 624*ll* to device 500. As illustrated in 6QQ, the precision of the first mode of navigation defines that touch contact 624*oo* has moved enough to move the focus fully to Item B 662. Thus, as illustrated in FIGS. 6OO-6QQ, in some embodiments, the touchdown location of a contact determines the direction in which a user interface will be navigated in accordance with subsequent movement of that contact in outer region 620, regardless of the direction of movement of that contact in outer region 620 (e.g., independent of whether the movement is clockwise or counterclockwise). In some embodiments, an orientation/tilt of the touch-sensitive surface 451 or of an electronic device having the touch-sensitive surface 451 optionally determines the direction in which a user interface will be navigated when a touchdown of a touch contact is detected on the touch-sensitive surface. For example, if the touch-sensitive surface 451 is being tilted upwards (or rightwards or leftwards, etc.) when a touch contact is detected on the touch-sensitive surface, subsequent movement of that contact will cause the user interface to be navigated in a upward (or rightward or leftward, etc.) direction.

FIGS. 6RR-6UU illustrate an example of navigating a plurality of selectable items based on an index. In FIG. 6RR, display 514 displays a user interface 602 that includes a plurality of items 680-1, 680-2, 680-3, 680-4, 680-5, 680-6, 680-7, 680-8, 680-9 corresponding to an index element A, with Item A3 680-3 currently having a focus (indicated by dashed-line box 671). In some embodiments, the plurality of items (e.g., movies, TV shows, songs) optionally correspond to the same index when they share a common characteristic (e.g., names start with a same character/letter). In the example illustrated in FIG. 6RR, items A1-A5 correspond in index A because each of the items start with the character 'A'.

In FIG. 6SS, while device 500 is displaying the plurality of items 680-1 to 680-9, the touch-sensitive surface 624 detects a touchdown of touch contact 624*ss* in the outer circular touch region 620. In response to the touch-sensitive surface 451 detecting the touchdown of touch contact 624*ss*, the touch-sensitive surface 451 transmits information about the position of touch contact 624*ss* and the touchdown event 618 to device 500. In some embodiments, when the user interface includes a plurality items that correspond to an index, if a touch contact has satisfied criteria for navigating the user interface in the first mode of navigation and the touch contact touched down at a location in the outer circular touch region 620 that is within a threshold distance of an edge of the outer circular touch region 620, the user interface is updated to include a scrollable index list, and is not displayed if the touch contact is not within the threshold distance of an edge. For example, in FIG. 6SS, the touch-sensitive surface 451 detects that touch contact 624*ss* is within a threshold distance of the right edge of the outer circular touch region 620 and satisfies the criteria for navigating the first user interface with the first mode of navigation, because touch contact 624*ss* has touched down in the outer circular touch region, has been on the touch-sensitive surface 451 for a duration of time longer than time threshold 610, and has not moved more than a threshold amount during time threshold 610. In response to touch-sensitive surface 451 detecting that touch contact 624*ss* is within a threshold distance of the right edge of the outer circular touch region 620 and the touch contact 624*ss* satisfies criteria for navigating with the first mode of navigation, user interface 602 is updated to include a scrollable index list 682, as shown in FIG. 6SS. In response to displaying scrollable index list 682, the focus of the user interface moves from Item A5 680-5 to Index A in the scrollable list index (the index corresponding to the currently displayed items A1-A5).

Scrollable list index 682 includes indices for different items and moving a focus within the scrollable list index optionally results in items for the newly focused index to be displayed in the user interface 602. For example, in FIG. 6TT, while displaying scrollable index list 682, the touch-sensitive surface detects movement of touch contact 624*ss* from its initial touch down location (indicated by dashed-line touch contact) to a new location in the outer circular touch region 620. In response to the touch-sensitive surface 451 detecting movement of touch contact 624*ss*, the touch-sensitive surface 451 transmits information about the position 616 of touch contact 624*ss* to device 500. In some embodiments, a focus in the scrollable index list 682 changes when the touch contact that satisfied the criteria for navigating the user interface in the first mode of navigation and touched down within a threshold distance of a respective edge of the outer circular touch region 620 moves to a new location in the outer circular touch region 620 while still being within the threshold distance of the respective edge. For example, in FIG. 6TT, the touch-sensitive surface 451 detects movement—in a clockwise direction—from the touchdown location of touch contact 624*ss* (indicated by the dashed-line touch contact) to a new location in the outer circular touch region 620 (indicated by solid-line touch contact 624*ss*). As stated previously, in some embodiments, if a touch contact moves more than movement threshold 614, the touch-sensitive surface 451 identifies the touch contact as a swipe. In response to the touch-sensitive surface 451 identifying touch contact 624*ss* as a swipe, the focus begins to move downwards. As illustrated in FIG. 6TT, the precision of the first mode of navigation defines that the focus should move downward to between Index A and Index B based on the amount of movement of touch contact 624*ss* (indicated by movement bar 608)—as touch contact 624*ss* did not move enough to completely move the focus to Index B.

In FIG. 6UU, the touch-sensitive surface 451 detects further movement of touch contact 624*ss*—in a clockwise direction—from the location of touch contact 624*ss* in FIG. 6TT (indicated by dashed-line touch contact) to a new location in the outer circular touch region 620 (indicated by solid touch contact 624*ss*). In response to detecting movement of touch contact 624*ss*, the touch-sensitive surface 451 transmits information about the new position 616 of touch contact 624*ss* to device 500. As illustrated in 6UU, the precision of the first mode of navigation defines that touch contact 624*ss* had moved enough to completely move the focus to Index B. As a result of changing the focus to Index B, the user interface 602 stops displaying items associated with Index A and begins displaying items 681-1 to 681-9 associated with Index B (e.g., items that start with the letter 'B'). In the example of FIG. 6UU, if touch contact 624*ss* had moved in a counter clockwise direction from its touchdown location, the focus would have instead moved upward instead of downward.

FIG. 6VV-6XX illustrate an exemplary way of clicking (e.g., selecting) index items displayed in a user interface. In FIG. 6VV, device 500 is displaying a plurality of index items 681-1 to 681-9 and index list 682. In some embodiments, the focus moves from Index B to index item B5 681-5 (e.g., or another predefined index item corresponding to Index B) in response to a click detected in region 622 of touch-sensitive surface 451. While device 500 is displaying the plurality of index items 681-1 to 681-9, including index item 681-5 which current has the focus, the touch-sensitive surface 451 detects a touchdown of touch contact 624*vv* in the inner circular touch region 622. In response to the touch-sensitive surface 451 detecting the touchdown of touch contact 624*vv*, the touch-sensitive surface 451 transmits information about the position of touch contact 624*vv* and the touchdown event 618 to device 500. In some embodiments, an item that has a focus is selected via a click event when an intensity of the touch contact is above a respective intensity threshold, a liftoff of the touch contact is detected within a threshold amount of time from the touchdown of the touch contact, and the touch contact moves less than a movement threshold. For example, in 6VV, the touch-sensitive surface 451 detects that that touch contact 624*vv* has been on the touch-sensitive surface 451 for a duration less than time threshold 610, has an intensity more than intensity threshold 612, and has moved less than movement threshold 614.

In FIG. 6WW, after some amount of time has passed from FIG. 6VV, the touch-sensitive surface detects movement of the touch contact 624*vv* from its initial touchdown location (indicated by touch dashed-line touch contact) to a new location in the inner circular touch sensitive region 622. In response to the touch-sensitive surface 451 detecting movement of touch contact 624*vv*, the touch-sensitive surface 451 transmits information about the position 616 of touch contact 624*vv* to the electronic device 500. Additionally, the touch-sensitive surface 451 detects that that touch contact 624*vv* has been on the touch-sensitive surface 451 for a duration of time less than time threshold 610, has an intensity more than intensity threshold 612, and has moved less than movement threshold 614.

In FIG. 6XX, after detecting the movement of touch contact 622*vv*, the touch-sensitive surface detects a liftoff of touch contact 624*vv*. In response to the touch-sensitive surface 451 detecting liftoff of touch contact 624*vv*, the touch-sensitive surface 451 transmits information about the liftoff event 626 to electronic device 500. Additionally, the touch-sensitive surface 451 identifies touch contact 624*vv* as a click because the liftoff of the touch contact 624*vv* was detected within time threshold 610, contact 624*vv* had intensity greater than intensity threshold 612, and moved less than movement threshold 614. In response to the touch-sensitive surface 451 identifying touch contact 624*vv* was a click, the touch-sensitive surface 451 transmits a click event 628 to the electronic device 500. In response to receiving the click event and because Item B5 681-5 had the focus when the electronic device received the click event, the electronic device 500 displays content corresponding to Item B5 681-5 (e.g., starts playing video content corresponding to Item B5, or displays a user interface of an application corresponding to Item B5).

FIGS. 6YY-6ZZ-1 illustrate another exemplary way of clicking (e.g., selecting) index items displayed in a user interface. In FIG. 6YY, while displaying the plurality index items 681-1 to 681-9, including index item 681-5 which currently has the focus, the touch-sensitive surface 451 detects a touchdown of touch contact 624*yy* in the inner circular touch region 622. In response to the touch-sensitive surface 451 detecting the touchdown of touch contact 624*yy*, the touch-sensitive surface 451 transmits information about the position 616 of touch contact 624*yy* and the touchdown event 618 to device 500. In some embodiments, an item that has a focus is selected via a click event when an intensity of the touch contact is above a respective intensity threshold 612, and a liftoff of the touch contact is detected within a threshold amount of time from the touchdown of the touch contact, even if the touch contact moves more than a movement threshold. Thus, in some embodiments, a click event is prioritized over a swipe event by device 500. For example, in 6YY, the touch-sensitive surface 451 detects that that touch contact 624*yy* has been on the touch-sensitive surface for a duration less than time threshold 610, has an intensity less than intensity threshold 612, and has moved less than movement threshold 614.

In FIG. 6ZZ, after some amount of time has passed from FIG. 6YY, the touch-sensitive surface 451 detects movement of the touch contact 624*yy* from its initial touchdown location (indicated by touch dashed-line touch contact) to a new location in the inner circular touch sensitive region 622. In response to the touch-sensitive surface 451 detecting movement of touch contact 624*yy*, the touch-sensitive surface 451 transmits information about the position 616 of touch contact 624*yy* to the electronic device 500. Additionally, the touch-sensitive surface detects that that touch contact 624*yy* has been on the touch-sensitive surface for a duration of time less than time threshold 610, has an intensity more than intensity threshold 612, and has moved more than movement threshold 614.

In FIG. 6ZZ-1, after detecting the movement of touch contact 624*yy*, the touch-sensitive surface 451 detects a liftoff of touch contact 624*yy*. In response to the touch-sensitive surface 451 detecting liftoff of touch contact 624*yy*, the touch-sensitive surface 451 transmits information about the liftoff event 626 to electronic device 500. Additionally, the touch-sensitive surface 451 identifies touch contact 624*yy* as a click because the liftoff of the touch contact was detected within time threshold 610, and contact 624*yy* has an intensity greater than intensity threshold 612, even though contact 624*yy* moved more than movement threshold 614. In response to the touch-sensitive surface 451 identifying touch contact 624*yy* as a click, the touch-sensitive surface 451 transmits a click event 628 to the electronic device 500. In response to receiving the click event and because Item B5 681-5 had the focus when the electronic device received the click event, the electronic device 500 displays content corresponding to Item B5 681-5 (e.g., starts playing video content corresponding to Item B5, or displays a user interface of an application corresponding to Item B5).

FIGS. 6AAA-6CCC illustrate exemplary way of horizontally (or vertically) navigating a plurality index items. In FIG. 6AAA, while displaying the plurality index items 681-1 to 681-9, including index item 681-8 which current has the focus, the touch-sensitive surface 451 detects a touchdown of touch contact 624*aaa* in the inner circular touch region 622. In response to the touch-sensitive surface 451 detecting the touchdown of touch contact 624*aaa*, the touch-sensitive surface 451 transmits information about the position of touch contact 624*aaa* and the touchdown event 618 to device 500. In some embodiments, if a touch contact is identified as a swipe, the focus amongst the plurality of index items is adjusted in the direction of the swipe. In some embodiments, as mentioned previously, the touch-sensitive surface 451 identifies a touch input as a swipe if a touch contact moves more than a movement threshold. For example, in 6AAA, the touch-sensitive surface 451 detects that that touch contact 624*aaa* has been on the touch-sensitive surface for a duration less than time threshold 610, has an intensity less than intensity threshold 612, and has moved less than movement threshold 614. In 6BBB, the touch-sensitive surface 451 detects that that touch contact 624*aaa* has moved horizontally and to the right. In response to the touch-sensitive surface 451 detecting that the touch contact 624*aaa* has moved in a horizontal direction, the touch-sensitive surface 451 transmits information about the position 616 of touch contact 624*aaa* to the electronic device 500. Additionally, the touch-sensitive surface 451 detects that touch contact 624*aaa* has moved more than a movement threshold 614 and identifies touch contact 624*aaa* as a swipe. In response to the touch-sensitive surface 451 identifying touch contact 624*aaa* as a swipe, the focus changes in the direction of the swipe and by an amount defined by the precision of the second mode of navigation. The precision of the second mode of navigation defines that the focus should move by one item based on the amount of movement of touch contact 624*aaa* on touch-sensitive surface 451. As a result of the swipe being detected to the right and the amount of precision defined by the second mode of navigation, the focus changes from Item B8 681-8 to Item B9 681-9.

In 6CCC, after detecting the movement of touch contact 624*aaa*, the touch-sensitive surface 451 detects further movement of the touch contact 624*aaa* horizontally and to the left. In response to the touch-sensitive surface 451 detecting that the touch contact 624*aaa* has moved in a horizontal direction and to the left, the touch-sensitive surface 451 transmits information about the position 616 of touch contact 624*aaa* to the electronic device 500. Because the touch-sensitive surface 451 already identified touch contact 624*aaa* as a swipe, the focus changes in the direction of the swipe and by an amount defined by the precision of the second mode of navigation. The precision of the second mode of navigation defines that the focus should move by one item based on the amount of movement of touch contact 624*aaa*. As a result of the swipe being detected to the left and the amount of precision defined by the second mode of navigation, the focus changes from Item B9 681-9 to Item B8 681-8.

In some embodiments, when a scrubber bar is being displayed by the electronic device 500, the scrubber bar includes representations of objects (or frames) corresponding to particular portions of media content. For example, in FIG. 6DDD, user interface 602 includes a scrubber bar 692 for the paused media content item 690. Scrubber bar 692 includes current playback indicator 691, as previously described, and key frames 692-1 to 692-7 corresponding to portions of media content item 690. Key frames 692-1 to 692-7 correspond to non-overlapping slices of time spanning from the start of media content item 690 ("0:00") to the end of the media content item ("1:30") and optionally include a representative image corresponding to the slice of time associated with that key frame. Specifically, in the example of FIG. 6DDD, key frames 692-1 to 692-7 correspond to every 12 minutes in the media content item 690 such that key frame 692-2 corresponds to playback position 0:12:00, key frame 692-3 corresponds to playback position 0:24:00, key frame 692-4 corresponds to playback position 0:36:00, key frame 692-4 corresponds to playback position 0:48:00, and so on. Current playback indicator 691 is at a location in the scrubber bar corresponding to the portion of media content represented by key frame 692-4 (0:48:00).

In some embodiments, the current playback indicator 691 can be moved between different key frames. For example, in FIG. 6DDD, the touch-sensitive surface 451 detects a touchdown of touch contact 624*ddd* at a location in the inner circular touch region 622. In response to detecting the touchdown of touch contact 624*ddd*, the touch-sensitive surface transmits information about the position 616 of touch contact 624*ddd* and touchdown event 618. The scrubber bar 692 is navigated (scrubbed) in accordance with the second mode of navigation because the touchdown location of touch contact 624*ddd* did not satisfy criteria for navigating (scrubbing) with the first mode of navigation.

In FIG. 6EEE, after detecting the touchdown of touch contact 624*ddd*, the touch-sensitive surface 451 detects movement of touch contact 624*ddd* from its touchdown location (indicated by dash-line touch contact) to a new location in the outer circular touch region 620. In response to detecting this movement, the touch-sensitive surface 451 transmits information about the new position 616 of touch contact 624*ddd* on the touch-sensitive surface 451. Additionally, the touch-sensitive surface 451 also detects that touch contact 624*ddd* moved more than movement thresholds 614 and 650, thus identifying touch contact 624*ddd* as a long swipe.

As previously mentioned, if the touch contact is identified as a swipe, the scrubber 692 is optionally scrubbed in accordance with the movement of the swipe. For example, in FIGS. 6DDD-6EEE, because the scrubber bar 692 is currently being navigated (scrubbed) with the second mode of navigation, the precision of the second mode of navigation defines that the current playback indicator should be scrubbed backwards from key frame 692-4 corresponding to playback position 0:48:00 to key frame 692-3 corresponding to playback position 0:36:00.

In some embodiments, when liftoff of a touch contact is detected, media content that was being scrubbed begins playback. For example, in FIG. 6EEE, after the device 500 scrubbed the current playback indicator 691 to key frame 692-3, the touch-sensitive surface 451 detects liftoff of touch contact 624*ddd*. In response to detecting the liftoff, the touch-sensitive surface 451 transmits information about the liftoff event 626 to electronic device 500. As a result of electronic device 500 receiving the liftoff event 626, media content item 690 optionally begins playback, in the user interface 602, at the position corresponding to key frame 692-3, as shown in FIG. 6FFF.

In some embodiments, the granularity of time that the key frames span (e.g., or to which the key frames correspond) is optionally adjusted when a touch contact moves in a vertical direction on touch-sensitive surface 451. For example, in FIG. 6GGG, while displaying the scrubber bar 692 with representations 692-1 to 692-7 spanning the length of media content item 690 (one hour and thirty minutes), the touch-sensitive surface 451 detects a touchdown of touch contact 624ggg and sends information about the position 618 and touchdown event 618 to electronic device 500. In FIG. 6HHH, the touch-sensitive surface 451 detects that touch contact 624ggg vertically moved to a new location in the inner circular touch-sensitive region 622 and transmits information about its new position 616 to the electronic device 500. The touch-sensitive surface 451 also detects that while moving to the new location on the touch-sensitive surface, touch contact 624ggg moved more than movement threshold 614 and at a speed less than speed threshold 646.

In some embodiments, based on the speed of the touch contact, the span of time represented by the key frames changes accordingly. Specifically, in the example of FIG. 6HHH, in response to detecting vertical movement of touch contact 624ggg at a speed less than a speed threshold, the electronic device displays key frames 693-1 to 693-7 which span the portions of the media content item 690 between times 0:30 and 1:00, and optionally correspond to every 3.5 minutes of content duration between times 0:30 and 1:00 in media content item 690. The scrubber bar can subsequently be scrubbed in accordance with the first or second mode of navigation (e.g., as described herein) at these finer intervals of content duration to provide higher precision of scrubbing as compared with the intervals of content duration in FIG. 6GGG.

In some embodiments, if the speed of the vertically moving touch contact 624ggg is more than the speed threshold 646 (and/or if the length of the vertical movement of contact 624ggg is longer), the span of time represented by the key frames in the scrubber bar is less than it was in FIG. 6HHH. For example, in FIG. 6III, touch contact 624ggg instead moves at a speed greater than speed threshold 646. In response, the electronic device displays key frames 694-1 to 694-7 which span portions of the media content item 690 between times 0:40 and 0:50 in the media content item 690. Key frames 693-1 to 693-7 optionally corresponds to every 1.25 minutes of content duration between times 0:40 and 0:50 in media content item 690 (as opposed to key frames 693-1 to 693-7 optionally corresponding to every 3.5 minutes between times 0:30 and 1:00 in media content item 690). The scrubber bar can subsequently be scrubbed in accordance with the first or second mode of navigation (e.g., as described herein) at these finer intervals of content duration to provide higher precision of scrubbing as compared with the intervals of content duration in FIG. 6GGG or 6HHH.

Figure 7:
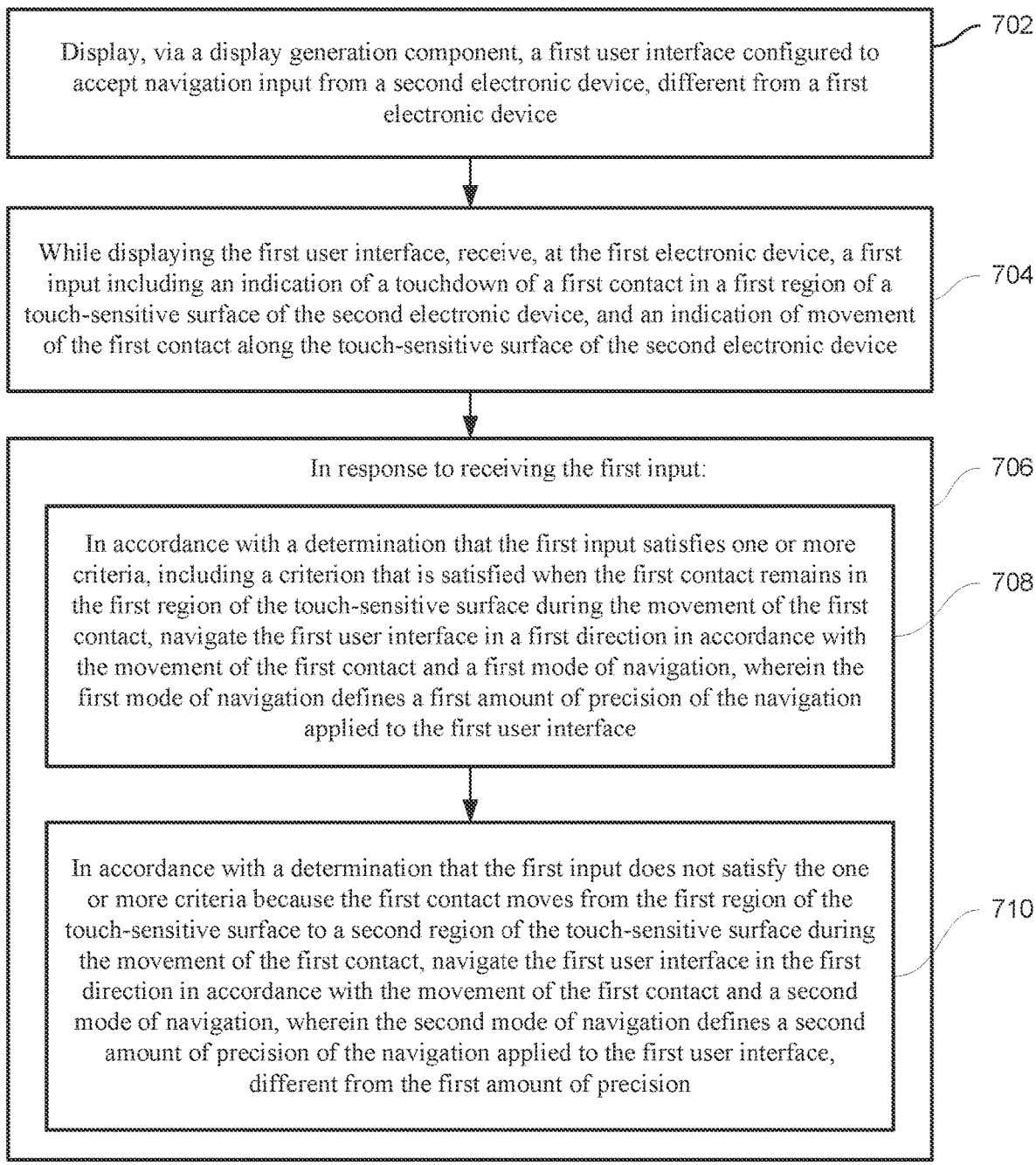
FIG. 7 is a flow diagram illustrating a method of navigating user interfaces with a touch-sensitive surface in accordance with some embodiments of the disclosure.

FIG. 7 is a flow diagram illustrating a method of navigating user interfaces with a touch-sensitive surface in accordance with some embodiments of the disclosure. The method 700 is optionally performed at first and/or electronic devices such as device 100, device 300, or device 500 as described above with reference to FIGS. 1A-1B, 2-3, 4A-4B and 5A-5C. Some operations in method 700 are, optionally, combined and/or order of some operations is, optionally, changed.

As described below, the method 700 provides ways in which first and/or second electronic devices facilitate navigating user interfaces with a touch-sensitive surface. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed at a first electronic device (e.g., device 500) in communication with a display generation component and one or more input devices (e.g., a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, the first electronic device displays (702), via the display generation component, a first user interface configured to accept navigation input from a second electronic device (e.g., a user interface that responds to input detected at a touch-sensitive remote, mouse, touchpad, game controller, multifunction device with a touch-sensitive surface, etc.), different from the first electronic device, such as user interface 602 in FIG. 6M or user interface 602 in FIG. 6N. For example, when navigation input from the second electronic device is directed to the first user interface, the first user interface is navigated (e.g., updated, scrolled, clicked, zoomed, rotated, scrubbed, played, paused, etc.) in accordance with the input provided at the second electronic device. In some embodiments, the first user interface includes representations of objects that are ordered (e.g., arranged) and/or displayed (e.g., based on an index). For example, the first user interface optionally displays a first set of content (e.g., representations of contacts, music, television shows, etc.) based on a selected index (e.g., displays content whose name begins with 'A'), and navigation input detected at the second electronic optionally changes from displaying the first set of content corresponding to the first index to displaying content corresponding to the second index (e.g., from content whose name starts with 'A' to content whose name starts with 'B') In some embodiments, the first user interface includes a scrubber bar for adjusting a playback position of a respective media item, and navigation input detected at the second electronic device optionally adjusts the playback position of the respective media item. For example, the playback position of the scrubber is optionally adjusted from a current playback position to a new playback position based on navigation input provided at the second electronic device (e.g., playback position of the scrubber moves forwards or backwards with respect to a current playback position in the respective media item). In some embodiments, the first user interface optionally includes a plurality of selectable representations that are displayed vertically and/or horizontally, and these vertically and/or horizontally selectable representations are optionally navigated (e.g., vertically and/or horizontally scrolled and/or the current focus moves vertically and/or horizontally amongst the selectable representations) based on navigation input detected at the second electronic device. In some embodiments, the first user interface and/or user interface elements of the first user interface are optionally selected (e.g., to initiate a corresponding command and/or process) when a selection input is detected at the second electronic device. In some embodiments, navigation input accepted by the first user interface element and/or user interface elements of the first user interface includes input commands such as scroll, click, zoom, rotate, return, next, rewind, fast forward, play, and/or pause commands. In some embodiments, the electronic device displaying the first user interface accepts input from an accessory of the first electronic device (e.g., second electronic device), such as a touch-sensitive remote, mouse, touchpad, game controller, multifunction device with a touch-sensitive surface, etc.

While displaying the first user interface, the first electronic device receives (704), at the first electronic device, a first input including an indication of a touchdown of a first contact in a first region of a touch-sensitive surface of the second electronic device, and an indication of movement of the first contact along the touch-sensitive surface of the second electronic device, such as touch contact 624r in FIGS. 6R-6U (e.g., if a touchdown and movement of a contact is received at the second electronic device, the first electronic receives an indication of this contact). For example, in response to the first contact being detected at the touch-sensitive surface of the second electronic device, the first electronic device receives, as input, an indication of this contact/touch occurring (or having occurred) at the second electronic device. In some embodiments, the touch-sensitive surface of the second electronic device is optionally partitioned into a plurality of (e.g., non-overlapping, distinct) regions. For example, regions of the touch-sensitive surface optionally include a first region (e.g., outer ring/circular region) and a second region (e.g., inner circular region). In some embodiments, the regions of touch-sensitive surface are optionally clickable. For example, one or more locations of the first region (e.g., outer ring/circular region) are optionally clickable to perform a navigation input (e.g., a selection input and/or movement input (e.g., movement up, down, left, or right)). In some embodiments, the regions of touch-sensitive surface are not clickable. In some embodiments, the second electronic device detects/determines that a touchdown of a first contact has occurred in a respective region (e.g., within the outer ring/circular region or within the inner circular region) on the touch-sensitive surface of the second electronic device, and in response to the second electronic device detecting the touchdown of the first contact in the respective region, the first electronic device receives, as an input, an indication of the touchdown occurring (or having occurred) at the touch-sensitive surface of the second electronic device. In some embodiments, the second electronic device detects/determines the first contact has moved from the initial location of the touchdown of the first contact to a second location on the touch-sensitive surface. In response to the second electronic device detecting/determining movement of the first contact, the first electronic device optionally receives, as input, an indication that the first contact has moved to a new location on the touch-sensitive surface. In some embodiments, the new location of the first contact is optionally a location in the same region that the touchdown of the first contact occurred in and/or a location in a different region that the touchdown of the first initially contacted.

In some embodiments, in response to receiving the first input (706), in accordance with a determination that the first input satisfies one or more criteria, including a criterion that is satisfied when the first contact remains in the first region of the touch-sensitive surface during the movement of the first contact (e.g., if the first contact remains within a boundary of the first region during movement of the first contact), the first electronic device navigates (708) the first user interface in a first direction in accordance with the movement of the first contact and a first mode of navigation, wherein the first mode of navigation defines a first amount of precision of the navigation applied to the first user interface. For example, if touch contact 624r moved in a clockwise direction from its touchdown location, scrubber bar 692 would be scrubbed in a direction corresponding to the clockwise movement of the touch contact and in an amount based on the first mode of navigation and the amount of movement of touch contact 624r. For example, navigating the first user interface (or a user interface element of the first user interface) in a respective direction and/or with a respective amount of precision based on a first mode of navigation and movement of the first contact along the touch-sensitive surface of the second electronic device. In some embodiments, the user interface is navigated in accordance with the first mode of navigation if the touchdown location of the first contact occurs in a first region of the touch-sensitive surface and if the location of the first contact remains within the first region during movement of the first contact. In some embodiments, the first mode of navigation is selected based on the region associated with touchdown location of the first contact. For example, if the location of the touchdown of the first contact occurs in a first region, a first mode of navigation is selected. In some embodiments, if the first contact has a touchdown location that occurs in the first region and movement of the first contact is not detected or the movement of the first contact is less than a threshold amount (e.g., less than 0.05, 0.1, 0.2, 0.5, 1 cm) during a time threshold (e.g., 0.1, 0.2, 0.5, 0.8, 1 second), the first mode of navigation is selected. If the location of the touchdown of the first contact occurs in a second region, a second mode of navigation is optionally selected. In some embodiments, the selected mode of navigation determines (e.g., defines) an amount of precision and/or direction applied when navigating the first user interface based on the movement of the first contact.

For example, scrubbing to a particular playback position with a first amount of precision optionally requires a larger and/or longer movement of the first contact than scrubbing to the particular playback position with a second amount of precision (e.g., smaller and/or shorter movement of the first contact with respect to the first amount of precision). The direction of scrubbing is optionally determined based on a direction of movement of the first contact while the first contact remains in the first region. For example, if the first contact moves in a counter clockwise with reference to the touchdown location of the first contact, a scrubber bar is optionally scrubbed backwards (e.g., from a current playback position). Similarly, if the first contact moves in a clockwise direction with reference to the touchdown location of the first contact, a scrubber bar is optionally scrubbed forwards (e.g., from a current playback position). In some embodiments, the user interface is navigated (e.g., scrubbed, scrolled, etc.) when movement of the first contact follows a circular path/motion while navigating in accordance with the first mode of navigation. The first mode of navigation optionally defines a scrubbing direction (e.g., scrub forward from a current playback position or scrub backward from the currently playback position) regardless of the direction of movement of the first contact along the touch-sensitive surface. For example, if the scrubber bar is being navigated in accordance with the first mode of navigation, the scrubber bar is optionally scrubbed in a particular direction (e.g., forwards or backwards based on a current playback position), and movement of the first contact adjusts the scrubbing position in the first direction (e.g., but movement of the first contact in a clockwise or counterclockwise direction does not define the scrubbing direction). Similarly, if the first user interface includes a plurality of selectable representations, movement of the first contact optionally moves a focus from a respective selectable representation in a direction defined by movement of the first contact along the first region (e.g., outer ring/circular region) and/or based on an amount of precision defined by the first mode of navigation. Similarly, if the first user interface includes selectable objects displayed based on an index, movement of the first contact optionally adjusts an index displayed based on an amount of precision defined by the first mode of navigation and/or based on a direction defined by movement of the first contact (e.g., clockwise or counterclockwise with reference to the touchdown location of the first contact). In some embodiments, the precision of a respective mode of navigation defines an amount of navigation (e.g., scrubbing, scrolling, rotating, zooming, etc.) that a particular amount of movement causes and/or defines the granularity at which the user interface is navigated.

In some embodiments, in response to receiving the first input (706), in accordance with a determination that the first input does not satisfy the one or more criteria because the first contact moves from the first region of the touch-sensitive surface to a second region of the touch-sensitive surface during the movement of the first contact (e.g., if the first contact does not remain within the boundary of the first region during movement of the first contact), the first electronic device navigates (710) the first user interface in the first direction in accordance with the movement of the first contact and a second mode of navigation, wherein the second mode of navigation defines a second amount of precision of the navigation applied to the first user interface, different from the first amount of precision, such as scrubbing performed because of the movement of touch contact 624r in FIGS. 6S and 6R. For example, navigating the first user interface (or a user interface element of the first user interface) in the direction determined based on the directional movement of the first contact with respect to a touchdown location of the first contact and based on an amount of precision defined by the second mode of navigation. In some embodiments, the user interface is navigated (e.g., updated, scrubbed, scrolled, etc.) when movement of the first contact follows a linear path/motion while navigating in accordance with the second mode of navigation. In some embodiments, the first user interface (or elements of the first user interface) is navigated in accordance with a second mode of navigation when the location of the first contact moves from being in the first region of the touch-sensitive surface to being in a second region of the touch-sensitive surface. In some embodiments, the first user interface (or objects of the first user interface) is navigated in accordance with a second mode of navigation when the touchdown location of the first contact begins in the second region of the touch-sensitive surface of the second electronic device. In some embodiments, the first user interface (or objects of the first user interface) are navigated in accordance with a second mode of navigation if the first contact has touched down in the first region and moves more than a movement threshold (e.g., 0.05, 0.1, 0.2, 0.5, 1 cm) within a time threshold (0.1, 0.2, 0.5, 0.8, 1 second)—irrespective of whether the first contact remains in the first region during movement of the first contact. In some embodiments, the second mode of navigation defines an amount of precision or a direction applied when navigating the first user interface, different from the amount of precision or direction applied when navigating the first user interface with the first mode of navigation. For example, a same amount of movement of a touch contact optionally scrubs a playback position of the scrubber bar differently based on which mode of navigation is being utilized. If a respective amount of movement for a touch contact is detected while in a first mode of navigation, the playback position is optionally adjusted to a second playback position of the scrubber bar. If the same respective amount of movement of the contact is detected while in the second mode of navigation, the playback position is optionally adjusted to a third playback position of the scrubber bar, different from the second playback position. In other words, if the first user interface includes a scrubber bar for adjusting a playback position for a first media item, a same respective amount of movement of the first contact optionally adjusts the scrubbing position of the scrubber bar differently based on the mode of navigation utilized. In some embodiments, the direction of scrubbing is based on a direction of movement with respect to the touchdown location of the first contact.

For example, if the movement of the contact moves to the left of the location of the touchdown, the scrubbing direction optionally is optionally associated with a left (e.g., backwards) scrubbing direction. Similarly, if the movement of the contact moves to the right of the location of the touchdown, the scrubbing direction optionally is optionally associated with a right (e.g., forwards) scrubbing direction. In some embodiments, the first user interface includes a plurality of selectable representations, and movement of the first contact optionally causes movement of a current focus to another respective selectable representation based on the movement of the first contact along the regions of the touch-sensitive surface (e.g., outer ring/circular region and inner circular region) and/or based on an amount of precision defined by the second mode of navigation (e.g., the granularity at which the user interface is navigated/scrolled). Similarly, if the first user interface includes selectable objects displayed based on an index, movement of the first contact optionally adjusts an index displayed based on an amount of precision defined by the second mode of navigation and/or based on a direction defined by movement of the first contact (e.g., with reference to the touchdown location of the first contact). In some embodiments, the direction of navigation when utilizing the first mode of navigation and second mode of navigation are the same, but the user interface is navigated differently based on the precision (e.g., amount of navigation (e.g., scrolling) that a particular movement causes) defined by the first mode and second mode of navigation.

The above-described manner of navigating a user interface with a first mode of navigation while the first contact remains within a first region of a touch-sensitive area and navigating the user interface with a second mode of navigation when the first contact leaves the first region provides an efficient way of providing access to multiple modes of navigation from the same touch-sensitive surface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the one or more criteria further include a second criterion that is satisfied when the movement of the first contact does not exceed a movement threshold (e.g., 0.05, 0.1, 0.2, 0.5, 1 cm) before a respective amount of time passes (e.g., 0.1, 0.2, 0.5, 0.8, 1 second) from the touchdown of the first contact, such as navigating with the first mode of navigation in FIG. 6S because touch contact 624r moved less than movement threshold 614 during the time threshold 610. For example, the second criterion is satisfied when the first contact does not move more than a threshold amount (e.g., 0.05, 0.1, 0.2, 0.5, 1 cm) for a respective amount of time (e.g., 0.1, 0.2, 0.5, 0.8, 1 second) from the touchdown of the first contact. In some embodiments, the first user interface is navigated in accordance with the first mode of navigation if the first criterion and the second criterion are satisfied (e.g., the first contact touches down in the first region, doesn't move more than a threshold amount before a respective amount of time passes from the touchdown of the first contact, and remains within the first region during subsequent movement of the first contact). In some embodiments, the first user interface is navigated in accordance with a second mode of navigation if the first criterion and/or the second criterion is not satisfied (e.g., when the first contact does not initially touchdown in the first region, does not remain within the first region during movement of the first contact, and/or moves more than a threshold amount before a respective amount of time passes from the touchdown of the first contact).

The above-described manner of navigating a user interface with a first mode of navigation if the first contact does not move more than a movement threshold within a respective amount of time from the touchdown of the first contact and navigating with a second mode of navigation if the first contact does move more than movement threshold within a respective amount of time provides an efficient way of providing access to multiple modes of navigation based on the same touch contact, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the first user interface, the first electronic device receives, at the first electronic device, a second input including an indication of a touchdown of a second contact in the first region of the touch-sensitive surface of the second electronic device (e.g., the first electronic device receives an indication of the moment in which the second contact initially contacts the first region of the touch-sensitive surface), such as touch contact 624j in FIG. 6J. In some embodiments, in response to receiving the second input, in accordance with the determination that the second input satisfies one or more second criteria, including a criterion that is satisfied when movement of the second contact does not exceed a movement threshold (e.g., 0.5, 1, 3, 5, 10, 20 cm) within a time threshold of the touchdown of the second contact (e.g., 0.5, 1, 2, 5, 10 seconds) (e.g., when the touchdown of the second contact is detected, movement of the second contact is less than a movement threshold for a respective amount of time from the touchdown of the second contact), liftoff of the second contact from the touch-sensitive surface is detected within the time threshold of the touchdown of the second contact (e.g., after detecting the touchdown of the second contact, the liftoff of the second contact is detected within a respective amount of time from the touchdown of the second contact), and an intensity of the second contact is less than an intensity threshold (e.g., while the second contact is being detected on the touch-sensitive surface of the second electronic device, the force and/or pressure of the second contact remains less than a respective amount (e.g., less than an intensity needed to correspond to a click input; instead, corresponding to a tap input)), in accordance with a determination that the touchdown of the second contact is detected in a first predefined area of the first region of the touch-sensitive surface, the first electronic device navigates the first user interface in a second direction by a predefined amount, such as the scrubbing performed in FIG. 6L in response to tapping in predefined region 652 with touch contact 624j. For example, if the second contact corresponds to a tap (e.g., the criterion of the one or more second criteria is satisfied) while at a first predefined area of the touch-sensitive surface, the first user interface is navigated in a direction and/or amount defined by the first predefined area. The direction and/or amount defined by the first predefined area are optionally independent of the first mode and second mode of navigation. In some embodiments, the direction and/or amount defined by the first predetermined areas is optionally associated with the most recently used mode of navigation. In some embodiments, the first region of the touch-sensitive surface optionally includes a plurality of pre-defined areas, of which a portion of or all of the predefined regions correspond to different amounts of navigation and a direction of navigation when a tap occurs in that respective predefined region.

Generally, the pre-defined areas in the first region of the touch-sensitive optionally allow the first user interface to be navigated in a pre-configured direction and/or amount and with a small amount or no movement of the second contact. In some embodiments, when a second contact is detected in the first region but the second contact does not correspond to a tap (e.g., the criterion of the one or more second criteria is not satisfied), the user interface is navigated in accordance with the movement of the second contact and the first mode of navigation. If the user interface includes media content and a scrubber bar, a tap in the first predefined area optionally causes a playback position of the scrubber bar to adjust forward or backward in time from the current playback position (e.g., based on the pre-determined direction) and by a pre-determined amount (e.g., back 30 seconds, forward 25 seconds, etc.). If the user interface includes a plurality of selectable objects, a tap in the first predefined area optionally moves the focus among the plurality of selectable objects in a direction and/or amount associated with first predefined region (e.g., move focus to an adjacent selectable object (or other selectable object) in the left, right, up, or down direction). In some embodiments, the predefined movement amount optionally corresponds to a movement of one unit (e.g., one selectable object, one second, etc.).

In some embodiments, in accordance with a determination that the touchdown of the second contact is detected in a second predefined area of the first region of the touch-sensitive surface, the first electronic device forgoes navigating the first user interface in the second direction by the predefined amount, such as if touch contact 624j tapped in predefined region 656. For example, if the second contact corresponds to a tap while at a second predefined area of the touch-sensitive surface, the second user interface is not navigated in a direction and/or amount defined by the first predefined area. In some embodiments, the second predefined area of the first region is associated with a different direction and/or amount than the direction/amount associated with the first predefined region. For example, the second predefined area of the touch-sensitive surface optionally moves the focus among the plurality of selectable objects in a different direction and/or amount than the first predefined region when a plurality of selectable objects are being shown or optionally adjusts the playback position in a scrubber bar in a different direction and/or amount when a video scrubber bar is included in the first user interface. In some embodiments, a tap in the second predefined area of the touch-sensitive surface is optionally not associated with a pre-defined amount of navigation and/or direction, and thus, in some embodiments, the first user interface is optionally not navigated when a tap is received in the second predefined area because the second predefined area is not associated with a predetermined amount and/or direction. Thus, in some embodiments, if a tap is performed in a top area of the first region, the first user interface is navigated in an upward direction by one unit. Similarly, in some embodiments, if a tap is performed in a bottom area of the first region, the first user interface is navigated downwards by one unit. Similarly, in some embodiments, if a tap is performed in a right area of the first region, the first user interface is navigated to the right by one unit. Similarly, in some embodiments, if a tap is performed in a left area of the first region, the first user interface is navigated to the left by one unit.

The above-described manner of navigating a user interface with a predefined amount and in a pre-determined direction when the second contact satisfies tapping criteria in a predetermined area of the touch-sensitive surface provides an efficient way of navigating the user interface with no movement or a small amount of movement of the second contact, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the first user interface, the first electronic device receives, at the first electronic device, a second input including an indication of a touchdown of a second contact in the first region of the touch-sensitive surface of the second electronic device, such as touch contact 624h in FIG. 6h (e.g., the first electronic device receives an indication of the moment in which the second contact initially contacts the first region of the touch-sensitive surface of the second electronic device).

In some embodiments, in response to receiving the second input, in accordance with the determination that the second input satisfies one or more second criteria, including a criterion that is satisfied when movement of the second contact does not exceed a movement threshold (e.g., 0.5, 1, 3, 5, 10, 20 cm) within a time threshold of the touchdown of the second contact (e.g., 0.5, 1, 2, 5, 10 seconds) (e.g., when the touchdown of the second contact is detected, movement of the second contact is less than a movement threshold for a respective amount of time from the touchdown of the second contact), liftoff of the second contact from the touch-sensitive surface is detected within the time threshold of the touchdown of the second contact (e.g., after detecting the touchdown of the second contact, the liftoff of the second contact is detected within a respective amount of time from the touchdown of the second contact), and an intensity of the second contact is more than an intensity threshold (e.g., while the second contact is being detected on the touch-sensitive surface of the second electronic device, the force and/or pressure of the second contact exceeded a respective amount), in accordance with a determination that the touchdown of the second contact is detected in a first predefined area of the first region of the touch-sensitive surface, the first electronic device navigates the first user interface in a first direction by a predefined amount, such as the characteristics of contact 624h and the scrubbing associated with touch contact 624h in FIGS. 6I-6J. For example, if the second contact corresponds to a click (e.g., the criterion of the one or more second criteria is satisfied) while at a first predefined area of the touch-sensitive surface, the first user interface is navigated in a direction and/or amount defined by the first predefined area. The direction and/or amount defined by the first predefined area are optionally independent of the first mode and second of navigation. In some embodiments, the direction and/or amount defined by the first predetermined areas is optionally associated with the most recently used mode of navigation. In some embodiments, the first region of the touch-sensitive surface optionally includes a plurality of pre-defined areas, of which a portion of or all of the predefined regions correspond to different amounts of navigation and a direction of navigation when a click occurs in that respective predefined region. Generally, the pre-defined areas in the first region of the touch-sensitive optionally allow the first user interface to be navigated in a pre-configured direction and/or amount and with a small amount or no movement of the second contact. In some embodiments, when a second contact is detected in the first region but the second contact does not correspond to a click (e.g., the criterion of the one or more second criteria is not satisfied), the user interface is navigated in accordance with the movement of the second contact and the first mode of navigation. If the user interface includes media content and a scrubber bar, a click in the first predefined area optionally causes a playback position of the scrubber bar to adjust forward or backward in time from the current playback position (e.g., based on the pre-determined direction) and by a pre-determined amount (e.g., back 30 seconds, forward 25 seconds, etc.). If the user interface includes a plurality of selectable objects, a click in the first predefined area optionally moves the focus among the plurality of selectable objects in a direction and/or amount associated with first predefined region (e.g., move focus to an adjacent selectable object (or other selectable object) in the left, right, up, or down direction). In some embodiments, the predefined movement optionally corresponds to a movement of one unit (e.g., one selectable object, one second, etc.)

In some embodiments, in accordance with a determination that the touchdown of the second contact is detected in a second predefined area of the first of the touch-sensitive surface, the first electronic device forgoes navigating the first user interface in the first direction by the predefined amount, such as scrubbing in an amount/direction associated with predefined region 656 if touch contact 626 clicked in the predefined region 656. For example, if the second contact corresponds to a click while at a second predefined area of the touch-sensitive surface, the second user interface is not navigated in a direction and/or amount defined by the first predefined area. In some embodiments, the second predefined area of the first region is associated with a different direction and/or pre-defined amount than the direction/amount associated with the first predefined region. For example, the second predefined area of the touch-sensitive surface optionally moves the focus among the plurality of selectable objects in a different direction and/or amount than the first predefined region when a plurality of selectable objects are being shown or optionally adjusts the playback position in a scrubber bar in a different direction and/or amount when a video scrubber bar is included in the first user interface. In some embodiments, a click in the second predefined area of the touch-sensitive surface is optionally not associated with a pre-defined amount of navigation and/or direction, and thus, in some embodiments, the first user interface is optionally not navigated when a click is received in the second predefined area because the second predefined area is not associated with a predetermined amount and/or direction. Thus, in some embodiments, if a click is performed in a top area of the first region, the first user interface is navigated in an upward direction by one unit. Similarly, in some embodiments, if a click is performed in a bottom area of the first region, the first user interface is navigated downwards by one unit. Similarly, in some embodiments, if a click is performed in a right area of the first region, the first user interface is navigated to the right by one unit. Similarly, in some embodiments, if a click is performed in a left area of the first region, the first user interface is navigated to the left by one unit.

The above-described manner of navigating a user interface with a predefined amount and in a pre-determined direction when the second contact satisfies clicking criteria in a predetermined area of the touch-sensitive surface provides an efficient way of navigating the user interface with no movement or a small amount of movement of the second contact, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the first user interface, the first electronic device receives, at the first electronic device, a second input including an indication of a touchdown of a second contact (e.g., the first electronic device receives an indication of the moment in which the second contact initially contacts the touch-sensitive surface of the second electronic device), such as touch contact 624*b* in FIG. 6B. In some embodiments, in response to receiving the second input, in accordance with a determination that the touchdown of the second contact is detected within the second region of the touch-sensitive surface (e.g., if the location of the touchdown of the second contact is detected in the second region of the touch-sensitive surface), in accordance with a determination that the second input satisfies one or more second criteria, including a criterion that is satisfied when the touchdown and the liftoff of the second contact occur within a threshold amount of time (e.g., 0.5, 1, 2, 5, 10 seconds), without the second contact moving more than a threshold amount of movement (e.g., 0.5, 1, 3, 5, 10, 20 cm) during the threshold amount of time (e.g., if the second contact stops being in contact with the touch-sensitive surface within a threshold amount of time from the time the second contact was detected on the touch-sensitive surface and if the second contact moved less than a threshold amount during the threshold amount of time), and an intensity of the first contact is below an intensity threshold (e.g., while the second is being detected on the touch-sensitive surface of the second electronic device, the force and/or pressure of the second contact remains less than a respective amount), the first electronic devices performs a selection operation in the first user interface in accordance with the second input, such as, in FIGS. 6B-6D, playing media content item 690 because touch contact 624*b* is identified as a tap. For example, if the second contact is detected within the second region of the touch-sensitive surface and the second contact satisfies "tapping criteria" (e.g., the touchdown and liftoff occur within a threshold amount of time, movement of the second is less than a threshold amount during the threshold amount of time, and the force/pressure of the second remains below a intensity threshold while the second contact is detected on the touch-sensitive surface), the first user interface (or a user interface element of the first user interface) is selected. In some embodiments, if the second contact corresponds to a tap command while in the second region of the touch-sensitive surface and while the first user interface includes a scrubber bar, the playback position in the scrubber bar is optionally confirmed (e.g., selected) such that respective media in the first user interface begins playback at the confirmed/selected playback position of the scrubber bar. In some embodiments, if the second contact corresponds to a tap command while in the second region, while the first user interface includes a plurality of selectable objects (e.g., icons), and while and a respective selectable object has a focus, the respective selectable object that has the focus is selected and optionally initiates a process to display, in the first user interface, content associated with the selected object (e.g., a movie corresponding to the selected object, an application user interface corresponding to the selected object, etc.) and/or ceases display of the plurality of selectable objects. In some embodiments, if the first user interface is playing media content when the second contact performs a tap command on the touch-sensitive surface, the second contact optionally causes the media content in the first user interface to pause and/or cause a scrubber bar to be displayed in the first user interface.

The above-described manner of performing a selection operation in the first user interface when a tap is detected in the second region of the touch-sensitive surface provides an efficient way of performing a selection operation with no movement or a small amount of movement of the second contact, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the first user interface, the first electronic device receives, at the first electronic device, a second input including an indication of a touchdown of a second contact (e.g., the first electronic device receives an indication of the moment in which the second contact initially contacts the touch-sensitive surface of the second electronic device), such as touch contact 624*f*. In some embodiments, in response to receiving the second input, in accordance with a determination that the touchdown of the second contact is detected within the second region of the touch-sensitive surface (e.g., if the location of the touchdown of the second is detected in the second region of the touch-sensitive surface), in accordance with a determination that the second input satisfies one or more second criteria, including a criterion that is satisfied when the touchdown and the liftoff of the second contact occurs within a threshold amount of time (e.g., 0.5, 1, 2, 5, 10 seconds), without the second contact moving more than a threshold amount of movement (e.g., 0.5, 1, 3, 5, 10, 20 cm)

during the threshold amount of time (e.g., if the second contact stops being in contact with the touch-sensitive surface within a threshold amount of time from the time the second contact was detected on the touch-sensitive surface and if the second contact moved less than a threshold amount during the threshold amount of time), and an intensity of the first contact is greater than an intensity threshold (e.g., while the second is detected on the touch-sensitive surface of the second electronic device, the force and/or pressure of the second contact exceeded a respective amount), the first electronic device performs a selection operation in the first user interface in accordance with the second input, such as the playing of media content item 690 in response to the touch contact 624*f* being identified as a click in FIGS. 6F and 6G. For example, if the second contact is detected within the second region of the touch-sensitive surface and the second contact satisfies "clicking criteria" (e.g., the touchdown and liftoff occur within a threshold amount of time, movement of the second is less than a threshold amount during the threshold amount of time, and the force/pressure of the second remains becomes above an intensity threshold while the second contact is detected on the touch-sensitive surface), the first user interface (or a user interface element of the first user interface) is selected. In some embodiments, if the second contact corresponds to a click command while in the second region and while the first user interface includes a scrubber bar, the playback position in the scrubber bar is optionally confirmed (e.g., selected) such that respective media in the first user interface begins playback at the confirmed (e.g., selected) playback position of the scrubber bar. In some embodiments, if the second contact corresponds to a click command while in the second region, while the first user interface includes a plurality of selectable objects, and while and a respective selectable object has a focus, the respective selectable object that has the focus is selected and initiates a process to display, in the first user interface, content associated with the selected object. In some embodiments, if the first user interface is playing media content when the second contact performs a click command in the second region of the touch-sensitive surface, the second contact optionally causes the media content in the first user interface to pause and/or optionally causes a scrubber bar to display in the first user interface.

The above-described manner of performing a selection operation in the first user interface when a click is detected in the second region of the touch-sensitive surface provides an efficient way of performing a selection operation with no movement or a small amount of movement of the second contact, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first user interface includes media content (e.g., music content, video content, streaming content, etc. that is currently playing (e.g., via the display generation component) or paused) and a scrubber bar for navigating through the media content (e.g., a user interface element for navigating (e.g., scrubbing) to respective portions of the media content that includes a movement element that is movable in response to user input to skip to different corresponding playback positions with the media content), and navigating the first user interface in the first direction includes controlling the scrubber bar to navigate through the media content in the first direction, such as the media content item 690 and the scrubber bar 692 in FIG. 6M. For example, if the first user interface includes a scrubber bar, navigating the first user interface in the first direction includes adjusting a playback position of the scrubber bar in the first direction. In some embodiments, the direction of navigation is determined based on the direction of movement and/or touchdown location of the second contact. For example, if the second contact is moving in a clockwise direction along the touch-sensitive surface, the scrubber bar is optionally scrubbed forward (e.g., advancing playback), and if the second contact is moving in a counterclockwise direction the scrubber bar is optionally scrubbed backward (e.g., rewinding playback). In some embodiments, when the scrubber bar is displayed, the media content in the first user interface is optionally playing. Alternatively, in some embodiments, when the scrubber bar is displayed, the media content in the first user interface is optionally paused.

The above-described manner of navigating media content when the user interface includes a scrubber bar provides an efficient way of controlling a playback position of the media content in accordance with movement of the first contact and a respective mode of navigation, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the scrubber bar includes a respective visual indication indicating a current playback position within the media content, such as current playback indicator 691 in FIG. 6R (e.g., the scrubber bar shows an indication of a current playback position and/or an indication of a current frame of the media (e.g., audio, music, streaming) content displayed in the first user interface). In some embodiments, as the playback position of the media content changes (e.g., moves forward or backwards from the current playback position), the visual indication of the current playback position is updated accordingly. In some embodiments, the visual indication moves independent of the media content displayed in the first user interface, such that when the visual indication is moved (e.g., in accordance with movement of the first contact and a respective mode of navigation) to correspond to a playback position different than the current playback position, the current payback position of the media content remains unchanged until the new playback position is selected (e.g., confirmed by a user). In some embodiments, the respective visual indication is a user interface object (e.g., line, etc.) that is displayed at a position within the scrubber bar corresponding to the current playback position and/or new playback position (e.g., in response to scrubbing) within the media content). In some embodiments, in accordance with a determination that the first user interface is being navigated in accordance with the first mode of navigation, the respective visual indication has a first visual appearance corresponding to (e.g., that indicates that the playback position will be adjusted in accordance with) the first mode of navigation, such as the visual appearance of current playback indicator 691 in FIG. 6S. For example, if the scrubber bar is being displayed while the first user interface is being navigated with the first mode of navigation, the visual indication of the current playback position in the scrubber bar is displayed with a first visual appearance. In some embodiments, the first visual appearance includes a representation of the touch-sensitive surface and/or first/second regions and/or a representation of the contact on the touch-sensitive surface and/or first/second regions that caused the user interface to be navigated in the first mode of navigation. In some embodiments, when the respective visual indication is displayed with the first visual appearance, the respective visual indication is displayed with a first color. In some embodiments, in accordance with a determination that the first user interface is being navigated in accordance with the second mode of navigation, the respective visual indication has a second visual appearance, different from the first visual appearance, corresponding to (e.g., that indicates that the playback position will be adjusted in accordance with) the second mode of navigation, such as the visual appearance of current playback indicator 691 in FIG. 6R. For example, if the scrubber bar is being displayed while the first user interface is being navigated with the second mode of navigation, the visual indication of the current playback position in the scrubber bar is displayed with a second visual appearance. In some embodiments the second visual appearance of the respective visual indication does not include a representation of the touch-sensitive surface and/or regions and/or a representation of the contact on the touch-sensitive region that caused the user interface to be navigated in the second mode of navigation. In some embodiments, the second visual appearance corresponds to a default appearance of the visual indication of the current playback position in the scrubber bar (e.g., a vertical line/bar at the position in the scrubber bar corresponding to the currently playback position). In some embodiments, when the respective visual indication is displayed with the second visual appearance, the respective visual indication is displayed with a second color.

The above-described manner of displaying the visual indication of a current playback position in a scrubber with different visual appearances based the current mode of navigation provides an efficient way of indicating which mode of navigation will be applied when adjusting a playback position in the scrubber bar, which simplifies the interaction between the user and the electronic device and enhances the operability of the electronic device and makes the user-device interface more efficient (e.g., by avoiding erroneous navigation inputs intended for a different mode of navigation), which additionally reduces power usage and improves battery life of the electronic device by enabling the user to use the electronic device more quickly and efficiently.

In some embodiments, the respective visual indication with the first visual appearance includes a representation of the touch-sensitive surface of the second electronic device that includes a representation of the first contact at a location corresponding to a location of the first contact on the touch-sensitive surface of the second electronic device, such as current playback indicator 691 including representation 630 of touch sensitive surface 451 and the representation 632 of touch contact 624*r* in FIG. 6S. For example, when the user interface is being navigated in accordance with the first mode of navigation and includes a scrubber bar, the visual indication indicating a current playback position in the scrubber includes a representation of the touch sensitive surface and a representation of the first contact (e.g., that caused the first user interface to be navigated in accordance with the first mode of navigation). In some embodiments, the representation of the touch-surface includes representations of the (e.g., inner and/or outer regions) of the touch-sensitive surface. In some embodiments, the representation of the first contact on the representation of the touch-sensitive surface is displayed at a location on the representation of the touch-sensitive surface that corresponds to a location of the touchdown of the first contact on the touch-sensitive surface (e.g., if the movement of the first contact has not been detected).

The above-described manner of displaying the visual indication of a current playback with a representation of the touch-sensitive surface provides an efficient way of indicating which mode of navigation will be applied when adjusting a playback position in the scrubber bar, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while navigating the first user interface in accordance with the first mode of navigation, the first electronic device updates the representation of the touch-sensitive surface in the respective visual indication with the first visual appearance to include the representation of the first contact at an updated location in the representation of the touch-sensitive surface corresponding to an updated location of first contact on the touch-sensitive surface of the second electronic device, such as the representation 632 of touch contact 624*m* changing locations on the representation 630 of the touch-sensitive surface 451 in FIGS. 6O and 6P. For example, in response to detecting movement of the first contact while a scrubber bar is being navigated in accordance with the first mode of navigation, the location of the representation of the first contact follows the movement of the first contact on the touch-sensitive surface of the second electronic device. If the first contact moves from a location corresponding to the touchdown of the first contact to a second location on the touch-sensitive surface, the location of the representation of the first contact in the representation of the touch-sensitive surface changes (e.g., updates) to be displayed at a location on the representation of the touch-sensitive surface corresponding to the new second location (e.g., updated location of the first contact on the touch-sensitive surface). In some embodiments, as the contact is moving to the second location on the touch-sensitive surface, the location of the representation of the contact is updated in real time in accordance with the location of the first contact on the touch-sensitive surface. In some embodiments, the visual indication in the scrubber indicating a current playback position changes (e.g., moves to a new location within the scrubber bar) to indicate a new (e.g., updated) playback position in accordance with the direction of navigation, movement of the first contact, and the first mode of navigation.

The above described manner of updating the location of the representation of the first contact as the first contact moves along the touch-sensitive surface provides an efficient way of indicating which mode of navigation is being applied while navigating the first user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while navigating the first user interface in accordance with the movement of the first contact and the first mode of navigation, the first electronic device receives an indication of a liftoff of the first contact, such as touch contact 624*m* in FIG. 6Q (e.g., after the movement of the first contact causes the first user interface to be navigated in accordance with the first mode of navigation, the electronic device receives an indication of a liftoff of that contact from the touch-sensitive surface of the second electronic device).

In some embodiments, in response to receiving the indication of the liftoff of the first contact, the first electronic device ceases navigating the first user interface in accordance with the first mode of navigation, such as changing to the second mode of navigation in FIG. 6Q. For example, in response to determining that the first contact is no longer in contact with the touch-sensitive surface, the first user interface stops being navigated in accordance with movement of the first contact and the first mode of navigation. In some embodiments, when liftoff of the first contact is detected, future touch contacts navigate the first user interface in the second mode of navigation. For example, if the electronic device receives a third input that includes an indication of a touchdown of a second contact on the touch-sensitive surface and an indication of movement of the second contact, the first user interface is navigated in accordance with the second mode of navigation if the third input does not satisfy criteria for navigating with the first mode of navigation. In some embodiments, if the third input satisfies one or more criteria for navigating the first user interface with the first mode of navigation, the first user interface is navigated in accordance with the first mode of navigation. In some embodiments, when the first user interface stops being navigated in the first mode of navigation based on the movement of the first contact, an indication currently indicating that the first user interface is navigating in the first mode of navigation ceases from displaying in the first user interface.

The above described manner of ceasing navigating the first user interface while in the first mode of navigation when the electronic device receives an indication of a liftoff on the touch-sensitive surface provides an efficient way of exiting a navigation mode when the touch contact that caused the first user interface to be navigated in the first mode of navigation is no longer in contact with the touch-sensitive surface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while navigating the first user interface in accordance with the movement of the first contact and the first mode of navigation, the electronic device receives an indication that the first contact has moved from the first region of the touch-sensitive surface to the second region of the touch-sensitive surface, such as touch contact 624r in FIGS. 6S and 6T (e.g., after the first contact satisfies criteria for navigating in the first mode of navigation, the first contact moves to the second region of the touch-sensitive surface. In some embodiments, the first contact leaves the first region and moves to the second region of the touch-sensitive surface after the first user interface has been navigated, with the first mode of navigation, based on the movement of the first contact in the first region). In some embodiments, in response to receiving the indication that the first contact has moved from the first region of the touch-sensitive surface to the second region of the touch-sensitive surface, the first electronic device ceases navigating the first user interface in accordance with the first mode of navigation, such as the mode of navigation changing from the first mode of navigation in FIG. 6S to the second mode of navigation in 6T. For example, if the first contact moves from the first region to the second region of the touch-sensitive surface while the first user interface is being navigated with the first mode of navigation, the user interface exits the first mode of navigation (e.g., the first user interface and the movement of the first contact is no longer associated with the first mode of navigation). In some embodiments, before the first contact moved to the second region, movement of the first contact navigated the user interface by an amount defined by the first mode of navigation (e.g., in accordance with the magnitude of the movement of the first contact in the first region). In some embodiments, after the first contact moves to the second region, movement of the first contact in the second region (and/or subsequently in the first region) causes the user interface to be navigated by an amount defined by the second mode of navigation (e.g., in accordance with the magnitude of the movement of the first contact in the second region). In some embodiments, after the first user interface ceased navigating the first user interface in accordance with the first mode of navigation (e.g., because the first contact moved from the first region to the second region), the first contact optionally moves to any region of the touch-sensitive surface (e.g., first and/or second regions). In some such embodiments where the first contact moves between different regions of the touch-sensitive surface after switching from the first mode of navigation to the second mode of navigation, the first user interface is navigated in accordance with the second mode of navigation and movement of the second contact, regardless of the location of the first contact.

The above described manner of ceasing navigating the first user interface in the first mode of navigation when the electronic device receives an indication that the first contact has moved from the first region to the second region of the touch-sensitive surface provides an efficient way of exiting a navigation mode and switching to a different navigation mode when the touch contact that caused the first user interface to be navigated in the first mode of navigation moves to a different region of the touch-sensitive surface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while navigating the first user interface in accordance with the first mode of navigation, in accordance with a determination that an elapsed time since the touchdown of the first contact is a first amount of time (e.g., if 0.5, 1, 2, 5, 10, 15 seconds has passed from the time the first contact initially contacted the touch-sensitive surface), a first amount of movement of the first contact navigates the first user interface by a first navigation amount, such as the scrubbing performed in FIGS. 6W and 6X. For example, if the first contact has been in contact with the (e.g., first region of the) touch-sensitive surface for at least a first amount of time (e.g., at 0.5, 1, 2, 5, 10, 15 seconds), the first user interface is navigated by a first navigation amount when the first contact moves by a first amount (e.g., magnitude) of movement (e.g., the first contact moves a respective distance (e.g., 1, 3, 5, 10, 20 cm) on the touch-sensitive surface (e.g., in the first region)). In some embodiments, the first navigation amount corresponds an amount of scrubbing that is performed if the first user interface is displaying a scrubber bar. For example, if the first contact moves 5 cm while in the first mode of navigation and has been in contact with the touch-sensitive surface for the first amount of time, a playback indicator in the scrubber bar is optionally scrubbed forwards or backwards by 30 seconds. Similarly, if the first contact moves 10 cm while in the first mode of navigation and has been in contact with the touch-sensitive surface for the first amount of time, the playback indictor in the scrubber bar is optionally scrubbed forwards or backwards by 60 seconds. In some embodiments, the first navigation amount corresponds to an amount the focus moves if the user interface is displaying a plurality of items that can have a focus. For example, if the first contact moves 5 cm while in the first mode of navigation and has been in contact with the touch-sensitive surface for the first amount of time, a current focus among a plurality of objects is optionally adjusted by one object (e.g., moves the focus to an object directly adjacent to the object that currently has the focus). Similarly, if the first contact moves 10 cm while in the first mode of navigation and has been in contact with the touch-sensitive surface for the first amount of time, a current focus among a plurality of objects optionally moves the focus to an object that is two objects away from the object that currently has the focus.

In some embodiments, in accordance with a determination that the elapsed time since the touchdown of the first contact is a second amount of time, different from the first amount of time, the first amount of movement of the first contact navigates the first user interface by a second navigation amount, different from the first amount, such as the scrubbing performed in FIG. 6Y. For example, if the first contact has been in contact with the touch-sensitive surface for at least the second amount of time (e.g., 20, 40, 60, 80, 100 seconds), the first user interface is navigated by a second navigation amount when the first contact moves by the first amount of movement (e.g., the first contact moves the respective distance (e.g., 1, 3, 5, 10, 20 cm), as described above). In some embodiments, the second navigation amount corresponds an amount of scrubbing that is performed if the first user interface is displaying a scrubber bar. For example, if the first contact moves 5 cm while in the first mode of navigation and the first contact has been in contact with (e.g., first region of) the touch-sensitive surface for at least the second amount of time, a playback indicator in the scrubber bar is optionally scrubbed forwards or backwards by 60 seconds. Similarly, if the first contact moves 10 cm while in the first mode of navigation and the first contact has been in contact with the (e.g., first region of) touch-sensitive surface for at least the second amount of time, the playback indictor in the scrubber bar is optionally scrubbed forwards or backwards by 120 seconds. In some embodiments, the first navigation amount corresponds to an amount a focus moves if the user interface is displaying a plurality of items that can have a focus. For example, if the first contact moves 5 cm while in the first mode of navigation and the first contact has been in contact with the touch-sensitive surface for at least the second amount of time, a current focus among a plurality of objects is optionally adjusted by two objects (e.g., moves the focus to an object that is two objects away from the current object that currently has the focus). Similarly, if the first contact moves 10 cm while in the first mode of navigation and the second contact has been in contact with the touch-sensitive surface for at least the second amount of time, a current focus among a plurality of objects optionally moves the focus to an object that is four objects away from the object that currently has the focus.

The above described manner of navigating the first user interface by different amounts of navigation for the same amount of movement of the first contact on the touch-sensitive surface, provides an efficient way of increasing an amount of navigation based on the amount of time the first contact has been in contact with the touch-sensitive surface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the one or more criteria include a criterion that is satisfied when the touchdown of the first contact is within a first sub-region of the first region of the touch-sensitive surface (e.g., the first user interface is navigated in the first direction in accordance with the movement of the first contact and a first mode of navigation if the first contact touched down in a first respective area of the touch-sensitive surface, such as a right-region of the touch-sensitive surface). In some embodiments, in response to receiving the first input, in accordance with a determination that the first input satisfies one or more second criteria, including a criterion that is satisfied when the first contact remains in the first region of the touch-sensitive surface during the movement of the first contact, and a criterion that is satisfied when the touchdown of the first contact is within a second sub-region, different from the first sub-region, of the first region of the touch-sensitive surface, the first electronic device navigates the first user interface in a second direction, different from the first direction, in accordance with the movement of the first contact and the first mode of navigation, such as moving the focus upwards in FIGS. 6LL-6OO (e.g., the first user interface is navigated in the second direction in accordance with the movement of the first contact and the first mode of navigation if the first contact touched down in a second respective area of the touch-sensitive surface, such as the left-region of the touch-sensitive surface). For example, if the first contact has a touchdown location in a second respective area of the touch-sensitive surface, the user interface is navigated in a different direction than when the first contact has a touchdown location in the first respective area (e.g., even for the same direction of movement of the contact within the first region, such as clockwise or counterclockwise). If the touchdown of the first contact corresponds to a right portion of the touch-sensitive surface, the first user interface is optionally navigated to the right or forward, irrespective of the direction of movement of the first contact (e.g., clockwise or counterclockwise direction while moving in the first region). Similarly, if the touchdown of the first contact corresponds to a left portion of the touch-sensitive surface, the first user interface is optionally navigated to left or backwards, irrespective of the direction of movement of the first contact (e.g., clockwise or counterclockwise direction while moving in the first region). In other words, in some embodiments, the navigation direction that the user interface is navigated in is based on which portion of the touch-sensitive surface touched down in and is not based on the movement of the first contact. In some embodiments, the location of the touchdown of the first contact does not define the cardinal direction that the first user interface will be navigated with, but rather, optionally defines the navigation axis that the first user interface is navigated with when movement of the first contact is received. For example, in some embodiments, the location of the touchdown of the first contact on the touch-sensitive surface is optionally indicated by a coordinate system. If the touchdown occurs within a threshold distance of an x-axis of the coordinate system, the navigation direction is optionally determined in accordance with a horizontal axis and the (e.g., positive or negative, such as clockwise or counterclockwise) movement direction of the contact optional determines the navigation direction along the horizontal axis. Similarly, if the touchdown occurs within a threshold distance of a y-axis of the coordinate system, the navigation direction is optionally determined in accordance with a vertical axis and the (e.g., positive or negative, such as clockwise or counterclockwise) movement direction of the contact optional determines the navigation direction along the vertical axis.

The above described manner of navigating the first user interface in a direction based on the touchdown location of the contact provides an efficient way of selecting different navigation directions based a touchdown location of the first contact, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the one or more criteria include a criterion that is satisfied if the second electronic device is orientated in a first manner (e.g., oriented in a first direction) when the touchdown of the first contact occurred (e.g., the first user interface is navigated in the first direction in accordance with the movement of the first contact and a first mode of navigation if the second electronic was oriented in the first manner (e.g., direction) when the first contact initially touched the touch-sensitive surface (e.g., in the first region). In other words, if the electronic device was tilted to the left when the touchdown of the first contact was detected (e.g., in the first region), the first user interface is optionally navigated to the left. Similarly, if the electronic device was tilted towards a user of the second electronic when the touchdown of the first contact was detected (e.g., in the first region), the user interface is optionally navigated in an upward direction.). In some embodiments, in response to receiving the first input, in accordance with a determination that the first input satisfies one or more second criteria, including a criterion that is satisfied when the first contact remains in the first region of the touch-sensitive surface during the movement of the first contact, and a criterion that is satisfied if the second electronic device is oriented in a second manner (e.g., oriented in a second direction), different from the first manner, when the touchdown of the first occurred (e.g., the first user interface is navigated in the second direction in accordance with the movement of the first contact and the first mode of navigation if the second electronic was oriented in the second manner (e.g., direction) when the first contact initially touched (e.g., in the first region of) the touch-sensitive surface), the first electronic device navigates the first user interface in a second direction, different from the first direction, in accordance with the movement of the first contact and the first mode of navigation, such as moving the focus to the right in FIGS. 6LL-6NN if the touch-sensitive surface is tilted to the right at time of touchdown of 624*ll* in FIG. 6NN. For example, if the second electronic is oriented (e.g., tilted) in a second direction when the touchdown of the first contact is received, the user interface is navigated in a different direction than if the second electronic is oriented in a first direction when the touchdown of the first contact is received. If the second electronic is oriented to the right at the time of the touchdown of the first, the first user interface is optionally navigated to right, irrespective of the direction of movement of the first contact (e.g., clockwise or counterclockwise direction while moving in the first region). Similarly, if the second electronic is oriented in a left direction at the time of touchdown of the first contact, the first user interface is optionally navigated to left, irrespective of the direction of movement of the first contact (e.g., clockwise or counterclockwise direction while moving in the first region). In other words, in some embodiments, the navigation direction that the user interface is navigated in is based on the orientation of the electronic device at the time of a touchdown of the first contact even if the orientation/tilt of the second electronic device changes after the touchdown and/or while the contact remains touched-down and moving (e.g., in the first region). In some embodiments, the orientation of the second electronic device does not define the cardinal direction that the first user interface will be navigated with, but rather, optionally defines the navigation axis that the first user interface is navigated with when movement of the first contact is received. For example, in some embodiments, orientation of the second electronic device is optionally measured with respect to x, y, and z coordinates. In some embodiments, an x-axis and a y-axis are in the plane of the touch-sensitive surface and the z-axis is normal to the touch-sensitive surface. For example, If the attitude of second electronic device is more than a threshold amount in a horizontal direction (e.g., x-direction and z-direction), the navigation direction is optionally associated with horizontal navigation and the (e.g., positive or negative, such as clockwise or counter clockwise) movement direction of the contact optionally determines the navigation direction along the horizontal axis. Similarly, if attitude of the second electronic is more than a threshold amount in a vertical direction (e.g., y-direction and z-direction), the navigation direction is optionally associated with vertical navigation and the (e.g., positive or negative, such as clockwise or counter clockwise) movement direction of the contact optionally determines the navigation direction along the vertical axis.

The above described manner of navigating the first user interface in a direction based on the orientation of the second electronic device provides an efficient way of selecting different navigation axes based a touchdown location of the first contact, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, navigating the first user interface in accordance with the movement of the first contact and the first mode of navigation includes navigating the first user interface with a first navigation speed (e.g., the first mode of navigation defines the speed at which the first user interface is navigated (e.g., amount of navigation performed) when navigating in accordance with the movement of the first contact. For example, if the user interface includes a scrubber bar, the first mode of navigation optionally defines the speed (e.g., the amount) a playback indicator in the scrubber bar is adjusted based on the (e.g., amount of) movement of the first contact along the touch-sensitive surface). In some embodiments, while navigating the first user interface in accordance with the first mode of navigation (e.g., while the first contact is continuing to satisfy the one or more criteria for navigating in the first mode of navigation, such as remaining in the first region of the touch-sensitive surface), the first electronic device receives, at the first electronic device, an indication of a sequence of one or more movements of contacts detected within a respective area in the first region of the touch-sensitive, wherein the movements of the contacts have magnitudes less than a threshold amount of movement (e.g., less than 0.5, 1, 2, 3, 5 cm), such as touch contacts 624*aa* and 624*ee* in FIGS. 6AA-6GG. For example, receiving an indication of (e.g., different, distinct) contacts performing a particular gesture (e.g., short swipes). In some embodiments, the electronic device receives an indication of one or more distinct (e.g., different) short swipes that are less than a respective amount of movement (e.g., a plurality of short swipes) occurring in the first region of the touch-sensitive surface.)

In some embodiments, in response to receiving the indication of the sequence of one or more movements of the contacts, the first electronic device navigates the first user interface with a second navigation speed, greater than the first navigation speed, and with inertia while no contact is detected on the touch-sensitive surface, such as the scrubbing performed in FIGS. 6HH and 6II while no touch contact is detected on touch-sensitive surface 451. For example, in response to detecting that one or more distinct contacts moved less than threshold amount during the first mode of navigation, navigating the first user interface with a second navigation speed, such that the first user interface is navigated by a greater amount when the same magnitude of movement is detected while navigating the first user interface with the first mode of navigation and a navigation speed prior to detecting the one or more contacts. In some embodiments, in order for the one or more contacts to cause the first user interface to be navigated with the second navigation speed, respective contacts of the one or more contacts optionally need to touchdown and liftoff within a threshold amount of time (e.g., 0.2, 0.5, 1, 2 seconds). In some embodiments, if the one or more distinct contacts moved less than a threshold amount, but moved at speeds less than a threshold amount of speed, the first user interface is optionally navigated in accordance with the distinct movement of the contacts and a navigation speed of the first mode of navigation optionally remains unchanged. In some embodiments, if the one or more distinct contacts are not detected in a particular area, the first user interface is not navigated with the second navigation speed and with the inertia generated based on the one or more contacts. In some embodiments, the one or more distinct contacts can be detected in a plurality of areas on the touch-sensitive surface (e.g., top, bottom, left, right area of the first region) as long as the distinct contacts are detected in the same area. In some embodiments, the first user interface continues to be navigated at the second navigation speed based on (e.g., simulated) inertia generated based on the one or more contacts, without any additional touch contacts on the touch-sensitive surface, until a simulated (e.g., unbalanced) force causes the navigation of the first user interface to ultimately stop navigation in the first user interface (e.g., based on the one or more contacts). In some embodiments, as the simulated (e.g., unbalanced) force ultimately causes the navigation in the first user interface to cease, the navigation speed gradually changes (e.g., decreases) in accordance with the current inertia associated with the one or more contacts.

The above described manner of navigating the first user interface at greater navigation speeds and with inertia when distinct contacts are detected in a particular region provides an efficient way of increasing a navigation speed of the user interface such that an excessive amount of movement of the first contact is not required to reach a respective location in the first user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while navigating the first user interface with the second navigation speed and while no contact is detected on the touch-sensitive surface (e.g., while the first user interface is being navigated based on the (e.g., simulated) inertia generated based on the one or more contacts and while no touch contacts are detected), the first electronic device receives an indication of a touchdown of a second contact on the touch-sensitive surface (e.g., within the respective area of the touch-sensitive surface, or within any area of the touch-sensitive surface, including outside of the respective area of the touch-sensitive surface), such as touch contact 624*jj* in FIG. 6JJ. In some embodiments, in response to receiving the indication of the touchdown of the second contact on the touch-sensitive surface, the first electronic device ceases navigating the first user interface, such as the scrubbing ceasing in response to the touchdown of touch contact 624*jj* in FIG. 6JJ. For example, while the user interface is being navigated with the inertia generated based on the one or more contacts, ceasing navigating the first user interface with the inertia generated based on the one or more contacts when a touchdown on the touch-sensitive surface is detected. In some embodiments, a scrubber bar is scrubbed in accordance with the inertia generated based on the one or more contacts, and the scrubber bar continues to be scrubbed in accordance with the inertia of the one or more contacts until a touchdown on the touch-sensitive surface is detected—at which time causes scrubbing in the scrubber bar to cease (e.g., stops moving the indication of the playback position based on the inertia of the one or more contacts). In some embodiments, if the touchdown of the second contact is detected while the first user interface is being navigated with the first mode of navigation, the touchdown of the contact optionally causes the first user interface to be navigated with the second mode of navigation (e.g., until the second contact satisfies criteria for navigating with the first mode of navigation). In some embodiments, movement of the second contact optionally causes the first user interface to be navigated with the first speed of navigation if the user interface is being navigated with the first mode of navigation and optionally causes the user interface to be navigated with a third speed of navigation if the user interface is being navigated with the second mode of navigation.

The above described manner of navigating the first user interface at greater navigation speeds and with inertia when distinct contacts are detected in a particular region provides an efficient way of increasing a navigation speed of the user interface such that an excessive amount of movement of the first contact is not required to reach a desired location in the first user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the one or more criteria include a criterion that is satisfied when the touchdown of the first contact is further than a threshold distance (e.g., 0.5, 1, 1.5, 2, 2.5, 3 cm) from a respective edge (e.g., a right edge) of the first region of the touch-sensitive surface (e.g., the first user interface is navigated in accordance with the movement of the first contact if the touchdown location of the first contact is a threshold distance away from an edge of the first region), and the first user interface includes a plurality of items corresponding to a first index object (e.g., objects corresponding to a respective element in a (e.g., alphabetical) list of elements. In some embodiments the objects are mutually exclusive and do not correspond to more than one respective element in the (e.g., alphabetical) list of elements. For example, movies with titles A1, A2, A3 . . . A50 optionally correspond to index object 'A' (e.g., because each movie's title starts with 'A') and movies with titles B1, B2, B3 . . . B50 optionally correspond to index object 'B' (e.g., because each movie's title starts with 'B').), such as items 680-1 to 680-9 in FIG. 6OO. In some embodiments, while displaying the first user interface, the first electronic device receives, at the first electronic device, a second input including an indication of a touchdown of a second contact in the first region of the touch-sensitive surface of the second electronic device (e.g., an indication that a contact has touched down in the first region, different than the first contact). In some embodiment, in response to receiving the second input, in accordance with a determination that the second contact is within the threshold distance of the respective edge of the first region (e.g., if touchdown of the second contact is within a threshold distance of an edge of the first region or moves to be within a threshold distance of an edge of the first region for more than a threshold amount of time), the first electronic device updates the first user interface to include a plurality of index objects including the first index object, wherein the first index object has focus (e.g., displaying a list of index elements concurrently with the plurality of items corresponding to the first index object which correspond to a plurality of objects), such as updating user interface 682 to include index A, B, C, D, E in scrollable index list 682. In some embodiments, because the first user interface includes objects corresponding to a first respective index, the first respective has the focus amongst the list of index elements. In some embodiments, the second contact needs to touchdown within a threshold distance of an edge of the first region and remain within a threshold distance (e.g., 0.1, 0.2, 0.3, 0.5, 1, 2 cm) of that touchdown location for a respective amount of time (0.5, 1, 1.5, 2, 2.5, 3 seconds) in order for the plurality of index objects to display in the first user interface.

In some embodiments, while displaying the plurality of index objects with the first index object having the focus, the first electronic device receives a third input including an indication of movement of the second contact along the touch-sensitive surface of the second electronic device (e.g., after detecting a contact that is within a threshold distance of an edge of the first region, receiving an indication of movement of the contact that is within a threshold distance of the edge of the first region), such as the movement of touch contact 624*ss* in FIGS. 6SS-UU. In some embodiments, in response to receiving the third input, in accordance with a determination the second contact remains within the threshold distance from the respective edge of the first region (e.g., if the second contact did not move away from the edge of the first region by more than the threshold amount), the electronic device moves the focus from the first index object to a second index object of the plurality of index objects in accordance with the movement of the second contact, such as moving the focus in index list 682 from Index Object A to Index Object B in FIGS. 6SS-6UU (e.g., changing the focus amongst the plurality of elements in the list index elements). For example, if the second contact moved in accordance with a clockwise direction, the focus is optionally adjusted in a first direction. Similarly, if the second moved in accordance with a counterclockwise direction, the focus is optionally adjusted in a second direction. For example, a focus amongst the plurality of index optionally moves in an upward direction when the second contact moves in a counterclockwise direction and optionally moves in a downward direction when the second contact moves in a clockwise direction. In some embodiments, in response to receiving the third input, in accordance with a determination the second contact remains within the threshold distance from the respective edge of the first region, the first electronic device ceases display of the plurality of items corresponding to the first index object (e.g., when the focus changes to a new element in list of index elements, objects/items that are displayed in the user interface that do not correspond to the newly focused element are no longer displayed in the first user interface), such as ceasing display of the items 680-1 to 680-9 in FIG. 6UU. In some embodiments, in response to receiving the third input, in accordance with a determination the second contact remains within the threshold distance from the respective edge of the first region, the first electronic device displays, in the first user interface, a plurality of items corresponding to the second index object, different from the plurality of items corresponding to the first index object, such as items 681-1 to 681-9 corresponding to the newly focused Index object 'B' in FIG. 6UU (e.g., when the focus changes to the new element in the list of index elements, objects/items corresponding to the newly focused index element are displayed in the first user interface). For example, in response to the second contact changing the focus from an 'A' index object to a 'B' index object, ceasing display of the content (e.g., movie titles) that starts with the 'A' in the first user interface and displaying content (e.g., movie titles) that starts with the 'B' in the first user interface. If the second contact moves away from the edge of first region (e.g., by than a respective amount (e.g., 0.1, 0.2, 0.3, 0.5, 1, 2 cm), the plurality of index objects optionally cease from displaying in the first user interface and the plurality of items currently displayed in the first user interface are navigated (e.g., scrolled) in accordance with the second mode of navigation and movement of the second contact).

The above described manner of navigating a list of index elements when the contact is detected in the first region that is a threshold distance of an edge of the first region provides an efficient way of navigating index elements and navigating non-index elements based on a touchdown location of a touch contact, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the first user interface, the first electronic device receives a second input including an indication of a touchdown of a second contact and an indication of movement of the second contact along the touch-sensitive surface of the electronic device (e.g., a touchdown of a second contact is detected on the touch-sensitive surface, and movement of the second contact is detected along the touch-sensitive surface). In some embodiments, the second contact is detected in any of the first and second regions). In some embodiments, in response to receiving the second input, in accordance with a determination that an intensity of the second contact is greater than a threshold amount of intensity, the first electronic device performs a selection operation in the first user interface in accordance with a location of the second contact on the touch-sensitive surface without navigating the first user interface, such as selecting item 681-5 in FIGS. 6VV-6XX. For example, if the second contact is touching the touch-sensitive surface with a force greater than a respective amount (e.g., before movement of the second contact is detected), a selection operation is performed. In some embodiments, if the second contact moves more than a respective amount while the intensity of the contact is above a threshold amount, the user interface is not navigated based on the movement of the first contact. In some embodiments, the intensity of the second contact is measured at the time the second initially contacted (e.g., touched down) on the touch-sensitive. For example, if the intensity of the second contact does not initially touchdown with an intensity greater than a respective amount, a selection operation is optionally not performed in the first user interface. In some embodiments, the type of selection operation depends on in which region the second contact is detected. For example, if the second contact is detected in the second region, the type of selection performed is optionally of a first type based on the content included in the first user interface (e.g., if the first user interface includes media content, a selection operation optionally corresponds to a play/pause command, if the first user interface includes selectable objects, the selection operation optionally corresponds to a selection of a respective object, etc.). Further, in some embodiments, if the second contact is detected in the first region, the type of selection performed is optionally of a second type based on the content included in the first user interface (e.g., if the first user interface includes media content, a selection operation optionally corresponds to adjusting a playback position by a respective amount, such as skipping forward or backwards by 30 seconds, if the first user interface includes selectable objects, the selection operation optionally corresponds to adjusting a focus in the first user interface by a respective amount, such as moving the focus by one selectable object, etc.) In some embodiments, in accordance with a determination that the intensity of the second contact is below the threshold amount of intensity, the first electronic device navigates the first user interface in accordance with the movement of the second contact and a respective mode of navigation, such as changing the focus from Item B5 to Item B8 in FIGS. 6YY-6ZZ if touch contact 624*yy* was below intensity threshold 612. For example, if the intensity of the second contact (e.g., at time of touchdown on the touch-sensitive surface) is below a threshold amount of intensity, the movement of the second causes the first user interface to be navigated in accordance with the movement of the second contact. In some embodiments, if an intensity of the second contact becomes greater than a threshold amount after the touchdown of the second contact and a first portion of movement of the second contact, further movement of the second causes the first user interface to be navigated in accordance further movement of the second contact and a respective mode of navigation. In some embodiments, if an intensity of the second contact becomes greater than a threshold amount after the touchdown and a first portion of movement of the second contact, further movement of the second does not cause the first user interface to be navigated in accordance with the further movement of the second contact and a respective mode of navigation (e.g., optionally becomes associated with a selection operation). Thus, in some such embodiments, further movement of the second contact after the second contact exceeded the threshold amount of intensity does not result in the first user interface being navigated in accordance with the movement of the second contact. The above described manner of performing a selection operation if the intensity of a touch contact exceeds a threshold amount and navigating the first user interface in accordance the movement of the touch contact if the second contact does not exceed a threshold amount of intensity provides an efficient way of associated a touch contact with a selection or navigating operation, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while navigating the first user interface in accordance with the second mode of navigation, receiving a second input including an indication of a touchdown of a second contact and movement of the second contact (e.g., a touchdown of a second contact is detected on the touch-sensitive and movement of the second contact is detected along the touch-sensitive surface (e.g., in any of the first and second regions) while criteria for navigating the first user interface with the second mode of navigation has previously been satisfied), such as touch contact 624*aaa* in in FIG. 6AAA. In some embodiments, in response to receiving the second input, in accordance with a determination that the movement of the second contact is in a first horizontal direction, without moving more than a threshold amount in a vertical direction (e.g., 2, 3, 5, 7, 10 cm), the first electronic device navigates the first user interface in a direction corresponding to the first horizontal direction in accordance with the movement of the second contact and the second mode of navigation, such as the focus indicator 671 in FIGS. 6AAA and 6BBB following the movement direction of touch contact 624*aaa* in FIGS. 6AAA-6CCC. For example, movement of the second contact in a first respective horizontal direction causes the first user interface to be navigated in a direction associated with the first respective horizontal direction. If the first user interface includes a scrubber bar and movement of the second contact moves in the first horizontal direction, a playback position in the scrubber bar is optionally scrubbed in a direction associated with the first horizontal direction (e.g., forwards or backwards) and in an amount defined by the second mode of navigation. In some embodiments, in accordance with a determination that movement of the second contact is in a second horizontal direction, different from the first horizontal direction, without moving more than a threshold amount in a vertical direction (e.g., 2, 3, 5, 7, 10 cm), the first user interface is navigated in a direction corresponding to the second horizontal direction in accordance with the movement of the second contact and the second mode of navigation. In some embodiments, if the second contact moves in a vertical direction for more than a threshold amount, the first user interface is not navigated in a direction corresponding to the first horizontal direction.

The above described manner of navigating the first user interface in a direction associated with the horizontal movement of the second contact provides an efficient way of navigating the first user interface in different directions based on the horizontal movement of the second contact, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiment, while navigating the first user interface in accordance with the second mode of navigation, the first electronic device receives a third input including an indication of a touchdown of a third contact and movement of the third contact (e.g., a touchdown of a third contact is detected on the touch-sensitive and movement of the third contact is detected along the touch-sensitive surface (e.g., in any of the first and second regions) while criteria for navigating the first user interface with the second mode of navigation has previously been satisfied), such as touch contact 624*ggg* in FIG. 6GGG. In some embodiments, in response to receiving the third input, in accordance with determination that the movement of the third contact is in the vertical direction, without moving more than the threshold amount in the first horizontal direction, (e.g., the third contact moves in a vertical direction before horizontal movement of the second contact is detected) the first electronic device adjusts an amount of precision of the second mode of navigation from the second amount of precision to a third amount of precision, different from the second amount of precision, such as changing the time span of scrubber bar 692 from spanning 1.5 hours in FIG. 6GGG to spanning 30 minutes in response to the movement of touch contact 624*ggg* in FIGS. 6HHH and 6GGG. For example, if the third contact moves more than a threshold amount in a vertical direction, the amount of precision defined by the second mode of navigation is adjusted. In some embodiments, if the first user interface includes a scrubber bar and is being navigated in accordance with the second mode of navigation, a respective amount of horizontal movement of the second contact optionally adjusts a playback position in the scrubber bar by a first scrubbing amount. In some embodiments, after adjusting the precision of the second mode of navigation from the second amount to the third amount, the same respective amount of horizontal movement of the second contact optionally adjusts a playback position in the scrubber bar by a second scrubbing amount, different from. In some embodiments, based on the direction of the vertical movement, the precision of the second mode of navigation increases or decreases accordingly. For example, if the third contact moves in an upward (e.g., positive) vertical direction, the amount of precision defined by the second mode of navigation optionally increases. If the third contact move in a downward (e.g., negative) vertical direction, the amount of precision defined by the second mode of navigation optionally decreases.

The above described manner of adjusting the precision defined by the second mode of navigation based when a touch contact moves in a vertical direction provides an efficient way of adjusting the precision of a navigation mode based on movement of a touch contact, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first user interface includes respective media content and a scrubber bar that includes a respective number of representations of portions of the respective media content having respective lengths (e.g., a scrubber bar that includes representations of or key frames from portions of media content corresponding to respective slices of time in the media content (e.g., every five minutes of the media content). In some embodiments, the representations of the portions of the media content include a graphical representation of the media content corresponding to the respective time slice that is associated with (e.g., representation of a first respective time slice in the media content, representation of a second respective time slice in the media content, etc.). In some embodiments, each representation of the portions of media content includes an image corresponding to the time slice represented by that respective representation. In some embodiments, while the amount of precision of the second mode of navigation is the second amount of precision, the respective lengths of the portions of the respective media to which the respective number of representations correspond are first lengths, such as the lengths of the seven key frames 692-1 to 692-7 spanning 90 minutes in FIG. 6GGG. For example, if the precision of the second mode of navigation is the second amount of precision, the representations of portions of the respective media content correspond to first respective slices of time (e.g., every 7 minutes in the respective media content) and the lengths of the representations of portions of the respective media content correspond to the first respective slices of time. In some embodiments, while the amount of precision of the second mode of navigation is the third amount of precision, the respective lengths of the portions of the respective media to which the respective number of representations correspond are second lengths, different from the first lengths, such as the lengths of the seven key frames 693-1 to 693-7 spanning 30 minutes in FIG. 6HHH. For example, if the precision of the second mode of navigation is the third amount of prevision, the representations of portions of the respective media content correspond to second respective slices of time (e.g., every 3 minutes in the respective media content) and the lengths of the representations of portions of the respective media content correspond to the second respective slices of time. In some embodiments, if the second respective slices of time are smaller than the first respective slices of time, the respective lengths of the representations of portions of the respective media are smaller than when the second mode of navigation is defined by the second amount of precision. In some embodiments, if the second respective slices of time are larger than the first respective slices of time, the respective lengths of the representations of portions of the respective media are larger than when the second mode of navigation is defined by the second amount of precision.

The above described manner of displaying representations of portions of media content in a scrubber bar with lengths corresponding to the precision of a respective mode of navigation provides an efficient way of indication a current level of precision defined by the respective mode of navigation, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in response to receiving the third input, in accordance with a determination that a speed of the movement of the third contact is a first speed, the third amount of precision is a first respective amount of precision (e.g., when the third contact moves in a vertical direction at a first speed, the amount of precision defined by the second mode of navigation is a first respective amount of precision), and in accordance with a determination that the speed of the movement of the third contact is a second speed, greater than the first speed, the third amount of precision is a second respective amount of precision, different from the first respective amount of precision, such as the key frames in FIG. 6HHH and FIG. 6III spanning different periods of time based on the speed of touch contact 624ggg (e.g., when the third contact moves in a vertical direction at a speed greater than the first speed, the amount of precision defined by the second mode of navigation is a second respective amount of precision). For example, a same amount of horizontal movement optionally adjusts a playback position in the scrubber bar differently based on the speed of third contact when moving in the vertical direction. In other words, the precision of a respective mode of navigation increases as the speed of the third contact increases.

The above described manner of adjusting a precision of a respective navigation mode based on the movement speed of the touch contact provides an efficient way of switching between different precision amounts for a respective navigation mode, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general purpose processors (e.g., a as described with respect to FIGS. 1A-1B, 3, 5A-5C) or application specific chips. Further, the operations described above with reference to FIG. 7 are, optionally, implemented by components depicted in FIGS. 1A-1B. For example, receiving operation 704 and navigating operations 708 and 710 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology includes facilitating navigation of content consumed by a user using an electronic device. The present disclosure contemplates that in some instances, the data utilized may include personal information data that uniquely identifies or can be used to contact or locate a specific person. Such personal information data can include demographic data, content consumption activity, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, content consumption activity can be used to suggest content to a user. Accordingly, use of such personal information data enables users to use electronic devices in coordinated manners. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of network services, the present technology can be configured to allow users to select to "opt in" or "opt out" of participation in the collection of personal information data during registration for services or anytime thereafter. In another example, users can select not to enable content consumption activity tracking. In addition to providing "opt in" and "opt out" options, the present disclosure contemplates providing notifications relating to the access or use of personal information. For instance, a user may be notified upon initiating content playback that their personal information data will be accessed and then reminded again just before personal information data is accessed by the device(s).

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content and other user interfaces can be navigated in accordance with the embodiments of the disclosure without tracking the content consumption activity of the user.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
    at a first electronic device in communication with a display generation component and one or more input devices:
        displaying, via the display generation component, a first user interface configured to accept navigation input from a second electronic device, different from the first electronic device;
        while displaying the first user interface, receiving, at the first electronic device, a first input including an indication of a touchdown of a first contact in a first region of a touch-sensitive surface of the second electronic device, and an indication of movement of the first contact along the touch-sensitive surface of the second electronic device; and
        in response to receiving the first input:
            in accordance with a determination that the first input satisfies one or more criteria, including a criterion that is satisfied when the first contact remains in the first region of the touch-sensitive surface during the movement of the first contact, navigating the first user interface in a first direction in accordance with the movement of the first contact and a first mode of navigation, wherein the first mode of navigation defines a first amount of precision of the navigation applied to the first user interface; and
            in accordance with a determination that the first input does not satisfy the one or more criteria because the first contact moves from the first region of the touch-sensitive surface to a second region of the touch-sensitive surface during the movement of the first contact, navigating the first user interface in the first direction in accordance with the movement of the first contact and a second mode of navigation, wherein the second mode of navigation defines a second amount of precision of the navigation applied to the first user interface, different from the first amount of precision.

2. The method of claim 1, wherein the one or more criteria further include a second criterion that is satisfied when the movement of the first contact does not exceed a movement threshold before a respective amount of time passes from the touchdown of the first contact.

3. The method of claim 1, further comprising:
    while displaying the first user interface, receiving, at the first electronic device, a second input including an indication of a touchdown of a second contact in the first region of the touch-sensitive surface of the second electronic device; and
    in response to receiving the second input:
        in accordance with the determination that the second input satisfies one or more second criteria, including a criterion that is satisfied when movement of the second contact does not exceed a movement threshold within a time threshold of the touchdown of the second contact, liftoff of the second contact from the touch-sensitive surface is detected within the time threshold of the touchdown of the second contact, and an intensity of the second contact is less than an intensity threshold:
            in accordance with a determination that the touchdown of the second contact is detected in a first predefined area of the first region of the touch-sensitive surface, navigating the first user interface in a second direction by a predefined amount; and
            in accordance with a determination that the touchdown of the second contact is detected in a second predefined area of the first region of the touch-sensitive surface, forgoing navigating the first user interface in the second direction by the predefined amount.

4. The method of claim 1, further comprising:
    while displaying the first user interface, receiving, at the first electronic device, a second input including an indication of a touchdown of a second contact in the first region of the touch-sensitive surface of the second electronic device; and
    in response to receiving the second input:
        in accordance with the determination that the second input satisfies one or more second criteria, including a criterion that is satisfied when movement of the second contact does not exceed a movement threshold within a time threshold of the touchdown of the second contact, liftoff of the second contact from the touch-sensitive surface is detected within the time threshold of the touchdown of the second contact, and an intensity of the second contact is more than an intensity threshold:
            in accordance with a determination that the touchdown of the second contact is detected in a first predefined area of the first region of the touch-sensitive surface, navigating the first user interface in a first direction by a predefined amount; and
            in accordance with a determination that the touchdown of the second contact is detected in a second predefined area of the first region of the touch-sensitive surface, forgoing navigating the first user interface in the first direction by the predefined amount.

5. The method of claim 1, the method further comprising:
while displaying the first user interface, receiving, at the first electronic device, a second input including an indication of a touchdown of a second contact; and
in response to receiving the second input:
in accordance with a determination that the touchdown of the second contact is detected within the second region of the touch-sensitive surface:
in accordance with a determination that the second input satisfies one or more second criteria, including a criterion that is satisfied when the touchdown and liftoff of the second contact occur within a threshold amount of time, without the second contact moving more than a threshold amount of movement during the threshold amount of time, and an intensity of the first contact is below an intensity threshold, performing a selection operation in the first user interface in accordance with the second input.

6. The method of claim 1, the method further comprising:
while displaying the first user interface, receiving, at the first electronic device, a second input including an indication of a touchdown of a second contact; and
in response to receiving the second input:
in accordance with a determination that the touchdown of the second contact is detected within the second region of the touch-sensitive surface:
in accordance with a determination that the second input satisfies one or more second criteria, including a criterion that is satisfied when the touchdown and liftoff of the second contact occurs within a threshold amount of time, without the second contact moving more than a threshold amount of movement during the threshold amount of time, and an intensity of the first contact is greater than an intensity threshold, performing a selection operation in the first user interface in accordance with the second input.

7. The method of claim 1, wherein the first user interface includes media content and a scrubber bar for navigating through the media content, and navigating the first user interface in the first direction includes controlling the scrubber bar to navigate through the media content in the first direction.

8. The method of claim 7, wherein:
the scrubber bar includes a respective visual indication indicating a current playback position within the media content,
in accordance with a determination that the first user interface is being navigated in accordance with the first mode of navigation, the respective visual indication has a first visual appearance corresponding to the first mode of navigation, and
in accordance with a determination that the first user interface is being navigated in accordance with the second mode of navigation, the respective visual indication has a second visual appearance, different from the first visual appearance, corresponding to the second mode of navigation.

9. The method of claim 8, wherein the respective visual indication with the first visual appearance includes a representation of the touch-sensitive surface of the second electronic device that includes a representation of the first contact at a location corresponding to a location of the first contact on the touch-sensitive surface of the second electronic device.

10. The method of claim 9, further comprising:
while navigating the first user interface in accordance with the first mode of navigation, updating the representation of the touch-sensitive surface in the respective visual indication with the first visual appearance to include the representation of the first contact at an updated location in the representation of the touch-sensitive surface corresponding to an updated location of first contact on the touch-sensitive surface of the second electronic device.

11. The method of claim 1, further comprising:
while navigating the first user interface in accordance with the movement of the first contact and the first mode of navigation, receiving an indication of a liftoff of the first contact; and
in response to receiving the indication of the liftoff of the first contact, ceasing navigating the first user interface in accordance with the first mode of navigation.

12. The method of claim 1, further comprising:
while navigating the first user interface in accordance with the movement of the first contact and the first mode of navigation, receiving an indication that the first contact has moved from the first region of the touch-sensitive surface to the second region of the touch-sensitive surface; and
in response to receiving the indication that the first contact has moved from the first region of the touch-sensitive surface to the second region of the touch-sensitive surface, ceasing navigating the first user interface in accordance with the first mode of navigation.

13. The method of claim 1, wherein:
while navigating the first user interface in accordance with the first mode of navigation:
in accordance with a determination that an elapsed time since the touchdown of the first contact is a first amount of time, a first amount of movement of the first contact navigates the first user interface by a first navigation amount; and
in accordance with a determination that the elapsed time since the touchdown of the first contact is a second amount of time, different from the first amount of time, the first amount of movement of the first contact navigates the first user interface by a second navigation amount, different from the first amount.

14. The method of claim 1, wherein the one or more criteria include a criterion that is satisfied when the touchdown of the first contact is within a first sub-region of the first region of the touch-sensitive surface, the method further comprising:
in response to receiving the first input:
in accordance with a determination that the first input satisfies one or more second criteria, including a criterion that is satisfied when the first contact remains in the first region of the touch-sensitive surface during the movement of the first contact, and a criterion that is satisfied when the touchdown of the first contact is within a second sub-region, different from the first sub-region, of the first region of the touch-sensitive surface, navigating the first user interface in a second direction, different from the first direction, in accordance with the movement of the first contact and the first mode of navigation.

15. The method of claim 1, wherein the one or more criteria include a criterion that is satisfied if the second electronic device is orientated in a first manner, the method further comprising:

in response to receiving the first input:
in accordance with a determination that the first input satisfies one or more second criteria, including a criterion that is satisfied when the first contact remains in the first region of the touch-sensitive surface during the movement of the first contact, and a criterion that is satisfied if the second electronic device is oriented in a second manner, different from the first manner, when the touchdown of the first contact occurred, navigating the first user interface in a second direction, different from the first direction, in accordance with the movement of the first contact and the first mode of navigation.

16. The method of claim 1, wherein navigating the first user interface in accordance with the movement of the first contact and the first mode of navigation includes navigating the first user interface with a first navigation speed, the method further comprising:
while navigating the first user interface in accordance with the first mode of navigation:
receiving, at the first electronic device, an indication of a sequence of one or more movements of contacts detected within a respective area in the first region of the touch-sensitive surface, wherein the movements of the contacts have magnitudes less than a threshold amount of movement; and
in response to receiving the indication of the sequence of one or more movements of the contacts, navigating the first user interface with a second navigation speed, greater than the first navigation speed, and with inertia while no contact is detected on the touch-sensitive surface.

17. The method of claim 16, further comprising:
while navigating the first user interface with the second navigation speed and while no contact is detected on the touch-sensitive surface, receiving an indication of a touchdown of a second contact on the touch-sensitive surface; and
in response to receiving the indication of the touchdown of the second contact on the touch-sensitive surface, ceasing navigating the first user interface.

18. The method of claim 1, wherein the one or more criteria include a criterion that is satisfied when the touchdown of the first contact is further than a threshold distance from a respective edge of the first region of the touch-sensitive surface, and the first user interface includes a plurality of items corresponding to a first index object, the method further comprising:
while displaying the first user interface, receiving, at the first electronic device, a second input including an indication of a touchdown of a second contact in the first region of the touch-sensitive surface of the second electronic device;
in response to receiving the second input:
in accordance with a determination that the second contact is within the threshold distance of the respective edge of the first region, updating the first user interface to include a plurality of index objects including the first index object, wherein the first index object has focus;
while displaying the plurality of index objects with the first index object having the focus, receiving a third input including an indication of movement of the second contact along the touch-sensitive surface of the second electronic device; and in response to receiving the third input:
in accordance with a determination the second contact remains within the threshold distance from the respective edge of the first region:
moving the focus from the first index object to a second index object of the plurality of index objects in accordance with the movement of the second contact;
ceasing display of the plurality of items corresponding to the first index object; and
displaying, in the first user interface, a plurality of items corresponding to the second index object, different from the plurality of items corresponding to the first index object.

19. The method of claim 1, further comprising:
while displaying the first user interface, receiving a second input including an indication of a touchdown of a second contact and an indication of movement of the second contact along the touch-sensitive surface of the first electronic device; and
in response to receiving the second input:
in accordance with a determination that an intensity of the second contact is greater than a threshold amount of intensity, performing a selection operation in the first user interface in accordance with a location of the second contact on the touch-sensitive surface without navigating the first user interface; and
in accordance with a determination that the intensity of the second contact is below the threshold amount of intensity, navigating the first user interface in accordance with the movement of the second contact and a respective mode of navigation.

20. The method of claim 1, further comprising:
while navigating the first user interface in accordance with the second mode of navigation, receiving a second input including an indication of a touchdown of a second contact and movement of the second contact; and
in response to receiving the second input, in accordance with a determination that the movement of the second contact is in a first horizontal direction, without moving more than a threshold amount in a vertical direction navigating the first user interface in a direction corresponding to the first horizontal direction in accordance with the movement of the second contact and the second mode of navigation.

21. The method of claim 20, further comprising:
while navigating the first user interface in accordance with the second mode of navigation, receiving a third input including an indication of a touchdown of a third contact and movement of the third contact; and
in response to receiving the third input:
in accordance with a determination that the movement of the third contact is in the vertical direction, without moving more than the threshold amount in the first horizontal direction, adjusting an amount of precision of the second mode of navigation from the second amount of precision to a third amount of precision, different from the second amount of precision.

22. The method of claim 21, wherein:
the first user interface includes respective media content and a scrubber bar that includes a respective number of representations of portions of the respective media content having respective lengths,
while the amount of precision of the second mode of navigation is the second amount of precision, the respective lengths of the portions of the respective media content to which the respective number of representations correspond are first lengths, and
while the amount of precision of the second mode of navigation is the third amount of precision, the respective lengths of the portions of the respective media content to which the respective number of representations correspond are second lengths, different from the first lengths.

23. The method of claim 21, wherein:
in response to receiving the third input:
   in accordance with a determination that a speed of the movement of the third contact is a first speed, the third amount of precision is a first respective amount of precision, and
   in accordance with a determination that the speed of the movement of the third contact is a second speed, greater than the first speed, the third amount of precision is a second respective amount of precision, different from the first respective amount of precision.

24. The method of claim 1 further comprising:
in response to receiving the first input:
   in accordance with a determination that the first input satisfies one or more second criteria, including a criterion that is satisfied when the first contact moves more than a threshold amount within the first region after touchdown of the first contact, navigating the first user interface in the first direction in accordance with the movement of the first contact and the first mode of navigation.

25. A first electronic device, comprising:
one or more processors;
memory; and
one or more programs, wherein the one or more programs are stored in the memory and configured to be executed by the one or more processors, the one or more programs including instructions for:
displaying, via a display generation component, a first user interface configured to accept navigation input from a second electronic device, different from the first electronic device;
while displaying the first user interface, receiving, at the first electronic device, a first input including an indication of a touchdown of a first contact in a first region of a touch-sensitive surface of the second electronic device, and an indication of movement of the first contact along the touch-sensitive surface of the second electronic device; and
in response to receiving the first input:
   in accordance with a determination that the first input satisfies one or more criteria, including a criterion that is satisfied when the first contact remains in the first region of the touch-sensitive surface during the movement of the first contact, navigating the first user interface in a first direction in accordance with the movement of the first contact and a first mode of navigation, wherein the first mode of navigation defines a first amount of precision of the navigation applied to the first user interface; and
   in accordance with a determination that the first input does not satisfy the one or more criteria because the first contact moves from the first region of the touch-sensitive surface to a second region of the touch-sensitive surface during the movement of the first contact, navigating the first user interface in the first direction in accordance with the movement of the first contact and a second mode of navigation, wherein the second mode of navigation defines a second amount of precision of the navigation applied to the first user interface, different from the first amount of precision.

26. The first electronic device of claim 25, wherein the one or more criteria further include a second criterion that is satisfied when the movement of the first contact does not exceed a movement threshold before a respective amount of time passes from the touchdown of the first contact.

27. The first electronic device of claim 25, wherein the one or more programs further include instructions for:
while displaying the first user interface, receiving, at the first electronic device, a second input including an indication of a touchdown of a second contact in the first region of the touch-sensitive surface of the second electronic device; and
in response to receiving the second input:
   in accordance with the determination that the second input satisfies one or more second criteria, including a criterion that is satisfied when movement of the second contact does not exceed a movement threshold within a time threshold of the touchdown of the second contact, liftoff of the second contact from the touch-sensitive surface is detected within the time threshold of the touchdown of the second contact, and an intensity of the second contact is less than an intensity threshold:
      in accordance with a determination that the touchdown of the second contact is detected in a first predefined area of the first region of the touch-sensitive surface, navigating the first user interface in a second direction by a predefined amount; and
      in accordance with a determination that the touchdown of the second contact is detected in a second predefined area of the first region of the touch-sensitive surface, forgoing navigating the first user interface in the second direction by the predefined amount.

28. The first electronic device of claim 25, wherein the one or more programs further include instructions for:
while displaying the first user interface, receiving, at the first electronic device, a second input including an indication of a touchdown of a second contact in the first region of the touch-sensitive surface of the second electronic device; and
in response to receiving the second input:
   in accordance with the determination that the second input satisfies one or more second criteria, including a criterion that is satisfied when movement of the second contact does not exceed a movement threshold within a time threshold of the touchdown of the second contact, liftoff of the second contact from the touch-sensitive surface is detected within the time threshold of the touchdown of the second contact, and an intensity of the second contact is more than an intensity threshold:
      in accordance with a determination that the touchdown of the second contact is detected in a first predefined area of the first region of the touch-sensitive surface, navigating the first user interface in a first direction by a predefined amount; and
      in accordance with a determination that the touchdown of the second contact is detected in a second predefined area of the first region of the touch-sensitive surface, forgoing navigating the first user interface in the first direction by the predefined amount.

29. The first electronic device of claim 25, wherein the one or more programs further include instructions for:
while displaying the first user interface, receiving, at the first electronic device, a second input including an indication of a touchdown of a second contact; and
in response to receiving the second input:
in accordance with a determination that the touchdown of the second contact is detected within the second region of the touch-sensitive surface:
in accordance with a determination that the second input satisfies one or more second criteria, including a criterion that is satisfied when the touchdown and liftoff of the second contact occur within a threshold amount of time, without the second contact moving more than a threshold amount of movement during the threshold amount of time, and an intensity of the first contact is below an intensity threshold, performing a selection operation in the first user interface in accordance with the second input.

30. The first electronic device of claim 25, wherein the one or more programs further include instructions for:
while displaying the first user interface, receiving, at the first electronic device, a second input including an indication of a touchdown of a second contact; and
in response to receiving the second input:
in accordance with a determination that the touchdown of the second contact is detected within the second region of the touch-sensitive surface:
in accordance with a determination that the second input satisfies one or more second criteria, including a criterion that is satisfied when the touchdown and liftoff of the second contact occurs within a threshold amount of time, without the second contact moving more than a threshold amount of movement during the threshold amount of time, and an intensity of the first contact is greater than an intensity threshold, performing a selection operation in the first user interface in accordance with the second input.

31. The first electronic device of claim 25, wherein the first user interface includes media content and a scrubber bar for navigating through the media content, and navigating the first user interface in the first direction includes controlling the scrubber bar to navigate through the media content in the first direction.

32. The first electronic device of claim 31, wherein:
the scrubber bar includes a respective visual indication indicating a current playback position within the media content,
in accordance with a determination that the first user interface is being navigated in accordance with the first mode of navigation, the respective visual indication has a first visual appearance corresponding to the first mode of navigation, and
in accordance with a determination that the first user interface is being navigated in accordance with the second mode of navigation, the respective visual indication has a second visual appearance, different from the first visual appearance, corresponding to the second mode of navigation.

33. The first electronic device of claim 32, wherein the respective visual indication with the first visual appearance includes a representation of the touch-sensitive surface of the second electronic device that includes a representation of the first contact at a location corresponding to a location of the first contact on the touch-sensitive surface of the second electronic device.

34. The first electronic device of claim 33, wherein the one or more programs further include instructions for:
while navigating the first user interface in accordance with the first mode of navigation, updating the representation of the touch-sensitive surface in the respective visual indication with the first visual appearance to include the representation of the first contact at an updated location in the representation of the touch-sensitive surface corresponding to an updated location of first contact on the touch-sensitive surface of the second electronic device.

35. The first electronic device of claim 25, wherein the one or more programs further include instructions for:
while navigating the first user interface in accordance with the movement of the first contact and the first mode of navigation, receiving an indication of a liftoff of the first contact; and
in response to receiving the indication of the liftoff of the first contact, ceasing navigating the first user interface in accordance with the first mode of navigation.

36. The first electronic device of claim 25, wherein the one or more programs further include instructions for:
while navigating the first user interface in accordance with the movement of the first contact and the first mode of navigation, receiving an indication that the first contact has moved from the first region of the touch-sensitive surface to the second region of the touch-sensitive surface; and
in response to receiving the indication that the first contact has moved from the first region of the touch-sensitive surface to the second region of the touch-sensitive surface, ceasing navigating the first user interface in accordance with the first mode of navigation.

37. The first electronic device of claim 25, wherein:
while navigating the first user interface in accordance with the first mode of navigation:
in accordance with a determination that an elapsed time since the touchdown of the first contact is a first amount of time, a first amount of movement of the first contact navigates the first user interface by a first navigation amount; and
in accordance with a determination that the elapsed time since the touchdown of the first contact is a second amount of time, different from the first amount of time, the first amount of movement of the first contact navigates the first user interface by a second navigation amount, different from the first amount.

38. The first electronic device of claim 25, wherein the one or more criteria include a criterion that is satisfied when the touchdown of the first contact is within a first sub-region of the first region of the touch-sensitive surface, the one or more programs further include instructions for:
in response to receiving the first input:
in accordance with a determination that the first input satisfies one or more second criteria, including a criterion that is satisfied when the first contact remains in the first region of the touch-sensitive surface during the movement of the first contact, and a criterion that is satisfied when the touchdown of the first contact is within a second sub-region, different from the first sub-region, of the first region of the touch-sensitive surface, navigating the first user interface in a second direction, different from the first direction, in accordance with the movement of the first contact and the first mode of navigation.

39. The first electronic device of claim 25, wherein the one or more criteria include a criterion that is satisfied if the second electronic device is orientated in a first manner, the one or more programs further include instructions for:
in response to receiving the first input:
in accordance with a determination that the first input satisfies one or more second criteria, including a criterion that is satisfied when the first contact remains in the first region of the touch-sensitive surface during the movement of the first contact, and a criterion that is satisfied if the second electronic device is oriented in a second manner, different from the first manner, when the touchdown of the first contact occurred, navigating the first user interface in a second direction, different from the first direction, in accordance with the movement of the first contact and the first mode of navigation.

40. The first electronic device of claim 25, wherein navigating the first user interface in accordance with the movement of the first contact and the first mode of navigation includes navigating the first user interface with a first navigation speed, the one or more programs further include instructions for:
while navigating the first user interface in accordance with the first mode of navigation:
receiving, at the first electronic device, an indication of a sequence of one or more movements of contacts detected within a respective area in the first region of the touch-sensitive surface, wherein the movements of the contacts have magnitudes less than a threshold amount of movement; and
in response to receiving the indication of the sequence of one or more movements of the contacts, navigating the first user interface with a second navigation speed, greater than the first navigation speed, and with inertia while no contact is detected on the touch-sensitive surface.

41. The first electronic device of claim 40, wherein the one or more programs further include instructions for:
while navigating the first user interface with the second navigation speed and while no contact is detected on the touch-sensitive surface, receiving an indication of a touchdown of a second contact on the touch-sensitive surface; and
in response to receiving the indication of the touchdown of the second contact on the touch-sensitive surface, ceasing navigating the first user interface.

42. The first electronic device of claim 25, wherein the one or more criteria include a criterion that is satisfied when the touchdown of the first contact is further than a threshold distance from a respective edge of the first region of the touch-sensitive surface, and the first user interface includes a plurality of items corresponding to a first index object, the one or more programs further include instructions for:
while displaying the first user interface, receiving, at the first electronic device, a second input including an indication of a touchdown of a second contact in the first region of the touch-sensitive surface of the second electronic device;
in response to receiving the second input:
in accordance with a determination that the second contact is within the threshold distance of the respective edge of the first region, updating the first user interface to include a plurality of index objects including the first index object, wherein the first index object has focus;
while displaying the plurality of index objects with the first index object having the focus, receiving a third input including an indication of movement of the second contact along the touch-sensitive surface of the second electronic device; and
in response to receiving the third input:
in accordance with a determination the second contact remains within the threshold distance from the respective edge of the first region:
moving the focus from the first index object to a second index object of the plurality of index objects in accordance with the movement of the second contact;
ceasing display of the plurality of items corresponding to the first index object; and
displaying, in the first user interface, a plurality of items corresponding to the second index object, different from the plurality of items corresponding to the first index object.

43. The first electronic device of claim 25, wherein the one or more programs further include instructions for:
while displaying the first user interface, receiving a second input including an indication of a touchdown of a second contact and an indication of movement of the second contact along the touch-sensitive surface of the first electronic device; and
in response to receiving the second input:
in accordance with a determination that an intensity of the second contact is greater than a threshold amount of intensity, performing a selection operation in the first user interface in accordance with a location of the second contact on the touch-sensitive surface without navigating the first user interface; and
in accordance with a determination that the intensity of the second contact is below the threshold amount of intensity, navigating the first user interface in accordance with the movement of the second contact and a respective mode of navigation.

44. The first electronic device of claim 25, wherein the one or more programs further include instructions for:
while navigating the first user interface in accordance with the second mode of navigation, receiving a second input including an indication of a touchdown of a second contact and movement of the second contact; and
in response to receiving the second input, in accordance with a determination that the movement of the second contact is in a first horizontal direction, without moving more than a threshold amount in a vertical direction navigating the first user interface in a direction corresponding to the first horizontal direction in accordance with the movement of the second contact and the second mode of navigation.

45. The first electronic device of claim 44, wherein the one or more programs further include instructions for:
while navigating the first user interface in accordance with the second mode of navigation, receiving a third input including an indication of a touchdown of a third contact and movement of the third contact; and
in response to receiving the third input:
in accordance with a determination that the movement of the third contact is in the vertical direction, without moving more than the threshold amount in the first horizontal direction, adjusting an amount of precision of the second mode of navigation from the second amount of precision to a third amount of precision, different from the second amount of precision.

46. The first electronic device of claim 45, wherein the one or more programs further include instructions for:
the first user interface includes respective media content and a scrubber bar that includes a respective number of representations of portions of the respective media content having respective lengths,
while the amount of precision of the second mode of navigation is the second amount of precision, the respective lengths of the portions of the respective media content to which the respective number of representations correspond are first lengths, and
while the amount of precision of the second mode of navigation is the third amount of precision, the respective lengths of the portions of the respective media content to which the respective number of representations correspond are second lengths, different from the first lengths.

47. The first electronic device of claim 45, wherein the one or more programs further include instructions for:
in response to receiving the third input:
in accordance with a determination that a speed of the movement of the third contact is a first speed, the third amount of precision is a first respective amount of precision, and
in accordance with a determination that the speed of the movement of the third contact is a second speed, greater than the first speed, the third amount of precision is a second respective amount of precision, different from the first respective amount of precision.

48. The first electronic device of claim 25, wherein the one or more programs further include instructions for:
in response to receiving the first input:
in accordance with a determination that the first input satisfies one or more second criteria, including a criterion that is satisfied when the first contact moves more than a threshold amount within the first region after touchdown of the first contact, navigating the first user interface in the first direction in accordance with the movement of the first contact and the first mode of navigation.

49. A non-transitory computer readable storage medium storing one or more programs, the one or more programs comprising instructions, which when executed by one or more processors of a first electronic device, cause the first electronic device to perform a method comprising:
displaying, via a display generation component, a first user interface configured to accept navigation input from a second electronic device, different from the first electronic device;
while displaying the first user interface, receiving, at the first electronic device, a first input including an indication of a touchdown of a first contact in a first region of a touch-sensitive surface of the second electronic device, and an indication of movement of the first contact along the touch-sensitive surface of the second electronic device; and
in response to receiving the first input:
in accordance with a determination that the first input satisfies one or more criteria, including a criterion that is satisfied when the first contact remains in the first region of the touch-sensitive surface during the movement of the first contact, navigating the first user interface in a first direction in accordance with the movement of the first contact and a first mode of navigation, wherein the first mode of navigation defines a first amount of precision of the navigation applied to the first user interface; and
in accordance with a determination that the first input does not satisfy the one or more criteria because the first contact moves from the first region of the touch-sensitive surface to a second region of the touch-sensitive surface during the movement of the first contact, navigating the first user interface in the first direction in accordance with the movement of the first contact and a second mode of navigation, wherein the second mode of navigation defines a second amount of precision of the navigation applied to the first user interface, different from the first amount of precision.

50. The non-transitory computer readable storage medium of claim 49, wherein the one or more criteria further include a second criterion that is satisfied when the movement of the first contact does not exceed a movement threshold before a respective amount of time passes from the touchdown of the first contact.

51. The non-transitory computer readable storage medium of claim 49, wherein the one or more programs further cause the first electronic device to:
while displaying the first user interface, receive, at the first electronic device, a second input including an indication of a touchdown of a second contact in the first region of the touch-sensitive surface of the second electronic device; and
in response to receiving the second input:
in accordance with the determination that the second input satisfies one or more second criteria, including a criterion that is satisfied when movement of the second contact does not exceed a movement threshold within a time threshold of the touchdown of the second contact, liftoff of the second contact from the touch-sensitive surface is detected within the time threshold of the touchdown of the second contact, and an intensity of the second contact is less than an intensity threshold:
in accordance with a determination that the touchdown of the second contact is detected in a first predefined area of the first region of the touch-sensitive surface, navigate the first user interface in a second direction by a predefined amount; and
in accordance with a determination that the touchdown of the second contact is detected in a second predefined area of the first region of the touch-sensitive surface, forgo navigating the first user interface in the second direction by the predefined amount.

52. The non-transitory computer readable storage medium of claim 49, wherein the one or more programs further cause the first electronic device to:
while displaying the first user interface, receive, at the first electronic device, a second input including an indication of a touchdown of a second contact in the first region of the touch-sensitive surface of the second electronic device; and
in response to receiving the second input:
in accordance with the determination that the second input satisfies one or more second criteria, including a criterion that is satisfied when movement of the second contact does not exceed a movement threshold within a time threshold of the touchdown of the second contact, liftoff of the second contact from the touch-sensitive surface is detected within the time threshold of the touchdown of the second contact, and an intensity of the second contact is more than an intensity threshold:
 in accordance with a determination that the touchdown of the second contact is detected in a first predefined area of the first region of the touch-sensitive surface, navigate the first user interface in a first direction by a predefined amount; and
 in accordance with a determination that the touchdown of the second contact is detected in a second predefined area of the first region of the touch-sensitive surface, forgo navigating the first user interface in the first direction by the predefined amount.

53. The non-transitory computer readable storage medium of claim 49, wherein the one or more programs further cause the first electronic device to:
 while displaying the first user interface, receive, at the first electronic device, a second input including an indication of a touchdown of a second contact; and
 in response to receiving the second input:
  in accordance with a determination that the touchdown of the second contact is detected within the second region of the touch-sensitive surface:
   in accordance with a determination that the second input satisfies one or more second criteria, including a criterion that is satisfied when the touchdown and liftoff of the second contact occur within a threshold amount of time, without the second contact moving more than a threshold amount of movement during the threshold amount of time, and an intensity of the first contact is below an intensity threshold, perform a selection operation in the first user interface in accordance with the second input.

54. The non-transitory computer readable storage medium of claim 49, wherein the one or more programs further cause the first electronic device to:
 while displaying the first user interface, receive, at the first electronic device, a second input including an indication of a touchdown of a second contact; and
 in response to receiving the second input:
  in accordance with a determination that the touchdown of the second contact is detected within the second region of the touch-sensitive surface:
   in accordance with a determination that the second input satisfies one or more second criteria, including a criterion that is satisfied when the touchdown and liftoff of the second contact occurs within a threshold amount of time, without the second contact moving more than a threshold amount of movement during the threshold amount of time, and an intensity of the first contact is greater than an intensity threshold, perform a selection operation in the first user interface in accordance with the second input.

55. The non-transitory computer readable storage medium of claim 49, wherein the first user interface includes media content and a scrubber bar for navigating through the media content, and navigating the first user interface in the first direction includes controlling the scrubber bar to navigate through the media content in the first direction.

56. The non-transitory computer readable storage medium of claim 55, wherein:
 the scrubber bar includes a respective visual indication indicating a current playback position within the media content,
 in accordance with a determination that the first user interface is being navigated in accordance with the first mode of navigation, the respective visual indication has a first visual appearance corresponding to the first mode of navigation, and
 in accordance with a determination that the first user interface is being navigated in accordance with the second mode of navigation, the respective visual indication has a second visual appearance, different from the first visual appearance, corresponding to the second mode of navigation.

57. The non-transitory computer readable storage medium of claim 56, wherein the respective visual indication with the first visual appearance includes a representation of the touch-sensitive surface of the second electronic device that includes a representation of the first contact at a location corresponding to a location of the first contact on the touch-sensitive surface of the second electronic device.

58. The non-transitory computer readable storage medium of claim 57, wherein the one or more programs further cause the first electronic device to:
 while navigating the first user interface in accordance with the first mode of navigation, update the representation of the touch-sensitive surface in the respective visual indication with the first visual appearance to include the representation of the first contact at an updated location in the representation of the touch-sensitive surface corresponding to an updated location of first contact on the touch-sensitive surface of the second electronic device.

59. The non-transitory computer readable storage medium of claim 49, wherein the one or more programs further cause the first electronic device to:
 while navigating the first user interface in accordance with the movement of the first contact and the first mode of navigation, receive an indication of a liftoff of the first contact; and
 in response to receiving the indication of the liftoff of the first contact, cease navigating the first user interface in accordance with the first mode of navigation.

60. The non-transitory computer readable storage medium of claim 49, wherein the one or more programs further cause the first electronic device to:
 while navigating the first user interface in accordance with the movement of the first contact and the first mode of navigation, receive an indication that the first contact has moved from the first region of the touch-sensitive surface to the second region of the touch-sensitive surface; and
 in response to receiving the indication that the first contact has moved from the first region of the touch-sensitive surface to the second region of the touch-sensitive surface, cease navigating the first user interface in accordance with the first mode of navigation.

61. The non-transitory computer readable storage medium of claim 49, wherein:
 while navigating the first user interface in accordance with the first mode of navigation:
  in accordance with a determination that an elapsed time since the touchdown of the first contact is a first amount of time, a first amount of movement of the first contact navigates the first user interface by a first navigation amount; and in accordance with a determination that the elapsed time since the touchdown of the first contact is a second amount of time, different from the first amount of time, the first amount of movement of the first contact navigates the first user interface by a second navigation amount, different from the first amount.

62. The non-transitory computer readable storage medium of claim 49, wherein the one or more criteria include a criterion that is satisfied when the touchdown of the first contact is within a first sub-region of the first region of the touch-sensitive surface, the one or more programs further cause the first electronic device to:

in response to receiving the first input:
in accordance with a determination that the first input satisfies one or more second criteria, including a criterion that is satisfied when the first contact remains in the first region of the touch-sensitive surface during the movement of the first contact, and a criterion that is satisfied when the touchdown of the first contact is within a second sub-region, different from the first sub-region, of the first region of the touch-sensitive surface, navigate the first user interface in a second direction, different from the first direction, in accordance with the movement of the first contact and the first mode of navigation.

63. The non-transitory computer readable storage medium of claim 49, wherein the one or more criteria include a criterion that is satisfied if the second electronic device is orientated in a first manner, the one or more programs further cause the first electronic device to:

in response to receiving the first input:
in accordance with a determination that the first input satisfies one or more second criteria, including a criterion that is satisfied when the first contact remains in the first region of the touch-sensitive surface during the movement of the first contact, and a criterion that is satisfied if the second electronic device is oriented in a second manner, different from the first manner, when the touchdown of the first contact occurred, navigate the first user interface in a second direction, different from the first direction, in accordance with the movement of the first contact and the first mode of navigation.

64. The non-transitory computer readable storage medium of claim 25, wherein navigating the first user interface in accordance with the movement of the first contact and the first mode of navigation includes navigating the first user interface with a first navigation speed, the one or more programs further cause the first electronic device to:

while navigating the first user interface in accordance with the first mode of navigation:
receive, at the first electronic device, an indication of a sequence of one or more movements of contacts detected within a respective area in the first region of the touch-sensitive surface, wherein the movements of the contacts have magnitudes less than a threshold amount of movement; and
in response to receiving the indication of the sequence of one or more movements of the contacts, navigate the first user interface with a second navigation speed, greater than the first navigation speed, and with inertia while no contact is detected on the touch-sensitive surface.

65. The non-transitory computer readable storage medium of claim 64, wherein the one or more programs further cause the first electronic device to:

while navigating the first user interface with the second navigation speed and while no contact is detected on the touch-sensitive surface, receive an indication of a touchdown of a second contact on the touch-sensitive surface; and
in response to receiving the indication of the touchdown of the second contact on the touch-sensitive surface, cease navigating the first user interface.

66. The non-transitory computer readable storage medium of claim 49, wherein the one or more criteria include a criterion that is satisfied when the touchdown of the first contact is further than a threshold distance from a respective edge of the first region of the touch-sensitive surface, and the first user interface includes a plurality of items corresponding to a first index object, the one or more programs further cause the first electronic device to:

while displaying the first user interface, receive, at the first electronic device, a second input including an indication of a touchdown of a second contact in the first region of the touch-sensitive surface of the second electronic device;
in response to receiving the second input:
in accordance with a determination that the second contact is within the threshold distance of the respective edge of the first region, update the first user interface to include a plurality of index objects including the first index object, wherein the first index object has focus;
while displaying the plurality of index objects with the first index object having the focus, receive a third input including an indication of movement of the second contact along the touch-sensitive surface of the second electronic device; and
in response to receiving the third input:
in accordance with a determination the second contact remains within the threshold distance from the respective edge of the first region:
move the focus from the first index object to a second index object of the plurality of index objects in accordance with the movement of the second contact;
cease display of the plurality of items corresponding to the first index object; and
display, in the first user interface, a plurality of items corresponding to the second index object, different from the plurality of items corresponding to the first index object.

67. The non-transitory computer readable storage medium of claim 49, wherein the one or more programs further cause the first electronic device to:

while displaying the first user interface, receive a second input including an indication of a touchdown of a second contact and an indication of movement of the second contact along the touch-sensitive surface of the first electronic device; and
in response to receiving the second input:
in accordance with a determination that an intensity of the second contact is greater than a threshold amount of intensity, perform a selection operation in the first user interface in accordance with a location of the second contact on the touch-sensitive surface without navigating the first user interface; and
in accordance with a determination that the intensity of the second contact is below the threshold amount of intensity, navigate the first user interface in accordance with the movement of the second contact and a respective mode of navigation.

68. The non-transitory computer readable storage medium of claim 49, wherein the one or more programs further cause the first electronic device to:
while navigating the first user interface in accordance with the second mode of navigation, receive a second input including an indication of a touchdown of a second contact and movement of the second contact; and
in response to receiving the second input, in accordance with a determination that the movement of the second contact is in a first horizontal direction, without moving more than a threshold amount in a vertical direction navigate the first user interface in a direction corresponding to the first horizontal direction in accordance with the movement of the second contact and the second mode of navigation.

69. The non-transitory computer readable storage medium of claim 68, wherein the one or more programs further cause the first electronic device to:
while navigating the first user interface in accordance with the second mode of navigation, receive a third input including an indication of a touchdown of a third contact and movement of the third contact; and
in response to receiving the third input:
in accordance with a determination that the movement of the third contact is in the vertical direction, without moving more than the threshold amount in the first horizontal direction, adjust an amount of precision of the second mode of navigation from the second amount of precision to a third amount of precision, different from the second amount of precision.

70. The non-transitory computer readable storage medium of claim 69, wherein the one or more programs further cause the first electronic device to:
the first user interface includes respective media content and a scrubber bar that includes a respective number of representations of portions of the respective media content having respective lengths,
while the amount of precision of the second mode of navigation is the second amount of precision, the respective lengths of the portions of the respective media content to which the respective number of representations correspond are first lengths, and
while the amount of precision of the second mode of navigation is the third amount of precision, the respective lengths of the portions of the respective media content to which the respective number of representations correspond are second lengths, different from the first lengths.

71. The non-transitory computer readable storage medium of claim 69, wherein the one or more programs further cause the first electronic device to:
in response to receiving the third input:
in accordance with a determination that a speed of the movement of the third contact is a first speed, the third amount of precision is a first respective amount of precision, and
in accordance with a determination that the speed of the movement of the third contact is a second speed, greater than the first speed, the third amount of precision is a second respective amount of precision, different from the first respective amount of precision.

72. The non-transitory computer readable storage medium of claim 49, wherein the one or more programs further cause the first electronic device to:
in response to receiving the first input:
in accordance with a determination that the first input satisfies one or more second criteria, including a criterion that is satisfied when the first contact moves more than a threshold amount within the first region after touchdown of the first contact, navigate the first user interface in the first direction in accordance with the movement of the first contact and the first mode of navigation.

\* \* \* \* \*

UNITED STATES PATENT AND TRADEMARK OFFICE
CERTIFICATE OF CORRECTION

| | |
|---|---|
| PATENT NO. | : 11,669,194 B2 |
| APPLICATION NO. | : 17/659304 |
| DATED | : June 6, 2023 |
| INVENTOR(S) | : Christopher J. Sanders, Dennis S. Park and Neil P. Cormican |

It is certified that error appears in the above-identified patent and that said Letters Patent is hereby corrected as shown below:

On the Title Page

In Column 1, item (72), Line 2, delete "San Francisco," and insert -- San Francisco --.

Signed and Sealed this
Eighteenth Day of July, 2023

*Katherine Kelly Vidal*

Katherine Kelly Vidal
*Director of the United States Patent and Trademark Office*